(12) United States Patent  
Carriere et al.

(10) Patent No.: US 9,898,703 B2
(45) Date of Patent: Feb. 20, 2018

(54) METHOD AND SYSTEM FOR DEPLOYED OPERATIONS SUPPORT

(75) Inventors: Patrick Carriere, Chelsea (CA); Yui Sotozaki, Ottawa (CA)

(73) Assignee: MXI TECHNOLOGIES, LTD., Ottawa (CA)

( * ) Notice: Subject to any disclaimer, the term of this patent is extended or adjusted under 35 U.S.C. 154(b) by 217 days.

(21) Appl. No.: 13/641,289

(22) PCT Filed: Apr. 15, 2011

(86) PCT No.: PCT/CA2011/000417
§ 371 (c)(1),
(2), (4) Date: Nov. 27, 2012

(87) PCT Pub. No.: WO2011/127581
PCT Pub. Date: Oct. 20, 2011

(65) Prior Publication Data
US 2013/0067017 A1   Mar. 14, 2013

Related U.S. Application Data

(60) Provisional application No. 61/324,387, filed on Apr. 15, 2010.

(51) Int. Cl.
*G06F 15/16* (2006.01)
*G06Q 10/06* (2012.01)
(Continued)

(52) U.S. Cl.
CPC ....... *G06Q 10/06* (2013.01); *G06F 17/30575* (2013.01); *H04L 67/1095* (2013.01)

(58) Field of Classification Search
CPC ... H04B 7/18504; G06F 1/3203; G06F 8/665; G06F 15/16
(Continued)

(56) References Cited

U.S. PATENT DOCUMENTS 6,445,784 B2 * 9/2002 Uppaluru ............ H04M 3/5191
                                                    379/207.01
6,529,904 B1 * 3/2003 Elsbernd ........... G06F 17/30575
(Continued)

FOREIGN PATENT DOCUMENTS

CA      2694895       2/2009
EP      1630695 A2    1/2006
(Continued)

OTHER PUBLICATIONS

International Search Report for application PCT/CA2011/000417, dated Sep. 12, 2011.
(Continued)

*Primary Examiner* — Tesfay Yohannes
(74) *Attorney, Agent, or Firm* — Hahn Loeser & Parks LLP

(57) ABSTRACT

The invention is generally related to operations support systems and more specifically, to a method of and system for deployed maintenance operations for equipment or assets. Existing web-based systems support organizations may be spread over large geographies, but only insofar as each part of that organization can remain fully-connected to the central server or data center. The system described herein, on the other hand, allows portions of the organization to operate for long periods of time without a dedicated connection, while keeping technical records accurate. The system described herein allows a customer to set up a 'deployed site', which is effectively an environment that operates as a partial copy of the master site (which contains baseline data), and is only allowed to operate on a specific subset of the assets in the system (say, a fleet of aircraft). This deployed environment has all the required configuration and transactional data to run as a standalone system until the deployment is no longer required. At that time, the deployed
(Continued)

site can be decommissioned by transferring the assets out to other sites, deployed or not.

20 Claims, 36 Drawing Sheets

(51) Int. Cl.
  *G06F 17/30* (2006.01)
  *H04L 29/08* (2006.01)
(58) Field of Classification Search
  USPC .................. 709/208, 223; 455/450; 713/176; 712/176
  See application file for complete search history.

(56) References Cited

U.S. PATENT DOCUMENTS

| | | |
|---|---|---|
| 2002/0199024 A1 | 12/2002 | Givoly et al. |
| 2003/0009431 A1 | 1/2003 | Souder et al. |
| 2003/0099431 A1 | 1/2003 | Souder et al. |
| 2004/0133591 A1 | 7/2004 | Holenstein et al. |
| 2004/0142696 A1* | 7/2004 | Saunders ............... H04B 1/715 455/450 |
| 2005/0154653 A1* | 7/2005 | Jongebloed ........... G06Q 10/06 705/28 |
| 2006/0059253 A1* | 3/2006 | Goodman .............. G06Q 10/06 709/223 |
| 2006/0156006 A1* | 7/2006 | Dietl ....................... G06F 21/64 713/176 |
| 2006/0229896 A1* | 10/2006 | Rosen .................... G06Q 10/10 705/321 |
| 2007/0150565 A1* | 6/2007 | Ayyagari ............... H04L 67/12 709/223 |
| 2008/0098042 A1* | 4/2008 | Tian ....................... H04L 7/0004 |
| 2009/0087436 A1* | 4/2009 | Roch .................. A61K 31/7052 424/139.1 |
| 2010/0228836 A1* | 9/2010 | Lehtovirta .............. H04L 12/00 709/220 |
| 2010/0318640 A1* | 12/2010 | Mehta ................. H04L 63/0884 709/223 |
| 2012/0030768 A1* | 2/2012 | Mraz ....................... G06F 21/85 726/26 |

FOREIGN PATENT DOCUMENTS

| | | |
|---|---|---|
| WO | 2005096187 A1 | 10/2005 |
| WO | 2008020722 A1 | 2/2008 |

OTHER PUBLICATIONS

Written Opinion of International Search Authority for application PCT/CA2011/000417, dated Sep. 12, 2011.

* cited by examiner

FIGURE 31

| REF_DPO_IMPORT_FAIL_MODE |
|---|
| IMPORT_FAIL_MODE_DB_ID (number[10]) (PK) |
| IMPORT_FAIL_MODE_CD (varchar[16]) (PK) |
| DESC_SDESC (varchar[80]) |
| DESC_LDESC (varchar[4000]) |

| REF_DPO_XFER_EXP_STATUS |
|---|
| EXP_STATUS_DB_ID (number[10]) (PK) |
| EXP_STATUS_CD (varchar[16]) (PK) |
| DESC_SDESC (varchar[80]) |
| DESC_LDESC (varchar[4000]) |

| REF_DPO_XFER_IMP_STATUS |
|---|
| IMP_STATUS_DB_ID (number[10]) (PK) |
| IMP_STATUS_CD (varchar[16]) (PK) |
| DESC_SDESC (varchar[80]) |
| DESC_LDESC (varchar[4000]) |

| REF_DPO_XFER_EXP_INV_STATUS |
|---|
| EXP_INV_STATUS_DB_ID (number[10]) (PK) |
| EXP_INV_STATUS_CD (varchar[16]) (PK) |
| DESC_SDESC (varchar[80]) |
| DESC_LDESC (varchar[4000]) |

| REF_DPO_XFER_IMP_INV_STATUS |
|---|
| IMP_INV_STATUS_DB_ID (number[10]) (PK) |
| IMP_INV_STATUS_CD (varchar[16]) (PK) |
| DESC_SDESC (varchar[80]) |
| DESC_LDESC (varchar[4000]) |

Import File Details  File-2-20090228-129 [E0002562] — 3602
                                                               — 3610

Import File

File Name: File-2-20090228-129 —— 3612        Export ID: E0002562 —— 3614
Status: FAILED (Failed) —— 3616

3620 — [Details] [Received Inventory]

File Information

3622

3626 —— Export Date: 28-FEB-2009 13:36 EST        Import Date —— 3628
Source Location  YYZ/Dock —— 3630               Shipment ID: S0002562 —— 3632
Original Target Location  YOW/Dock2 —— 3634     Receiving Location  YOW/Dock2 —— 3636

Status

3624

3638 —— Backup: ☐                3642 —— Error Message: Error Code Msg...
3640 —— Failure Mode: VALIDATE (Validating data in staging)   Inducted Inventory 2 of 5 —— 3644

[Details] [Received Inventory]

| Part Name | Status | OEM Part No | Qty | Serial No / Batch No | Failure Mode | Error Message |
|---|---|---|---|---|---|---|
| Support Fitting Assy | INPROGRESS | 00123 | 3 EA | BN 123 | VALIDATION | Error Code Msg... |
| Hydraulic Pump | QUEUED | 4941 | 1 EA | 99987 | VALIDATION | Error Code Msg... |
| Hydraulic Pressure Hose | FAILED | 54651-2 | 1 EA | 123456 | VALIDATION | Error Code Msg... |
| High Stage Valve | INDUCTED | 654654 | 1 EA | 03248 | - | |
| LPT Case | INDUCTED | 8799 | 1 EA | 13846 | - | |

3662    3664    3666    3668    3670    3672    3674

METHOD AND SYSTEM FOR DEPLOYED OPERATIONS SUPPORT

The invention is generally related to operations support systems and more specifically, to a method of and system for deployed maintenance operations for equipment or assets.

BACKGROUND OF THE INVENTION

Operations support systems exist to provide efficient monitoring and support of line, heavy, shop maintenance, engineering, materials management, finance and other aspects of aviation and other fields. Existing web-based operations support systems can be spread over large geographies, but only insofar as each part of that organization can remain fully-connected to the central server or data centre. Attempts have been made to provide such a system in a deployed manner, by having multiple, complete, instances of the software deployed and carefully managing (manually) which instance has custody over which assets and the periodic resynchronization between them.

Such systems have several issues which make them ineffective or at least very inefficient, the main one being synchronization. When a site is deployed, they are granted control over the assets being deployed, meaning that conflicts with other sites are reduced (someone cannot 'accidentally' edit data for an asset that belongs to another site). But having multiple individual installations of the software means synchronization is manual and conflict resolution is very complex.

Another aspect to the synchronization problem is environment setup. In some systems it is important, for example, to track 'allowable configuration' (in simple terms, what is allowed to be installed on an aircraft or component) and the 'maintenance program' (that is, what needs to be done to keep the asset airworthy). With two separate complete installations, keeping these synchronized is very difficult, and the implications of not doing so are that it may be difficult or impossible to align the two systems.

Existing systems do not provide adequate solutions to these problems. There is therefore a need for an improved method of and system for providing deployed operations support.

SUMMARY OF THE INVENTION

It is an object of the invention to provide an improved method of and system for providing deployed operations support.

As noted above, existing web-based systems support organizations may be spread over large geographies, but only insofar as each part of that organization can remain fully-connected to the central server or data centre. The Maintenix Deployed Operations system described herein, on the other hand, allows portions of the organization to operate for long periods of time without a dedicated connection (for example, in the event of deployment of a wing of F18s to an aircraft carrier in a wartime environment) while keeping technical records accurate.

The Maintenix system allows a customer to set up what is referred to as a 'deployed site', which is effectively a Maintenix environment that operates as a copy of the master site and is only allowed to operate on a specific subset of the assets in the system (say, a fleet of aircraft). This second Maintenix environment has all the required configuration and transactional data to run as a standalone system until the deployment is no longer required. At that time, the deployed site can be decommissioned by transferring assets to other sites that share the same master, deployed or not.

The updates can also be done incrementally, either by file or using a network. When using a network, the updates accumulated at a master site will be pushed to the deployed sites when connectivity is available. File based updates on the other hand do not require a network at any time. Data transfers between sites are as follows:

a master site publishes its baseline data to a deployed or consolidator site;

a deployed site publishes its operational data deltas to one consolidator;

a consolidator can publish its data to other consolidators; and a deployed site can transfer assets between other sites sharing the same master.

These data transfers are unidirectional for baseline publishing and consolidation. Inventory Transfer allows assets to be transferred between deployed sites and they can come back to the originator at some point. Thus, it is possible to operate a site in such a way as to have a one-year deployment where monthly updates are being sent from the master to the deployed site and between the deployed site and a consolidated site (note that the terms "consolidator" and "consolidated site" are both used in this description and are interchangeable).

Also, the Maintenix system can support multiple deployed sites per master site, and provide the ability to pull data from all of the deployed sites into a single consolidated site for reporting on a fleet-wide basis.

Thus, the system described herein provides a seamless, integrated environment for managing forward deployed maintenance operations, including:

accurately forecasting maintenance, parts, and resource requirements in preparation for deployment;

rapidly assessing the levels of mission readiness of deployable assets and resources;

fully enabling maintenance and operations while detached—indefinitely—from other sites, with no network availability;

effectively planning and executing maintenance in-theater, based on real-time mission and asset utilization data, resource and parts availability; and gaining real-time Total Asset Visibility (TAV) of globally deployed assets, including actual in-service asset status, condition, utilization rates, maintenance, fault data and costs.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

These and other features of the invention will become more apparent from the following description in which reference is made to the appended drawings wherein:

FIG. 31 presents new reference tables being used with the graphic user interface, in accordance with an embodiment of the invention;

FIG. 35 presents a screen capture of a search interface, in accordance with an embodiment of the invention; and FIG. 36 presents a screen capture of an import file report, in accordance with an embodiment of the invention.

1.0 BRIEF DESCRIPTION OF THE PREFERRED EMBODIMENTS OF THE INVENTION

Figure 1:
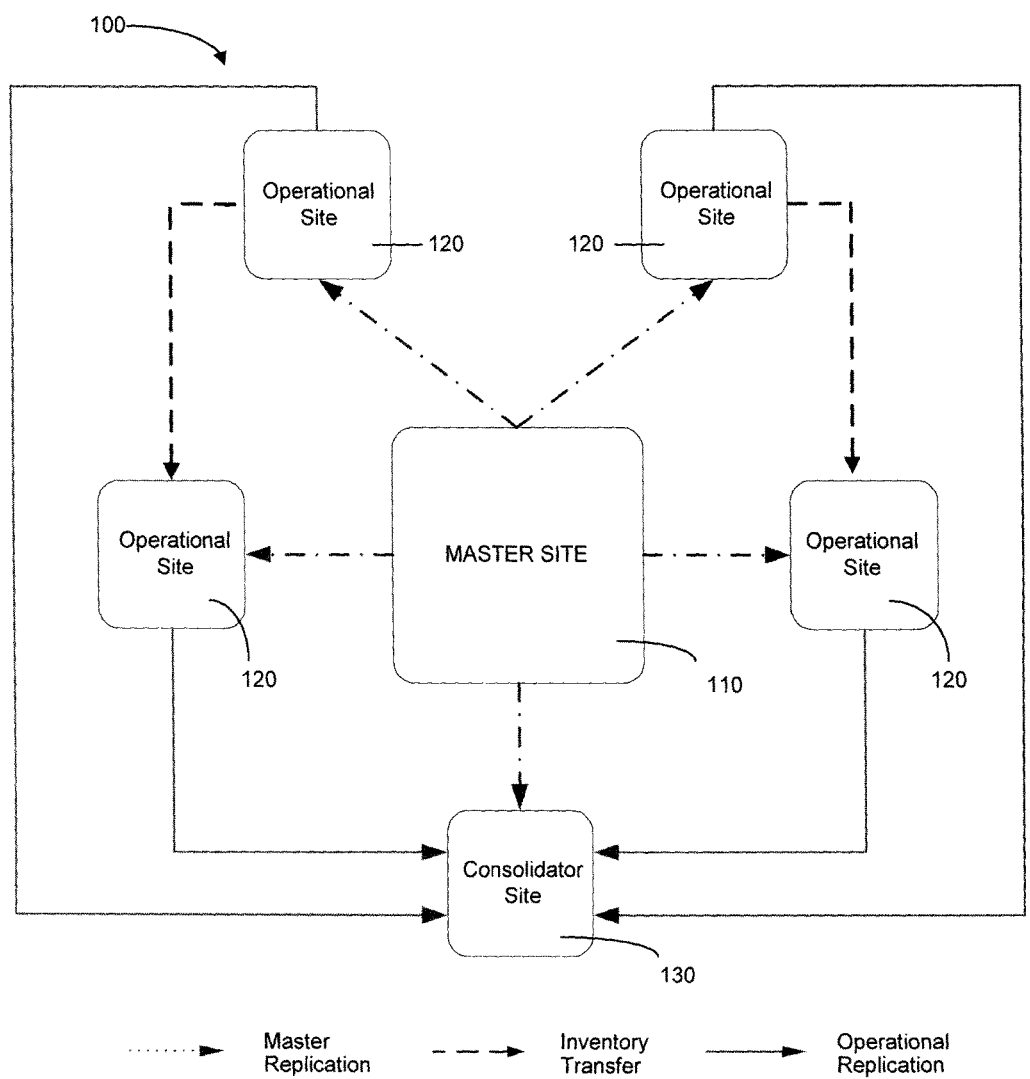
FIG. 1 presents a block diagram of a "single-level" deployed system, in accordance with a general embodiment of the invention.

One or more currently preferred embodiments have been described by way of example. It will be apparent to persons skilled in the art that a number of variations and modifications can be made without departing from the scope of the invention as defined in the claims.

1.1 Baseline Publishing

In the system of the invention, the term 'baseline' refers to template or rules data that specify the behavior with which the system is expected to behave. It outlines such elements as what can be installed on an aircraft, what maintenance can/should be performed, governs the standards by which maintenance execution is carried out, and so on.

A key part of managing a deployed environment is ensuring that each deployed site is working to a consistent ruleset with the master site. The process of synchronizing the baseline rules is referred to as "baseline publishing".

In the Maintenix Deployed Operations environment, the baseline is maintained at the master site. When changes occur at the Master site, they are queued up until the next time the deployed sites gain connectivity. These changes are then applied at the deployed sites. This maintains consistency of rulesets across the deployed environment.

1.2 Inventory Transfer

The master site is the repository for the rules and configuration of the system. The deployed sites are where the inventory assets reside. Through the course of the lifecycle of these assets, they will periodically need to move from site to site (aircraft moving from one base to another, parts being routed for repair, etc). The process that accommodates this is referred to as "Inventory Transfer".

When an inventory item is to be moved from one site to another, the Deployed Operations module within the Maintenix system allows a user to export the details of that inventory to a file. From there, it can be imported at the destination site.

1.3 Consolidation

In a deployed environment, it is very difficult to obtain an effective overview of the status of an entire fleet, across a set of deployed sites. Consolidation refers to the ability of a deployed site to push its information to a 'consolidated site', in such a way as to build a single repository for reporting on the entire set of assets in an organization.

As noted above, the existing attempts at providing such a system are inadequate. For example, having multiple, complete, instances of the software deployed and attempting to manually manage which instance has custody over which assets has serious problems with synchronization. When a site is deployed, they are granted control over the assets being deployed, meaning that conflicts with other sites are reduced (someone cannot 'accidentally' edit data for an asset that belongs to another site). Having multiple individual installations of the software means synchronization is manual and conflict resolution is very complex.

The second part of the synchronization problem is environment setup. In systems such as the Maintenix system, it is important, for example, to track 'allowable configuration' (in simple terms, what is allowed to be installed on an aircraft or component) and the 'maintenance program' (that is, what needs to be done to keep the asset airworthy). With two separate complete installations, keeping these synchronized is very difficult, and the implications of not doing so are that it may be difficult or impossible to align the two systems. The Maintenix system, on the other hand, takes the point of view that the 'master' site is the owner of the rules, and those rules are published to the deployed sites whenever connectivity allows. This helps to ensure that each deployed site operates the same way under the same principles.

The system is described in greater detail in the following sections entitled:
Deployed Operations Concept (sections 2 and 3);
Deployed Operations—Consolidation Concept (sections 4, 5 and 6); and
Deployed Operations—Inventory Transfer Concept (section 7).

1.4 Managing Fleet Maintenance Across a Distributed Network of Globally Deployed Sites with Maintenix Deployed Operations Fleet management during operational deployment presents a unique set of challenges, as each site—whether permanent or temporary in nature—must be able to operate as a standalone entity. Users and assets often move between the disconnected sites, without a network connection to facilitate the associated information system updates. Visibility of assets, including their current status and location, is also desired at a central site. Current fleet management solutions do not keep pace with the demands of fully deployed operations. The systems are typically built to run with a single database, which impedes the operational and information management capabilities of the field sites, and impairs headquarters' visibility of in-field activities.

With its Deployed Operations feature, the Maintenix system offers an advanced and innovative solution to address these challenges. The Deployed Operations feature allows the Maintenix system to be implemented and operated as a distributed system with a central "master" site, multiple in-field "satellite" sites, as well as consolidator sites offering stakeholders a global view of their deployment. This enables autonomous in-field operations, while ensuring that senior stakeholders at operational headquarters have complete, accurate information for timely and effective decision making.

For defense organizations managing globally deployed maintenance, and for Original Equipment Manufacturers (OEMs) providing Performance Based Logistics (PBL) contracts, the Maintenix system offers a solution that is unmatched in the industry today.

1.5 Superior Fleet Management Across a Distributed Network

The Deployed Operations system provides superior fleet management across a distributed network, ensuring an unprecedented level of in-field autonomy when network connectivity is absent, without sacrificing centralized visibility of information critical to effective decision making. Using its distributed architecture with "master" and "satellite" systems, the system supports the maintenance and operations cycle of aircraft and inventory deployed to global operational locations. The system sustains autonomous in-field operations and maintenance, as well as centralized management and reporting. This involves capturing operations data and managing maintenance planning and execution in the "satellite" system at each site. Consolidated visibility is provided by one or many consolidator sites. The master site controls the baseline and the consolidator site shows what operational data is present across the full deployed network against that baseline. The master site also controls configuration templates and maintenance programs for the fleet, and has the ability to push baseline changes to the deployed sites. The system may be implemented with any number of tiers or levels in the hierarchy of Consolidators.

Taking into account limited communications and intermittent network connectivity during most remote deployments, this solution allows both network and file-based data transfers between operational sites, while maintaining data integrity and mission security.

1.6 Achieve Affordable Readiness

The system includes a full maintenance management software suite that provides an integrated, intelligent solution for Defense and OEM maintenance organizations. Focused on providing TAV (Total Asset Visibility) of globally deployed assets, the system allows organizations to rapidly assess mission readiness, and react to in-theatre events more effectively with the parts and maintenance required to keep assets flying affordably.

1.7 Features

Features of the exemplary system described herein, include the following:
Forecasting of deployed maintenance requirements;
Centralized management and control of maintenance programs, compliance, and allowable configurations Management of Time Control Technical Orders (TCTOs), Airworthiness Directives (ADs), Service Bulletins (SBs), and Engineering Orders (EOs);
Automated push of updates to in-field operational sites;
Support for autonomous field operations at permanent or temporary deployed sites;

Quick creation and effective management of temporary operational sites;

Full system functionality while detached from other sites, with no network availability;

Real-time tracking of usage, utilization rates, maintenance, faults, and costs;

Transfer of inventory assets between deployed sites;

Maintenance of technical records;

Management of baseline inventory control;

Central repository for analytical reporting; and

Data backup, conflict handling, and resolution.

The deployed operations system has several aspects working together to form a distributed solution. The main aspects are as follows:

Distributed database infrastructure and configuration;

Baseline publishing;

Inventory transfer; and

Consolidation of data.

2.1 Single Level Distributed Scenario

In a single level scenario, all operational and consolidated sites are directly connected to a master site that controls all aspects of the baseline and organization model. The operational data is controlled by the operational sites, which replicate any changes made to their respective data to a consolidated site. The consolidated database offers a global view of the various operational sites data.

In the example 100 illustrated in FIG. 1, a central authority, the master site 110, controls the master data as well as the configuration of the deployed network. Changes to master data are replicated to the operational sites 120 as needed. When ITAR (International Traffic in Arm Regulation) is applicable, rules are used to control which master data is replicated to each operational site 120.

When dealing with operational sites 120 that can be deployed with limited or no network connection to the master site 110, the propagation of the data between the master site 110 and its various operational sites 120 can be effected with file transfers. These files can be either FTP'd when network connectivity is available or sent to the target site via a physical media. The same principle is applicable when replicating operational data between an operational site 120 and a consolidated site 130.

Another aspect of the deployed solution is Inventory Transfer. Inventory Transfer is the act of taking an inventory item and sending it to another database. This is done by removing the data associated with the specific item from one database and inserting it into another database.

The details surrounding the various technologies and process used for data replication and inventory transfer are presented in the appropriate sections of this document.

2.2 Replication

One of the main components of the distributed architecture is data replication. Data replication is the process of sharing information between systems to ensure that the content is consistent between two or more databases. It involves the capture of data that changed locally, its transmission to the other databases and the application of those changes at the target database with the associated error handling and conflict resolutions.

In a deployed operations scenario, it is common for a site to be deployed to a location with limited bandwidth or even no network connection at all for an extended period. A good example for this situation is a ship at sea using satellite links for network connections. In this situation, network connection speed can range from 768 Kbps to as low as 64 Kbbs. Such network connections can also have a high latency and an error rate exceeding the norm. Replicating data in those network conditions can be extremely difficult because of the amount of data to transfer as well as the lag introduced by the high network latency. Conflict resolution is also a challenge since a site can be disconnected for a long period from the network, which introduces the risk of the same data records being modified locally and at other sites repeatedly before it can be replicated.

Replication in deployed operations is unidirectional in that changes are dictated by a master, and do not flow from an operational site to a master. This disallows any changes in an operational site to affect the master site 110.

2.2.1 Oracle Streams

Figure 2:
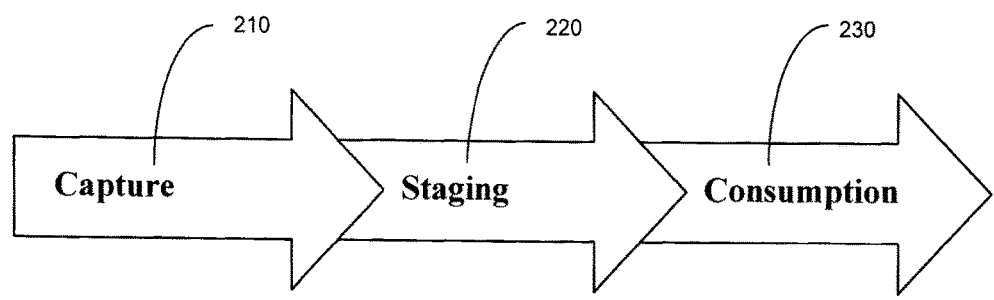
FIG. 2 presents a process flow diagram for Oracle Streams, as applied to a general embodiment of the invention.

The basic technology that is used to replicate data between the master site 110, the operational sites 120 and the various consolidated sites 130 is named Oracle Streams. Oracle Streams is an Oracle component that allows data sharing between databases. In Oracle Streams, units of shared information are encapsulated in messages that can be shared in a stream with multiple destinations. You can easily control what information is captured and put in a stream, how the stream flow is routed and how the messages are applied on the target database. As shown in FIG. 2, these are referred to as capture 210, staging 220 and consumption 230 processes.

Changes to data are captured by a capture process 210 that does hot mining of the redo logs. It can also process archived redo logs if the capture process 210 is shutdown or lagging behind. Changes are captured and made available for propagation as soon as the transaction is committed. Data Manipulation Language (DML) changes are captured and enqueued in a staging area 220 where a propagation process will route the messages to a configured destination. DML is a form of computer language used by programs and database users to insert, delete or update data in a database.

At the destination, an apply process will de-queue the messages and apply the changes to the target database. These changes can automatically be applied by the default "apply" process or custom apply procedures can be provided to handle Logical Change Records (LCR). It is also possible to have a combination of both.

The same principle is used for conflict resolution. Conflicts can automatically be resolved by the pre-built handlers or a custom handler can be provided. Again, it is possible to have a combination of both, controlled by rules.

The Oracle Streams replication component offers many features that are beneficial to the kind of data replication required for Deployed Operations. It however uses a Queue-to-Queue propagation over a network to propagate changes from database to database. The problem with this kind of data propagation over a network with high latency and limited speed is that the handshake needed and transport method is just too verbose, requiring acknowledgment for any packet transferred. This would result with a propagation process that experiences many timeouts, is extremely slow and will ultimately fail. Because of those network conditions and the fact that it is possible to have a site configuration that has no network connections to its master site 110 or consolidated site 130, a custom file based transport is required. That is, rather than expecting data transfer to occur in real time, data transfer records are stored in files, for transfer when communication is available. Having a file base transfer also makes it possible to be disconnected for a long period without affecting the performance of the system. The changes required to the Oracle Streams to affect this system are described hereinafter.

2.2.2 Deployed Operation Replication Overview

In this section, an overview of a typical setup between a master site 110, operational site 120 and consolidated site 130 is presented. The specifics of configuring and creating site-to-site replication are discussed in the Replication, Configuration and Setup section.

There can be many operational sites 120 associated with a master site 110 and the specifics of that situation will be described where appropriate. The replication is unidirectional from the master site 110 toward the operational sites 120 and from the operational sites 120 to the various consolidated sites 130. Enforcing unidirectional replication greatly limits the places where conflicts can occur.

Figure 3:
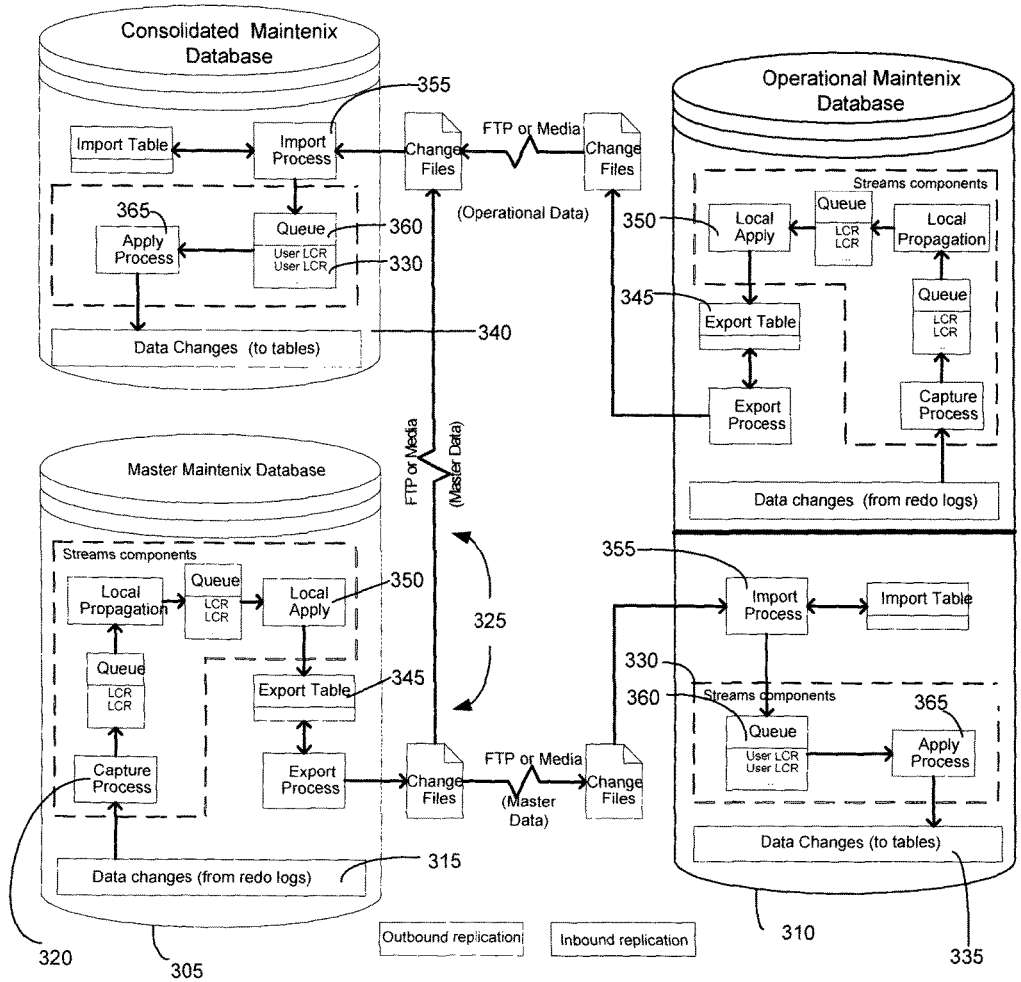
FIG. 3 presents a block diagram of file-based data flow for the system, in accordance with a general embodiment of the invention.

A general overview of the data flow between various sites is presented in FIG. 3. The configuration of each specific node type is defined in the section.

2.2.2.1 Local Capture

The capture process is configured by rules to gather changes only on tables that need to be replicated. At a master site 110, these tables are usually containing the baseline data as well as some other control data. This data is known as Master Data.

At an operational site 120, the changes that are captured are the one affecting "actuals" data as well as some other custom data. This data is referred to as Operational Data.

When changes are done to a master database 305 or operational database 310, entries containing the change vectors are created in the redo logs 315 once the transaction is committed. A capture process 320 mines the redo logs 315 to gather all data changes done by that transaction. When a captured data change satisfies a set of rules indicating that change should be replicated, a Logical Change Record (LCR) is created and inserted in a queue, waiting for propagation to occur. There is usually only one capture process on a database irrelevant of the number of configured target sites.

In the case of Deployed Operations, these changes also have to be propagated by files to operational and consolidated sites 325. For each file based site replication, a local propagation and local apply process is defined with their associated queues. This is done to keep the same approach that would be used if we were dealing with a normal, non-file based streams replication. This makes it easier to maintain and administer.

In addition, each operational and consolidated site replication path has its own directory for storing outgoing files until they are distributing to the various sites (335 and 340 respectively). It is important to have separate "drop-boxes" for files since different organizations may be part of the deployed operation network and it is generally important that these organizations do not have access to someone else's files.

The propagation and apply processes are configured with rules that define which tables are replicated to which specific site as well as determining the rows that can be replicated. Rules are created and associated with the propagation to filter out changes that should not be replicated.

2.2.2.2 Local Export

As the system is replacing real-time propagation between sites, with a file-based transport process, an export feature is used to extract the LCRs, save them in files in the proper order and transfer them to a remote site as needed.

Since each local propagation and apply process is specific to a particular master→operational or operational→consolidated replication path, it is possible to configure the propagation to only process records destined to the deployed site and for the local apply process to insert the record into a site-specific export table 345. The local apply process 350 may also be configured to have a finer control over which data is replicated to the remote site if needed.

A site-specific scheduled process may automatically be triggered at specific intervals to gather all the appropriate data from the export table and put it in a file. The DataPump API is used to generate the file containing all the LCRs records ready for export. This Oracle API provides a high-speed mechanism to load or extract data from a database.

2.2.2.3 Remote Import

The import process 355 takes care of importing the LCRs and enqueuing them for Oracle Streams to process.

This procedure loads data from the file, creates LCRs in the appropriate order and adds them to the Oracle Streams apply queue 360. Once the records are in the apply queue 360, the Oracle Streams "apply" process 365 takes over and updates the database.

2.2.2.4 Remote Apply

The apply process 365 is an Oracle Streams component that retrieves LCR messages from its associated queue 360 and applies the row change contained in the LCR to the appropriate tables 335, 340.

3 Software Concept

3.1 License Feature

The deployed operation preferably offers a license structure that allows the system to differentiate the various site types. Some features may only be offered for a particular site type and not to others. For example, only a licensed master site can create operation sites.

The license features for deployed operations is named DPO_MASTER_ADAPTER, DPO_OPERATIONAL_ADAPTER and DPO_CONSOLIDATED_ADAPTER. Note that a site may have more than one feature licensed at any given time.

When the application server starts, the license validation process also validates that the current database defined for the application server has the proper license for the type of database defined in MIM_DB.

3.2 Parameters and Roles

Specific configuration parameters are required to control the deployed operation actions in the Maintenix system. The following configuration parameters are created in UTL_CONFIG_PARM:

| Name | Type | Category | Description |
|---|---|---|---|
| ACTION_DPO_INV_EXPORT | SECURED_RESOURCE | Deployed | Permission to export an aircraft or shipment in deployed ops |
| ACTION_DPO_INV_IMPORT | SECURED_RESOURCE | Deployed | Permission to import an aircraft or shipment in deployed ops |
| ACTION_DPO_MONITOR_REP | SECURED_RESOURCE | Deployed | Permission to monitor the deployed operation replication status |

The values and default values are set to false for all the configuration parameters defined above.

The following roles are created as 10 level data in the UTL_ROLE and have the associated parameters enabled in UTL_ROLE_PARM:

| Code | Name | Associated Parameter |
|---|---|---|
| DPO_ADMIN | Deployed Operation Administrator | ACTION_DPO_MONITOR_REP |
| DPO_OPERATOR | Deployed Operation Operator | ACTION_DPO_INV_EXPORT ACTION_DPO_INV_IMPORT |

3.3 Distributed System

The system of the invention supports the following distributed system template:

Replication: Act of copying data from a source to a target.

Transfer: Act of moving data from a source to a target.

Master Site: The master site 110 is the only site where the controlled master data can be modified. The master site 110 does not contain any operational data.

Operation Site: Operational sites 120 cannot make any changes to the controlled master data with the exception of a few entities. However, these sites can edit both mutable master data as well as the operational data.

Consolidated Site: Consolidated sites 130 do not have any privileges to modify any data except for defining their own authorities list. Upon data consolidation, the consolidated sites 120 handle data conflicts and resolve any redundant data that may get replicated from the deployed sites.

Figure 4:
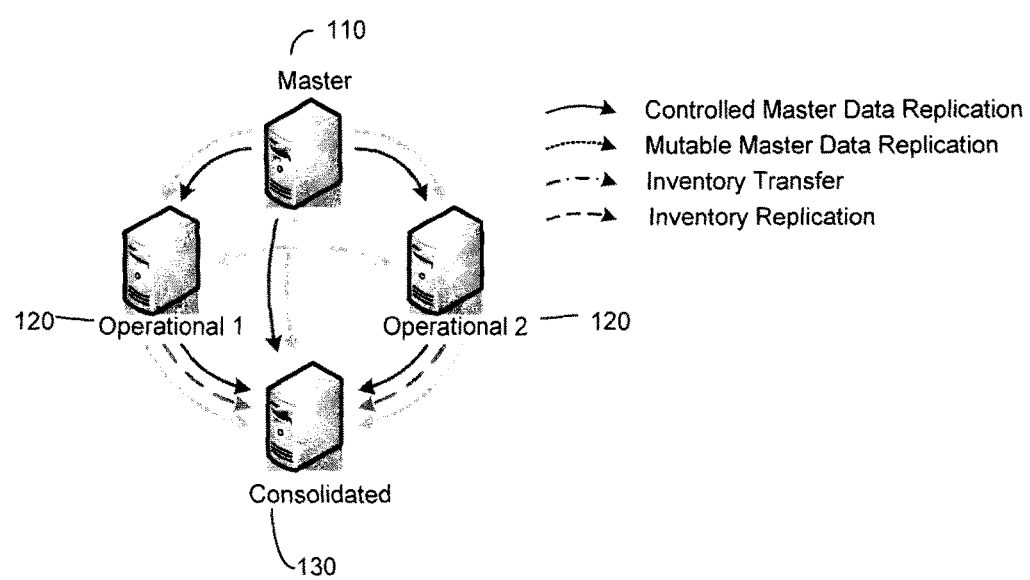
FIG. 4 presents a block diagram of the controlled, mutable and inventory data flow between master, operational and consolidator sites, in accordance with an embodiment of the invention.

The corresponding data flow is presented in FIG. 4, where:

the master site 110 may replicate controlled and mutable master data to the operational sites 120 and consolidated sites 130;

the operational sites 120 may transfer inventory data between one another; and the operational sites 120 may replicate controlled master data, mutable master data, and inventory data to the consolidated site 130.

The system of the invention may be implemented on a typical application server environment such as Websphere, Weblogic and Geronimo. The system also allows different application servers to be used throughout the deployed network. Different sites may want to host the system of the invention on application servers they support, which may result in a mixed system where different application server environments are used at different sites.

3.4 Database Types

For each database, their type (master, operational, consolidated) must be identified. To distinguish one database type from another, the content of the database type reference term table (REF_DB_TYPE) may be updated as follows:

| TYPE_CD | DESC_SDESC | DESC_LDESC |
|---|---|---|
| MASTER | Master | A database identifier used to represent a master database. |
| OPER | Operational | A database identifier used to represent an operational database. |
| CONSOL | Consolidated | A database identifier used to represent a consolidated database. |
| SYS | System | A database identifier used to represent internal, Maintenix data. |

The database at a master site 110 contains a row in MIM_DB that corresponds to their local DB_ID (MIM_LOCAL_DB), and it has the database type of MASTER.

The database at an operational site 120 contains a row in MIM_DB that corresponds to their local DB_ID (MIM_LOCAL_DB), and it has the database type of OPER.

The databases at a consolidated site 130 contains a row in MIM_DB that corresponds to their local DB_ID (MIM_LOCAL_DB), and it has the database type of CONSOL.

For all non-deployed installations of the Maintenix system, the database contains a row in MIM_DB that corresponds to their local DB_ID (MIM_LOCAL_DB), and it has the database type of SYS.

3.5 Database Lists

The master site 110 has an exhaustive list of all operational sites 120 and consolidated sites 130 in the distributed system. This list is stored in the MIM_DB table. Operational sites 120 should only have their master site 110 and consolidated site 130 information. The MIM_DB table should ensure that the db-id is unique and cannot be re-used. The content of the MIM_DB table at the master site 110 is not replicated.

The system allows assignment of a unique "database identifier" to every deployed database. The system may validate that this database identifier is unique and prevent the creation of multiple databases using the same database identifier.

3.6 Deployed Operation Initial Setup

The Deployed Operation feature is part of the Maintenix system but since it is using Oracle enterprise as well as other technologies, some additional steps are required after the normal Maintenix installation to make it "Deployed". The assumption is that the instance is configured to host Oracle Streams manually and the initial setup script will only validate that the minimal requirements are present.

This section describes what the initial setup procedure does:

- Creates the DPO_ADMIN role to hold permissions assigned to DPO_ADMIN;
- Creates the DPO_ADMIN database user and assigns the DPO_ADMIN and any other roles required (streams roles, etc.);
- Compiles the Oracle Enterprise only stored procedure if any;
- Performs additional operations and validations as required by Oracle Streams. The assumption is that the instance is configured to host Oracle Streams manually and the initial setup script will only validate that the minimal requirements are present; and
- If the site is an operational site type, makes sure that the CDC ("change data capture") minimal requirements are present.

3.7 Replication Configuration and Setup

This section documents how the various replication paths are created, maintained and monitored. It also documents the various database changes as well as what operational and administrative scripts and procedures are required.

When configuring a deployed network, each site is configured as either a source or a target in a replication path. Some sites are also configured as both a source and a target. For example, a master site 110 is configured as a source. An operational site 120 is both a target and a source while a consolidated site 130 is only a target. When the setup procedures are created, they have to take into account the type of sites to generate the appropriate configuration code.

3.7.1 Data Model Changes

The following tables are used to configure and log information about the various replications paths used in a deployed operations network. They are used by the configuration procedures to generate the initial operational and consolidated database extracts and Oracle Stream configuration. They are also used to log information about the deployed operation network import-export processes.

Figure 5:
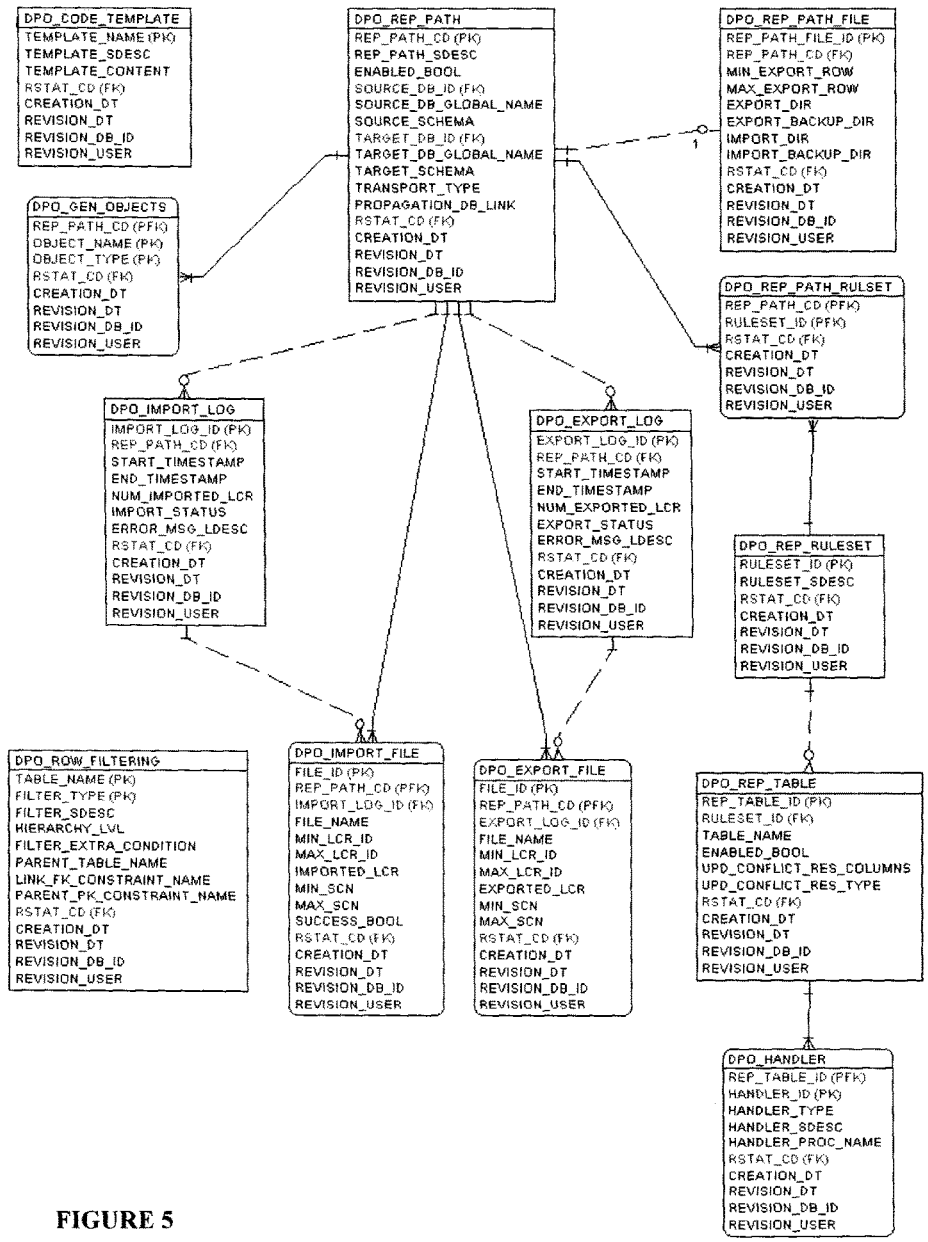
FIG. 5 presents the data model for the deployed operations system, in accordance with an embodiment of the invention.

FIG. 5 presents a diagram of the data model. Each of the tables of FIG. 5 is described below.

3.7.1.1 DPO_REP_PATH

This is a configuration table that contains the various replication paths that make up the deployed operation replication network. Each row contains information about a specific replication path from source to target, for example, defining one replication path from a master database to a specific operational site.

| Key | Column name | Data type | Not Null | Description |
|---|---|---|---|---|
| PK | REP_PATH_CD | Varchar2 (8) | YES | Unique identifier for a replication path; This is also used as a prefix for all generated objects applicable to that replication path. |
|  | REP_PATH_SDESC | Varchar2 (80) | YES | Description of the replication path |
|  | ENABLED_BOOL | Number (1, 0) | YES | Boolean indicating if the replication is initially enabled for this path when created. This is 1 (enabled) by default |
| FK | SOURCE_DB_ID | Number (10, 0) | YES | DB_ID of the source database in the replication path |
|  | SOURCE_DB_GLOBAL_NAME | Varchar2 (255) | YES | Global name of the database used as the source; |
|  | SOURCE_SCHEMA | Varchar2 (30) | YES | Name of the source schema |
| FK | TARGET_DB_ID | Number (10, 0) | YES | DB_ID of the target database in the replication path |
|  | TARGET_DB_GLOBAL_NAME | Varchar2 (255) | YES | Global name of the target database |
|  | TARGET_SCHEMA | Varchar2 (30) | YES | Name of the target schema |
|  | TRANSPORT_TYPE | Varchar2 (10) | YES | Can only be 'QUEUE', 'FILE' or 'EXPORT'. This is the mode the replication will use to transfer data. When QUEUE is chosen, the source and target must be reachable by network connectivity. (LAN, WAN) When FILE or EXPORT is chosen, additional information in DPO_REPLICATION_FILE is provided. EXPORT indicates that the data is transported as a full DB export. This is only available from an operational to a consolidated site. |
|  | PROPAGATION_DB_LINK | Varchar2 (30) | YES | Oracle DB link name used by a queue-to-queue propagation. This DB link has to be created with the proper privileges before it can be used. |

3.7.1.2 DPO_REP_PATH_FILE

This configuration table contains additional information required about a replication path when its transport is defined as FILE or EXPORT.

| Key | Column name | Data type | Not Null | Description |
|---|---|---|---|---|
| PK | REP_PATH_FILE_ID | Number (10) | YES | Unique identifier for a file transport information record |
| FK | REP_PATH_CD | Varchar2 (8) | YES | The path CD associated with this replication path file configuration |
|  | MIN_EXPORT_ROW | Number | NO | Minimum number of rows that must be ready for export for the file export process to generate a file. Default is 0 |
|  | MAX_EXPORT_ROW | Number | NO | Maximum number of rows that should be exported to a single file by the export process; Default is 100 000. |
|  | EXPORT_DIR | Varchar2 (30) | NO | Oracle directory name where the export files will be generated for the specific replication path. This directory has to be created with the proper privileges before it can be used |
|  | EXPORT_BACKUP_DIR | Varchar2 (30) | NO | Oracle directory name where backups of the generated export files are created; if null, no backup files are created. This directory has to be created with the proper privileges before it can be used |
|  | IMPORT_DIR | Varchar2 (30) | NO | Oracle directory name where the files to import are located for the specific replication path. This directory has to be created with the proper privileges before it can be used |
|  | IMPORT_BACKUP_DIR | Varchar2 (30) | NO | Oracle directory name where backups of the processed import files are created; if null, no backup files are created. This directory has to be created with the proper privileges before it can be used |

3.7.1.3 DPO_REP_TABLE

This configuration table contains the name of the tables that should be replicated as well as additional information on how that specific table replication is performed. Tables that are replicated are associated with a specific ruleset that controls a "set" of table's replication.

| Key | Column name | Data type | Not Null | Description |
|---|---|---|---|---|
| PK | REP_TABLE_ID | Number (10, 0) | YES | Unique identifier for a replication table configuration |
| FK | RULESET_ID | Number (10, 0) | YES | ID of the associated ruleset |
|  | TABLE_NAME | Varchar2 (30) | NO | Name of the table to replicate |
|  | UPD_CONFLICT_RES_COLUMNS | Varchar2 (255) | NO | Columns list separated by a comma applicable to the update conflict resolution |
|  | UPD_CONFLICT_RES_TYPE | Varchar2 (10) | NO | Type of prebuilt update conflict resolution for the table; It can have a value of 'OVERWRITE', 'DISCARD', 'MAXIMUM' or 'MINIMUM' |
|  | ENABLED_BOOL | Number (1, 0) | YES | Boolean indicating if the rule for this table is initially enabled when created |

3.7.1.4 DPO_REP_RULESET

This table contains the various rulesets available to the DPO_REP_TABLE for rule grouping and that can be associated with the DPO_REP_PATH_RULESET table:

| Key | Column name | Data type | Not Null | Description |
|---|---|---|---|---|
| PK | RULESET_ID | Number (10, 0) | YES | Unique identifier for a ruleset |
|  | RULESET_SDESC | Varchar2 (80) | YES | Ruleset description |

This table should be initially populated with the following zero level data:

RULESET_ID = 1, RULESET_SDESC = 'Master Data'
RULESET_ID = 2, RULESET_SDESC = 'Operational Data'
RULESET_ID = 3, RULESET_SDESC = 'CDC Data'
RULESET_ID = 4, RULESET_SDESC = 'Custom Data'

3.7.1.5 DPO_REP_PATH_RULESET

This link table is used to associate which rulesets are replicated by a specific replication path.

| Key | Column name | Data type | Not Null | Description |
|---|---|---|---|---|
| PK | REP_PATH_CD | Varchar2 (8) | YES | Unique identifier for a replication path |
| PK | RULESET_ID | Number (10, 0) | YES | Unique identifier for a ruleset |

3.7.1.6 DPO_HANDLER

This table contains information about various handlers that can be configured to be a handler in the Oracle Streams capture/apply processes.

| Key | Column name | Data type | Not Null | Description |
|---|---|---|---|---|
| PK | REP_TABLE_ID | Number (10, 0) | YES | Table ID associated with this specific handler |
| PK | HANDLER_ID | Number (10, 0) | YES | Unique identifier for the handler entry |
|  | HANDLER_TYPE | Varchar2 (15) | YES | Type of handler; valid values are: 'DELETE', 'INSERT', 'UPDATE', 'ERROR' or 'CUSTOM_CONFLICT' |
|  | HANDLER_SDESC | Varchar2 (80) | NO | Description for this handler |
|  | HANDLER_PROC_NAME | Varchar2 (255) | YES | Name of a procedure which is registered as a handler |

This table should be initially populated with default conflict resolution entries as level zero level data.

3.7.1.7 DPO_IMPORT_LOG

This table is used by the file based import process to log information about the import process execution. One row is generated for each execution of the import process for a specific replication path.

| Key | Column name | Data type | Not Null | Description |
|---|---|---|---|---|
| PK | IMPORT_LOG_ID | Number (10, 0) | YES | Unique identifier for an import process log entry |
| FK | REP_PATH_CD | Varchar2 (8) | YES | Replication path CD associated with the import process execution |
|  | START_TIMESTAMP | Timestamp | YES | Timestamp taken at the time the import process was started |
|  | END_TIMESTAMP | Timestamp | YES | Timestamp taken at the time the import process was completed |
|  | NUM_IMPORTED_LCR | Number | NO | Number of LCR that were imported by the import process execution |
|  | IMPORT_STATUS | Varchar2 (10) | YES | Status of the import process; valid values are 'NO_IMPORT', 'SUCCESS', 'ERROR', 'PARTIAL' or 'RUNNING' |
|  | ERROR_MSG_LDESC | Varchar2 (4000) | NO | Error or warning message associated with the import process execution. |

3.7.1.8 DPO_IMPORT_FILE

This table contains control and log information about the files loaded by the import process:

| Key | Column name | Data type | Not Null | Description |
|---|---|---|---|---|
| PK | FILE_ID | Number (10, 0) | YES | ID of the file. It is unique for a given replication path code |
| PKF | REP_PATH_CD | Varchar2 (8) | YES | Replication path code associated with the file |

-continued

| Key | Column name | Data type | Not Null | Description |
|---|---|---|---|---|
| FK | IMPORT_LOG_ID | Number (10, 0) | YES | Associated log entry for the import process that loaded the file |
| | FILE_NAME | Varchar2 (50) | YES | Name of the file imported |
| | MIN_LCR_ID | Number | NO | Smallest LCR ID present in the file |
| | MAX_LCR_ID | Number | NO | Largest LCR ID present in the file |
| | IMPORTED_LCR | Number | YES | Number of LCR imported from the file |
| | MIN_SCN | Number | NO | Smallest SCN number present in the file |
| | MAX_SCN | Number | NO | Largest SCN number present in the file |
| | SUCCESS_BOOL | Number (1, 0) | YES | Indicates whether the file was completely loaded without errors |

3.7.1.9 DPO_EXPORT_LOG

This table is used by the file based export process to log information about the export process execution. One row is generated for each execution of the export process for a specific replication path.

| Key | Column name | Data type | Not Null | Description |
|---|---|---|---|---|
| PK | EXPORT_LOG_ID | Number (10, 0) | YES | Unique identifier for an export process log record. |
| FK | REP_PATH_CD | Varchar2 (8) | YES | Replication path ID associated with the export process execution |
| | START_TIMESTAMP | Timestamp | YES | Timestamp taken at the time the export process was started |
| | END_TIMESTAMP | Timestamp | YES | Timestamp taken at the time the export process was completed |
| | NUM_EXPORTED_LCR | Number | NO | Number of LCR that were exported by the export process |
| | EXPORT_STATUS | Varchar2 (10) | YES | Status of the export process; valid values are 'RUNNING', 'SUCCESS', 'ERROR', 'NO_EXPORT' and 'PARTIAL' |
| | ERROR_MSG_LDESC | Varchar2 (4000) | NO | Error or warning message associated with the export process execution |

3.7.1.10 DPO_EXPORT_FILE

This table contains control and log information about the files successfully generated by the export process.

| Key | Column name | Data type | Not Null | Description |
|---|---|---|---|---|
| PK | FILE_ID | Number (10, 0) | YES | ID of the file. It is unique for a given replication path code |
| PKF | REP_PATH_CD | Varchar2 (8) | YES | Replication path code associated with the file |
| FK | EXPORT_LOG_ID | Number (10, 0) | YES | Associated log entry for the export process that generated the file |
| | FILE_NAME | Varchar2 (50) | NO | Name of the file generated |
| | MIN_LCR_ID | Number | NO | Smallest LCR ID present in the file |
| | MAX_LCR_ID | Number | NO | Largest LCR ID present in the file |
| | EXPORTED_LCR | Number | NO | Number of exported LCR present in the file |
| | MIN_SCN | Number | NO | Smallest SCN number present in the file |
| | MAX_SCN | Number | NO | Largest SCN number present in the file |

3.7.1.11 DPO_CODE_TEMPLATE

This table contains code template and snippets that are used by the code generating the various setup procedures:

| Key | Column name | Data type | Not Null | Description |
|---|---|---|---|---|
| PK | TEMPLATE_NAME | Varchar2 (50) | YES | Unique name for a code template |
| | TEMPLATE_SDESC | Varchar2 (80) | YES | Short description of the code template |
| | TEMPLATE_CONTENT | CLOB | NO | Content of the template |

3.7.1.12 DPO_GEN_OBJECTS

This table is used to track what objects are created for a specific replication path. The content of this table is populated and removed by the source and target setup procedures.

| Key | Column name | Data type | Not Null | Description |
|---|---|---|---|---|
| PFK | REP_PATH_CD | Varchar2 (50) | YES | Replication path code associated with the object created. |
| PK | OBJECT_NAME | Varchar2 (30) | YES | Physical database name of the object |
| PK | OBJECT_TYPE | CLOB | YES | Type of object generated. Valid values are: 'TABLE', 'PROPAGATION', 'QUEUE', 'APPLY', 'PROCEDURE', and 'DML_HANDLER' |

3.7.1.13 DPO_ROW_FILTERING

This table is used to configure how code that filters rows is generated. It contains the tables that preferably have their rows filtered and the hierarchy to follow, to get to the driving table.

| Key | Column name | Data type | Not Null | Description |
|---|---|---|---|---|
| PK | TABLE_NAME | Varchar2 (30) | YES | Name of the table which needs to have row filtering logic generated |
| PK | FILTER_TYPE | Varchar2 (10) | YES | Type of filtering to apply to the rows in the table; valid values are 'LOCATION' and 'ASSEMBLY' |
| | FILTER_SDESC | Varchar2 (30) | | Short description of the row filtering entry |
| | HIERARCHY_LVL | Integer | YES | Hierarchy level of the table in the assembly. |
| | PARENT_TABLE_NAME | Varchar2 (30) | | Name of the parent table that we need to link to filter the data in the current table |
| | LINK_FK_CONSTRAINT_NAME | Varchar2 (30) | | Foreign key constraint name of the table used to link to the parent table |
| | PARENT_PK_CONSTRAINT_NAME | Varchar2 (30) | | Primary key constraint name used to uniquely identify a row in the parent table |

Zero level data should be populated in the table that describes the row filtering entries that are composing ITAR.

3.7.2 Administrative Packages, Procedure and Views

The deployed operation replication network is configured, administered and monitored using a set of PL/SQL packages and views. These packages should only be available to the deployed admin user (DPO_ADMIN). This section describes the specifics required from each package.

All the procedures described here are the public ones. Any other support procedures and functions should be in other packages like DPO_UTL or DPO_STREAMS_UTL to keep the public packages clean.

3.7.2.1 Package DPO_ADM_PKG

This package is used to create and administer a replication network. It allows a deployed operation administrator to create specific replication paths and administer them. These procedures are high-level procedures to administer the deployed network. Oracle Streams procedures are available to control specific components composing the replication path. It contains the following procedures:

create_rep_path_config

This procedure is used to generate the configuration procedures and data extract for a specific replication path. It takes a replication path code as an argument and generates a data extract as well as procedures to configure both the source and the target databases. Once the configuration procedures are applied at both the source and target, the data replication from that particular source and target combination is operational. All the objects created by this procedure are preferably owned by the DPO_ADMIN user. The specifics of this procedure are described in Section 3.7.3 stop_capture

This procedure is used to stop the capture process when it is executed at a source site.

start_capture

This procedure is used to start the capture process when it is executed at a source site.

restart_capture

This procedure is used to restart the capture process when it is executed at a source site.

stop_propagation

This procedure takes a replication path code and an optional table name as arguments. It is used to stop the propagation process when it is executed at a source site for the specified replication path and table. If no table name is provided, all propagations for the replication path are stopped.

start_propagation

This procedure takes a replication path code and an optional table name as arguments. It is used to start the propagation process when it is executed at a source site for the specified replication path and table. If no table name is provided, all propagations for the replication path are started.

restart_propagation

This procedure takes a replication path code and an optional table name as arguments. It is used to restart a propagation process when it is executed at a source site for the specified replication path and table. If no table name is provided, all propagations for the replication path are restarted.

validate

This procedure takes a replication path code as an argument and validates that all the local components for that specific replication path are active and running. If a component is in error or inactive, an appropriate error message is generated and an alert is raised indicating the problem. This alert is preferably associated with the Maintenix DPO_ADMIN role.

3.7.2.2 Package DPO_FILE_ADM_PKG

This package is used to manage a file and export based replication transport. It allows a deployed operation administrator to export and import files, as well as simplifying the import and export of operational site data to the consolidated site. It contains the following procedures:

rep_export_files

This procedure takes a replication path code as a parameter and triggers the export of the LCR in the export table to files as configured in the DPO_REPLICATION_FILE table. This procedure can also be called from a scheduled Maintenix job and automatically generate the export files at the configured location.

The following rules are enforced:
  The procedure cannot run in parallel for the same replication path.
  The procedure can only run on a Master or Operational site. A message should indicate this if it is run on another site type.
  A transaction cannot have their LCR records split across two files. One may go a little over the MAX_EXPORT_ROW flag to achieve this.
  If a backup location is specified in the configuration, a copy of the file is stored at that location.
  Everything is transactional. The LCR records are not removed from the export table until the main and backup files are successfully written to disk.
  Every run of the procedure is logged in the DPO_EXPORT_LOG and if a file was generated, in DPO_EXPORT_FILE.
  If an error occurs while running the procedure, it logs the cause and generates an export alert associated with the DPO_ADMIN role.

rep_import_files

This procedure takes a replication path code as a parameter and triggers the import of the files applicable to that replication path as configured in the DPO_REPLICATION_FILE table. This procedure can also be called from a scheduled Maintenix job and automatically load the import files from the configured location.

The following rules are enforced:
  The procedure cannot run in parallel for the same replication path.
  The procedure can only run on an Operational or Consolidated site. A message should indicate this if it is run on another site type.
  Every run of the procedure is logged in the DPO_IMPORT_LOG and if files were imported, in DPO_IMPORT_FILE.
  If an error occurs while running the procedure, it logs the cause and generates an import alert associated with the DPO_ADMIN role.

extract_operational_db

This utility procedure takes a full file path and name as a parameter and performs a full dump of the Maintenix schema using the Data Pump Export utility.

The following rules are enforced:
  The procedure can only run on an Operational site. A message should indicate this if it is run on another site type.
  The export file is created at the provided location using the provided name.
  The generated export file has header information generated like timestamp information, replication path name, etc.

load_operational_db

This procedure takes the full path name of a file as a parameter and imports the Maintenix schema using the Data Pump Export utility in the proper schema for the replication path.

The following rules are enforced:
  The procedure cannot run in parallel for the same replication path.
  The procedure can only run on a consolidated site. A message should indicate this if it is run on another site type.
  Use the header information in the file to figure out in which schema to restore the data. It has to be in the schema associated with the operational site.

When using file-based transfers, the system may maintain a backup of transfer files at the originating database to ensure recoverability if a file does not make it to its destination.

3.7.2.3 Package DPO_UTL_PKG

This package contains general procedures and functions used by other packages that are specific to deployed operations but not specific to Oracle Streams. There are no specific procedures pre-defined here since it is highly dependent on the actual implementation. Other packages prefixed by DPO_UTL can be created as required when they group deployed operations procedures together logically.

3.7.2.4 Package DPO_STREAMS_UTL_PKG

This package contains general procedures and functions used by other packages that are specific to deployed operations and Oracle Streams. There are no specific procedures pre-defined here since it is highly implementation specific. Other packages prefixed by DPO_STREAMS_UTL can be created as required when they group Oracle Streams specific procedures together logically.

3.7.2.5 Overall Status View

This view displays high-level status information about the various components that are present at the site regardless of whether it is a source or a target. There should be one row per replication path. The data for this amalgamated view comes from the various Oracle Streams monitoring views.

3.7.2.6 Detailed Status View

This view displays detailed information about the various components that are present at the site regardless of whether it is a source or a target. Multiple rows can be returned for the same replication path and it can be specific to a replication path. The data for this view comes from the various Oracle Streams monitoring views.

3.7.3 Creating a New Replication Path

Replication paths are always created from a source to a target. The configuration tables are populated with data that describes the various replication paths available to the source database before a replication path configuration can be created.

A replication path must define a "transport type" when it is configured. There are three types supported:

QUEUE
  This transport type uses the standard Oracle Streams transport, which is Queue to Queue. A quick network connection has to be available between the source and the target, and no manual steps are required to transmit the data.
FILE
  This transport type uses files to store the LCR and they are sent to the target site either by media or FTP'd. The procedure to extract and load the data from the source toward the target has to be triggered either manually or using a scheduled job.
EXPORT
  This transport can only be used from an operational site toward a consolidated site. It consists of a full schema export at the source followed by an import at the target.

The create_rep_path_config procedure is used to create the source configuration stored procedure, a seed data extract for the target site and a target configuration stored procedure that should be included in the data extract. The only required argument for this procedure is the name of a replication path defined in the DPO_REPLICATION_PATH table.

This procedure performs the following high-level items; specific situations are described in the site type specific sections:

Validate that the provided replication path is defined in the DPO_REPLICATION_PATH table. If it is not found, the procedure should terminate with an error message indicating that the provided configuration path name does not exist in the replication path table.
  Generate and create a configuration procedure specific to the type of site used as a source in the replication path. The name of that procedure is preferably SETUP_SOURCE_<rep_path_cd>.
  Generate and create a configuration procedure specific to the type of site used as a target in the replication path. The name of that procedure is preferably SETUP_TARGET_<rep_path_cd>
  Generate a data extract for the target site specific to the type of target. This data extract preferably includes the generated target configuration procedure.

The system allows data to be transferred from the master site 110 to the operational site(s) 120 automatically over the network ("network-based transfers"). This means that updated data will automatically be sent to the subscribing site as soon as there is network connectivity. There is no manual intervention.

The system allows data to be transferred from the master site 110 to the operational site(s) 120 manually using files ("file-based transfers"). This means that a user at the master site 110 will need to manually send the file to the subscriber, and that a user at the operational site 120 will need to import those files at the other end.

3.7.3.1 Creating a Source Site (Master or Operational)

A source site is a site that replicates its data to one or many target sites. It selectively replicates some of its data if it is a Master site 110 or most of it if it is an Operational site 120.

For an Operational site 120, CDC (Change Data Capture) is used to keep track of changes done to the operational data when replicating to a consolidated site. The CDC change tables are replicated as well and are purged from the source change table once replicated. This data is used at the consolidated site to properly aggregate and consolidate the data from all the operational sites 120 associated with this specific consolidated site.

It is also possible to replicate the CDC change table only to a consolidated site 130. The advantage is that a lot less data needs to be transferred but any Large Object (LOB) updates/inserts are lost. LOBs are a set of datatypes used to hold large amount of data in a database. A source site is configured for a specific replication path automatically by running the setup procedure created when running the create_rep_path_config procedure. When creating the source procedure, the following requirements must be fulfilled:

The generated source stored procedure indicates in the comments when it was generated and that it is generated code designated to be run on <global source database name>
  When the source setup procedure is generated, it should have a check that will ensure it can only be run on the appropriate database. The global name is used to check this.
  Specific actions have to be disabled at the source site depending on whether the source is a master or an operational site.
  A capture process and queue should be created if it does not already exist. There is one capture process and associated queue defined for a source site.
  Table Inclusion rules have to be created as defined in the DPO_REPLICATION_TABLE. They should also be grouped by their associated ruleset defined in the table DPO_REPLICATION_TABLE_RULESET.
  If the type of source site is MASTER, data replicated to an operational site 120 or consolidated site 130 should only be master data.
  If the type of source site is OPERATIONAL, data replicated to a consolidated site 130 (in the site-specific schema) is the full Maintenix schema.

If the type of source site is OPERATIONAL and the transport type is EXPORT, no specific components are created at the source site for data replication. This is only possible at an operational site 120 when the target of that operational site 120 is a consolidated site 130.

If the transport type is QUEUE, a queue-based propagation has to be created. It is specific to this replication path so the name of the propagation should end with the replication path code; for example: DPO_PROP_REP_PATH_1. If ITAR is applicable, this is where the filtering occurs. Propagation rules should be created for each table being replicated.

Figure 6:
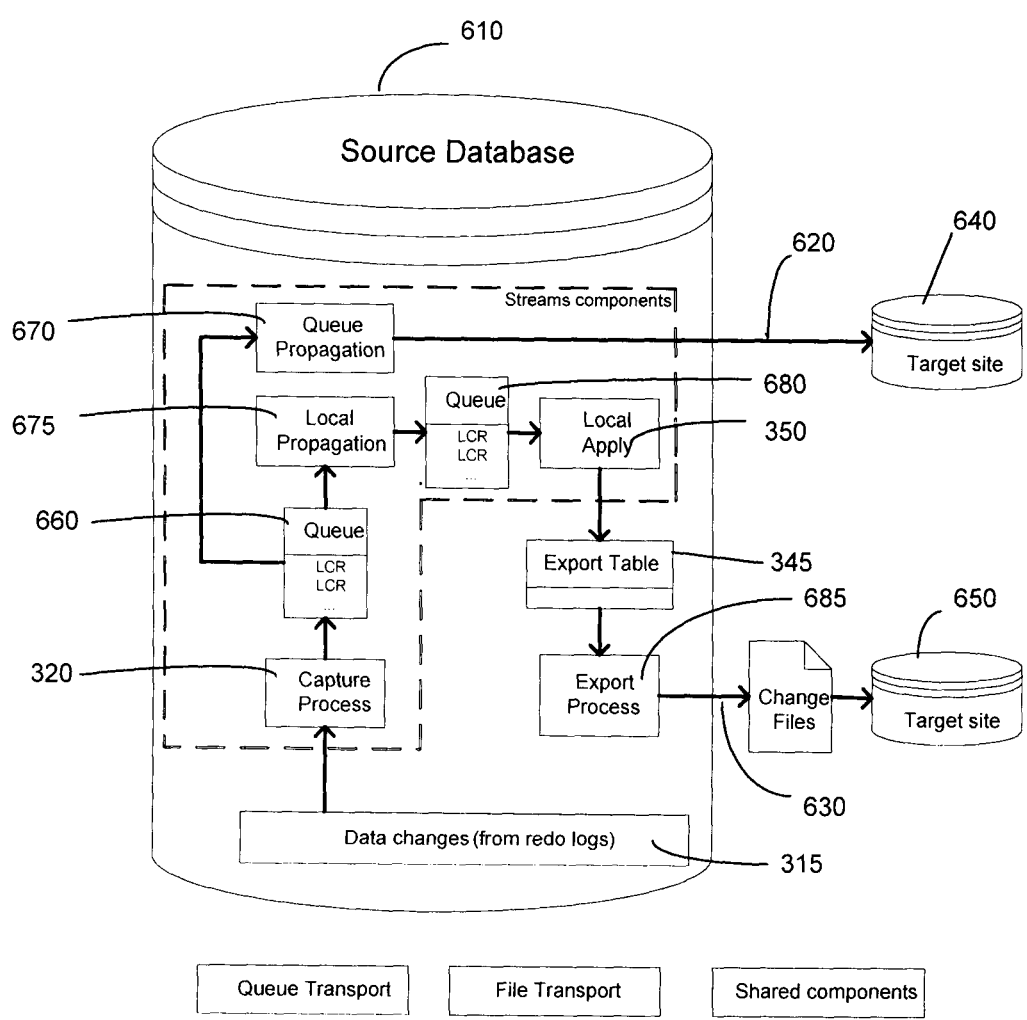
FIG. 6 presents a block diagram of a configured source database, in accordance with an embodiment of the invention.

If the transport type is FILE, a set of components have to be defined for the specific replication path as illustrated in FIG. 6. They should all have their name appended with the replication path code.

An export table has to be created to hold the exported LCR data until they are put in a file. The table should be named DPO_EXPORT_[replication code] and have the following structure:

| Key | Column name | Data type | Not Null | Description |
|---|---|---|---|---|
| PK | LCR_ID | Number | YES | Unique identifier for LCR record |
| | LCR_DATA | Anydata | YES | LCR payload |
| | TRANSACTION_ID | Number | YES | ID of the transaction that generated the LCR |
| | SCN_NUMBER | Number | YES | SCN number associated with the LCR |

A local propagation has to be created to enqueue the LCR to a local queue. If ITAR is applicable, this is where the filtering occurs. Propagation rules should be created for each tables being replicated.

A local apply with an associated DML handler has to be created. This local apply consumes the LCRs from the local queue and inserts them in the export table. An exception handler should also be associated with the apply process to generate an alert associated with the DPO_ADMIN role if something goes wrong in the apply process. The local apply should be named DPO_LOC_APPLY_{replication path code}

CDC (Change Data Capture) objects are created as configured if the source site type is OPERATIONAL and the target is CONSOLIDATED If the type of the source database is MASTER, ITAR filtering may have to be applied. The ITAR Compliance section 3.8.8 describes the requirement. Keep in mind that the same rule must be applied when creating the master data extract for an operational site so the generated filter code should be reusable by different components.

Equipment tables

Propagation rules have to be created for equipment tables if there are rows defined in the EQP_ASSM-BL_ORG table. These rows are used to evaluate whether the LCR should be propagated or not. For each ITAR affected LCR that is propagated, one must find the associated assembly of the row being propagated. Once the assembly key is found, access the associated organizations in the EQP_ASSM-BL_ORG and validate that they exist in the ORG_DB table for the target db_id being replicated. If it exists, the row may be replicated, if not, the row cannot be replicated.

Location tables

The same principle applies to location tables but using the ORG_ORG_LOC relationship table to filter location LCRs.

The create_rep_path_config also has to create a data extract that is used as a seed at a target site. If the target is an operational site 120 and ITAR is applicable, the same ITAR filtering rules defined above have to be applied to each row in the data extract. A script to load that extracted data should also be provided to help in initializing the operational site 120.

The target configuration procedure should also be exported in the data extract. The rules applicable to that configuration procedure are defined in the "creating a target site" sections.

Once the "configuration" stored procedure is run on the source site, the source database 610 components illustrated in FIG. 6 will be created depending on whether it is using Queue to Queue 620 or files 630 as the transport mechanism to the target site 640, 650.

The capture process 320 as well as its associated capture queue 660 is shared across all replication paths for that source. The queue propagations 670 and file transport components 660 (i.e. local propagation 675, queue 680, local apply 350, export table 345 and export process 685) are associated with a specific configuration path.

3.7.3.2 Creating a Target Site (Operational)

An operational site 120 is a site that receives replicated master data from one master source site 110 and replicates all its local changes to one or more consolidated sites 130. In other words, an operational site 120 is both a target and a source for replicated data.

The operational site 120 is configured for a specific replication path automatically by running the setup procedure created when running the create_rep_path_config procedure on the master site 110 and included in the seed data extract used to populate the master data at a target site.

CDC (Change Data Capture) is used at an operational site 120 to keep tract of changes done to the operational data when replicating to a consolidated site 130. The CDC change tables are replicated as well and are purged from the source change table once replicated. This data is used at the consolidated site 130 to properly aggregate and consolidate the data from all the operational sites 120 associated with this specific consolidated site.

It is also possible to replicate the CDC change table only to a consolidated site 130. The advantage is that a lot less data needs to be transferred but any LOB objects updates/inserts are lost.

When the create_rep_path_config configuration procedure generates the target setup procedure, the following requirements are fulfilled. The assumption is the target site is of type OPERATIONAL:

The generated target stored procedure should indicates in the comments when it was generated and that it is generated code designated to be run on <global target database name>

When the target setup procedure is generated, it has a check that will ensure it can only be run on the appropriate database. The global name is used to check this.

Specific actions are disabled at the target site for an operational site 120.

An apply queue is created. This queue is the destination queue when Queue-To-Queue transport is used and the queue where users LCRs are enqueued by the import process when using FILE transport.

An apply process is created and associated with the apply queue. It is named DPO_APPLY_{replication path code}

An exception handler is associated with the apply process. If an error occurs, it creates an alert associated with the DPO_ADMIN role.

Figure 7A:
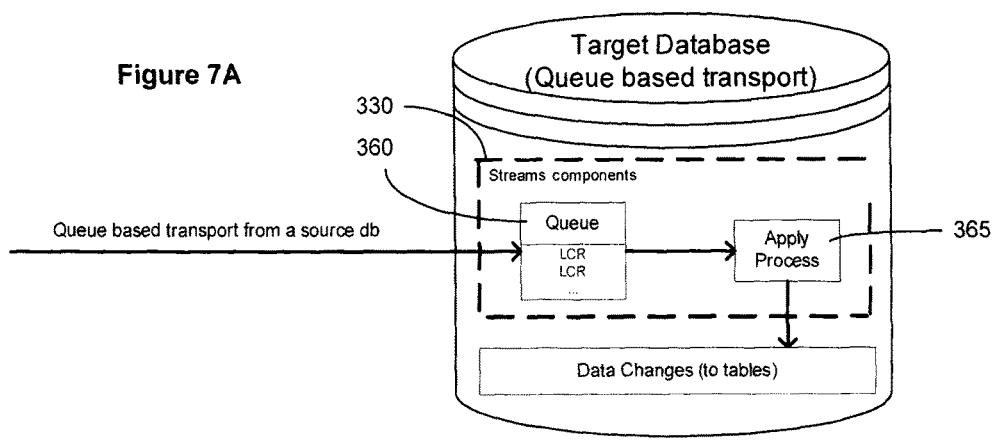
FIGS. 7a and 7b present block diagrams of a configured target database, in accordance with an embodiment of the invention, FIG. 7a showing queue-based transport and FIG. 7b showing file-based transport.
Figure 7B:
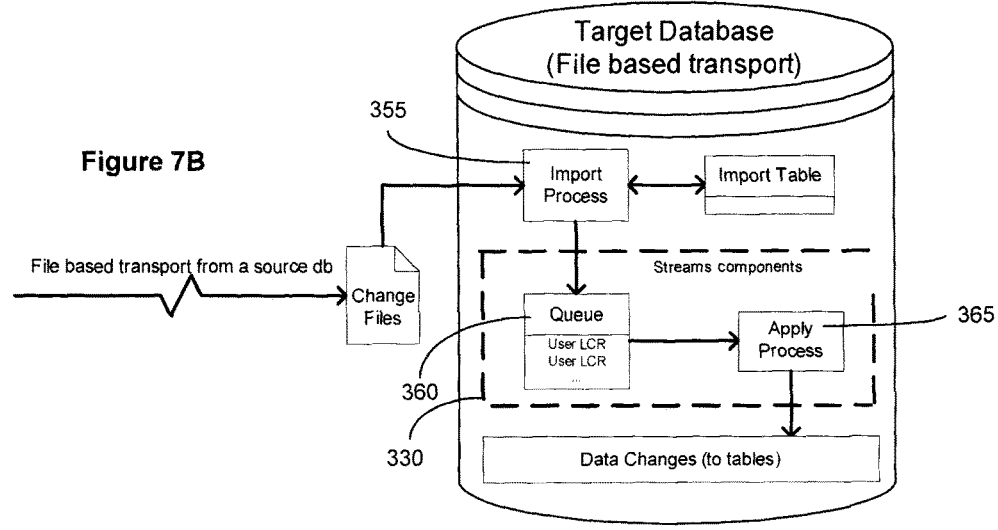

Once the configuration stored procedure is run, the target site has the components illustrated in FIG. 7a if it is using Queue to Queue transport, or the components illustrated in FIG. 7b if it is using files as the transport mechanism. In a queue-based transport as in FIG. 7a, standard Oracle Streams components 330 are generated: an apply queue 360 and an apply process 365. In a file-based transport as in FIG. 7b, an import process 355 is generated in addition to the standard Oracle Streams components 330, 360, 365.

3.7.3.3 Creating a Target Site (Consolidated)

A consolidated target site 130 is a site that receives replicated master data from one master source site 110 and replicated data from multiple operational sites 120. Each operational site 120 replicates its data using one of the predefined transport methods in their designated operational schema. This is done to ensure that the integrity of the operational data is kept for each operational site 120 when the data is replicated to a consolidated database and to limit the amount of conflict.

A consolidated site 130 is originally created by importing the database extract generated at a master source site 110 when the replication path was created from the master site 110 to the consolidated site 130. In that extract is a generated stored procedure that configures the consolidated site 130 to work with the master site 110 for that replication path.

When the create_rep_path_config configuration procedure generates the target setup procedure, the following requirements are fulfilled. The assumption is that the type of target site is CONSOLIDATED (see FIG. 8):

- The generated target stored procedure should indicate in the comments when it was generated and that it is generated code designated to be run on <global target database name>
- When the target setup procedure is generated, it has a check that ensures it can only be run on the appropriate database. The global name is used to check this.
- Specific actions are disabled at the target site for a consolidated site 130.
- The main schema created from the Master site data extract is the consolidated schema 840 where OWB (Oracle Warehouse Builder) 850 aggregates the operational site data. The name of the schema is DPO_CONSOLIDATED
- The operational data extract generated from an operational site 130 is loaded into a schema specific 810, 820, 830 to that operational site 120. The schema is named DPO_CONSOL_{replication path code}
- When replicating changes from a master site 110, the master data goes in the consolidated schema 840;
- When replicating changes from an operational site 120, the data goes in the schema specific to the operational site 120.
- Depending on the type of transport used from the Master site 110 or the various Operational sites 120, various components may have to be created. They are the same as in creating a target Operational site 120.

Figure 8:
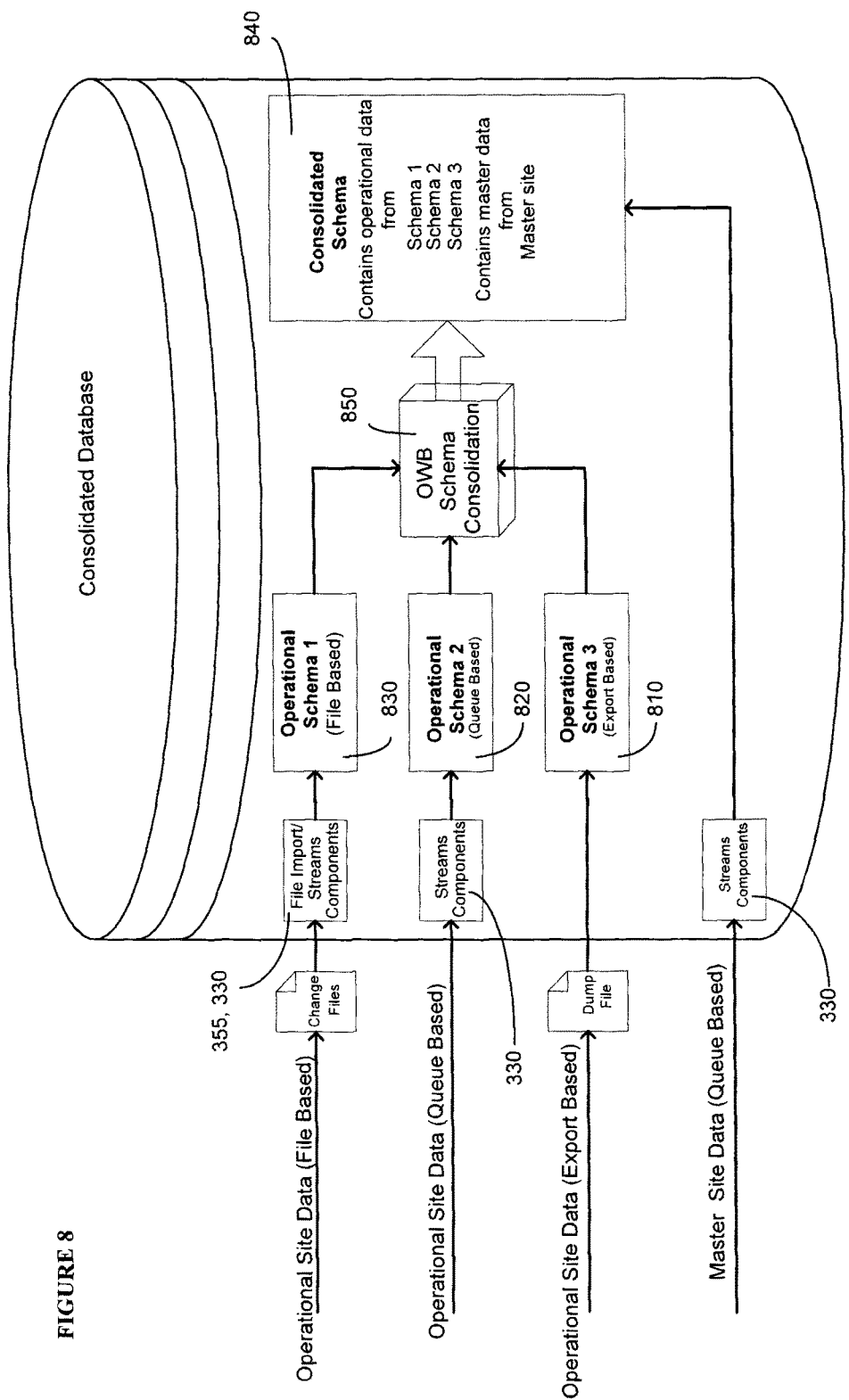
FIG. 8 presents a block diagram of a configured, target, consolidated database, in accordance with an embodiment of the invention.

Once the configuration stored procedure is run, the target site will have the components illustrated in FIG. 8 depending on the type of transport used by the master site 110 and each operational site 120 replicating into the consolidated database. The Oracle Streams components 330 and file import components 355 are the same as defined for an Operational target site depending on the type of transport used.

3.8 Baseline Publishing

The system allows the master site 110 to publish an assembly baseline to operational sites 120. Baseline refers to the assembly definitions, part definitions, task definitions, fault definitions, reference terms, and the like.

3.8.1 Overview

Baseline Publishing refers to the propagation changes made to master data at the master site 110 to the satellite sites. In the context of deployed operations, the term "master data" refers to the base set of data that is required for proper operations of the Maintenix system at all satellite sites. This includes such entities as locations, organizations, and reference terms.

3.8.2 Master Baseline Data

Master baseline data is the set of data that defines the equipment and maintenance blueprint as well as the standard reference data. There are two sets of baseline data in deployed operations: Controlled and Mutable.

Controlled baseline data refers to a set of master baseline data that can be edited at the master site 110 only. Any changes to this set of data have drastic impacts to the operation of the system. It is therefore highly controlled and changes are published out to satellite sites as soon as possible.

Mutable baseline data refers to a set of baseline data that can be edited at the operational sites 120. In case of conflicts, the master site 110 overrides data in conflict at the operational site 120. This set of data comprises of support data such as user profiles and department definitions.

Some entities such as locations, user profiles, roles, menus, and the like are both controlled and mutable. They can be defined at the master site 110 and but have some of its detail information modified at the operational sites 120. If a conflict occurs when data is replicated from the master site 110, the master site 110 takes priority.

The system allows the master site 110 to publish the list of "global" roles, menus, to-do lists, and configuration parameters. This is so that one can configure the application to behave the same at all operational sites 120. The system also allows an operational site 120 to create a list of "local" roles, menus, to-do lists, and configuration parameters. Further, the system allows an operational site 120 to modify the global roles, menus, to-do lists, and configuration parameters. This allows each site to configure the Maintenix interface however they like.

3.8.2.1 Controlled Baseline Data

The controlled baseline data consists of the following entities:
- Equipment Blueprint (Assemblies, Configuration Slots, Part Numbers & Part Groups)
- Task Definitions
- Fault Definitions Maintenance Programs
Zones and Panels
IETMs
Flight Measurements
Usage Parameters
Operators
Vendors
License Definitions
Workflow Templates
Warranty Contracts
System Configuration
System Data & Reference Terms

3.8.2.2 Mutable Baseline Data

The mutable baseline data consists of the following entities:
User Profiles (Relational information only)
Roles
Organizations
Authorities
Locations
Departments
Owners
Production Plans
Forecast Models The system allows an operational site 120:
to create "local" airports, regions and other locations and their sub-structures
to control their own department structure. This is because a department could be country/company specific for multi-service installations.
to assign locations to any department. This is necessary because an operational database must be able to control how users see data in their system.
to control their own organization structure. This is because an organization could be country/company specific for multi-service installations.
to control their own authority structure. This is because an authority could be country/company specific for multi-service installations.
to control the list of "local" users. Local users are those that are not created and controlled by the master site 110. This includes the creation and management of new users. This is because a user could be country/company specific for multi-service installations.
to modify the user profile of a global user created at the master site 110. A user may gain skills, be assigned to a new department, acquire a new license, be assigned to a new role, etc. while on deployment. Work cannot be held while waiting for a change to be pushed down from the central database. The system may prevent an operational site 120 from updating basic user data (e.g. name, code, etc.);
to add sub-locations to a global location. For example, an operational site 120 can add bins, docks, hangars to a globally published airport location.

The system allows the master site 110 to publish a "global" location structure. This location structure can include any location type such as regions, airports, bins, docks, hangars, and the like.

3.8.3 User Interface Control

Since each site type has its own set of rules around user interaction with the software, the secured resource configuration parameter value set must be tailored for each site type. The secured resources for each domain area are identified in the following sections. Note that there are actions that are not allowed in the deployed operations system.

|  | Master Site | Operational Site | Consolidated Site* |
|---|---|---|---|
| Baseline Controlled | x |  |  |
| Baseline Mutable | x | x |  |
| Actuals |  | x | x |
| Searches | x | x | x |

Figure 9:
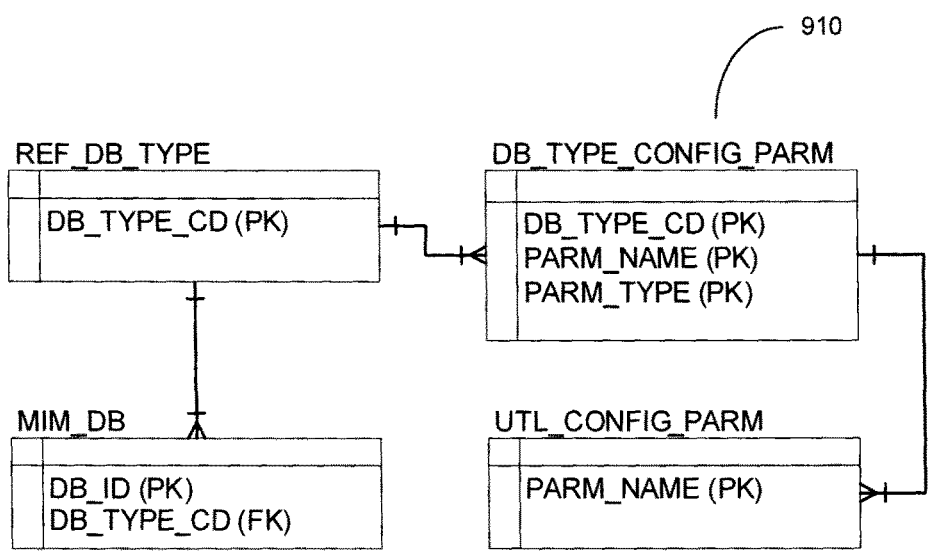
FIG. 9 presents the database type to configuration parm table, in accordance with an embodiment of the invention.

The database type to configuration parm mapping is defined in a new table 910 between the existing tables as shown in FIG. 9.

The secured resource parameter values are edited on SecurityPrevilegesTab.jsp. This page is modified so that if the local database type is one of Master, Operational, or Consolidated, an additional column will be shown on the page. This column shows the database types where each secured resource will be effective.

| Database Types | Category | Parm Name | Description | Enabled |
|---|---|---|---|---|
| Master Operational | Org - Locations | ACTION_CREATE_LOCATION | Permission required to create a location. | ☒ |
| Master | Admin - IETM Definitions | ACTION_EDIT_IETM | Permission to edit an IETM. | ☒ |

The way the secured resource values are verified are also modified. The query that brings back the secured resource values for the user is modified to consider the local database type. Simply put, if the local database type is Master, Operational, or Consolidated, then the query also checks to ensure that the given configuration parameter is allowed to resolve to TRUE regardless of the value in the UTL_USER_PARM and UTL_ROLE_PARM table. This means that when introducing a new secured resource configuration parameter:

a) We consider which database type will have the right to edit the value; and
b) Insert proper rows in DB_TYPE_CONFIG_PARM table.

The following sections summarize the list of all secured resource configuration parameters and how they are related to the database types.

3.8.3.1 Controlled Baseline Action List

This table contains the secured resource configuration parameters that are considered to affect the controlled baseline data. The Allowed column indicates which types of sites have control over the domain. M: Master, O: Operational

3.8.3.2 Mutable Baseline Action List

This table contains the secured resource configuration parameters that are considered to affect the mutable baseline data. The Allowed column indicates which types of sites have control over the domain. M: Master, O: Operational

3.8.3.3 Actuals Action List

This table contains the secured resource configuration parameters that are considered to affect the actuals data. The Allowed column indicates which type of sites has control over the domain. M: Master, O: Operational

3.8.3.4 Searches Action List

This table contains the secured resource configuration parameters that are considered to affect the searching capability. The Allowed column indicates which type of sites have control over the domain. M: Master, O: Operational

3.8.4 Other Configuration Parameters

There are other configuration parameters that define the behaviour of the system. This section describes which site types are affected by each configuration parameter set.

3.8.5 Server Jobs

There are many server level jobs running to maintain data integrity. This section summarizes which jobs should be enabled at which site type.

| Job Code | Job Name | Enabled At |
| --- | --- | --- |
| MX_COMMON_ALERT_NOTIFY | Alert notifier job | All |
| MX_COMMON_CACHE_RESET | Cache reset job | All |
| MX_COMMON_DATA_ENCRYPT | Data encryption job | All |
| MX_COMMON_PLSQL_LOAD | Reloads the PLSQL packages if required. | All |
| MX_COMMON_STALE_JOB_RESET | Stale job reset job | All |
| MX_CORE_ABCRECALCULATION | ABC Class Recalculation | Operational |
| MX_CORE_AUT_EXP_WARRANTY | Automatic Expire Warranty | Operational |
| MX_CORE_BASELINE_SYNC | Run the baseline synchronization | Operational |
| MX_CORE_DATA_CLEAN_UP | Cleans up bad data on start up | Operational |
| MX_CORE_DB_ANALYZE | Gather schema stats. | All |
| MX_CORE_DEACTIVATE_WARRANTY_CONTRACT | De-Activate Warranty Contracts | Operational |
| MX_CORE_DELETE_OLD_ASYNC_ACTIONS | Delete all old async actions. | All |
| MX_CORE_DELETE_ORPHANED_FORECASTED_TASKS | Delete all orphaned forecasted tasks. | Operational |
| MX_CORE_EXPIREDINVENTORY | Condemns all loose inventories that have expired. | Operational |
| MX_CORE_GENERATEFLIGHTPLANFORAIRCRAFT | Generate flight plan for aircraft. | Operational |
| MX_CORE_GENERATEFORECASTEDTASKS | Generate the forecasted tasks within the task_task.forecast_range_dt for each task event | Operational |
| MX_CORE_GENERATEISSUETRANSFERS | Automatically generates issue transfer records for upcoming issues within specified period of time (configurable setting). | Operational |
| MX_CORE_GENERATE_PART_REQUESTS | Generate Part Requests Job Bean | Operational |
| MX_CORE_LICENSEEXPIRY | Send alert to user for expired license | Master Operational |
| MX_CORE_MVIEW_DEFER_FAULT_PART_REQ | Refresh the Deferred Fault Part Request MView | Operational Consolidated |
| MX_CORE_MVIEW_FLEET_LIST | Refresh the Fleet List MView | Operational Consolidated |
| MX_CORE_MVIEW_OPEN_PART_REQ | Refresh the Open Part Request MView | Operational Consolidated |
| MX_CORE_PROCESS_AUTO_RSRV_CONTROLLER | Process autoreservations controller | Operational |
| MX_CORE_RFQ_RESPOND_BY_DATE | RFQ Respond By Date Alert | Operational |
| MX_CORE_STATUS_BOARD_REFRESH_ASSET_LIST | Update the asset list for the Configurable Status Boards | Operational Consolidated |
| MX_CORE_STATUS_BOARD_REFRESH_QUERY_DATA | Update the query data for the Configurable Status Boards | Operational Consolidated |
| MX_CORE_UPDATETASKDEADLINES | Update the Task Deadlines | Operational |
| MX_CORE_UPDATETASKLABOURSUMMARY | Update the task labour summary table. | Operational |
| MX_CORE_UPDATEVENDORSTATUS | Set approved vendors with expired approval expiry dates to unapproved | Master Operational |
| MX_CORE_UPDATE_PREDICTED_DEADLINE_DATE | Update predicted date for usage based deadlines | Operational |
| MX_CORE_WARRANTY_EVALUATION | Evaluate task for warranties | Operational |
| MX_FRC_SEND_TASK_ACC | Send Project Accomplishment messages to FRC queue | None |
| MX_FRC_SEND_USAGE | Send Aircraft Usage messages to FRC queue | None |

3.8.6 Controlled Baseline Data Change Reactions

For each master data change, the operational sites 120 must react accordingly to manipulate the actuals data properly. The types of reactions include inventory short description update and task details and scheduling synchronization. The following subsections summarize the reactions that must be triggered at the operational sites 120.

The reaction logic set is a combination of PL/SQL procedure and Java code. The PL/SQL procedure can be invoked by the replication system at the end of the apply process. Java code, on the other hand cannot be invoked directly from the replication system, and has been converted into PL/SQL procedures.

3.8.6.1 Equipment Blueprints

| | EQP_ASSMBL_BOM | |
|---|---|---|
| Action Taken at Master Site | Reaction at Operational Sites | Business Rule Description |
| Insert | An insert to EQP_ASSMBL_BOM will always be followed up by insert of at least one row in EQP_ASSMBL_POS. Therefore, reaction to inserts to EQP_ASSMBL_BOM will be handled at inserts to EQP_ASSMBL_POS. | |
| Update | MANDATORY_BOOL: Call INV_COMPLETE_PKG_EVALCOMPL on all INV_INV rows where ASSMBL_BOM_ID == 0. | Changes to the config slot mandatory flag has implications to aircraft completeness evaluation. Mark aircraft that are based on the blueprint as incomplete. |
| | ASSMBL_BOM_CD: Call INV_CREATE_PKG_CREATESYS procedure. | Changes to the assembly bom code is propagated to the inventory short description field. |

| | EQP_ASSMBL_POS | |
|---|---|---|
| Action Taken at Master Site | Reaction at Operational Sites | Business Rule Description |
| Insert | If new row inserted in EQP_ASSMBL_BOM, and BOM_CLASS_CD = 'SYS' then call INV_CREATE_PKG_CREATESYS procedure. | Addition of a new SYSTEM in the blue print is reflected in all existing actuals since all SYSTEMs are preferred items. |
| | If new row inserted in EQP_ASSMBL_BOM and If MANDATORY_BOOL == 1 then call INV_COMPLETE_PKG_EVALCOMPL on all INV_INV rows where ASSMBL_BOM_ID == 0. | If the new configuration slot is deemed mandatory, it has implications to aircraft completeness evaluation. Mark aircraft that are based on the blueprint as incomplete. |
| | If EQP_ASSMBL_BOM.MANDATORY_BOOL == 1 then call INV_COMPLETE_PKG_EVALCOMPL on all INV_INV rows where ASSMBL_BOM_ID == 0. | Addition of a new position to a configuration slot that is deemed mandatory has implications to aircraft completeness evaluation. Mark aircraft that are based on the blueprint as incomplete. |
| Update | EQP_POS_CD: Call INV_DESC_PKG_INVUPDINVDESC on all INV_INV where PART_NO_FK matches. | Changes to the position code must be propagated to the inventory short description field. |

| | EQP_PART_NO | |
|---|---|---|
| Action Taken at Master Site | Reaction at Operational Sites | Business Rule Description |
| Update | PART_NO_SDESC: Call INV_DESC_PKG_INVUPDINVDESC on all INV_INV where PART_NO_FK matches. | Inventory short description must be updated system-wide since it contains part number. |
| | PART_NO_OEM: Call INV_DESC_PKG_INVUPDINVDESC on all INV_INV where PART_NO_FK matches. | Inventory short description must be updated system-wide since it contains part number. |

MIM_CALC

| Action Taken at Master Site | Reaction at Operational Sites | Business Rule Description |
|---|---|---|
| Delete | Call com.mxi.mx.core.query.usagedefn.DeleteEventUsageForDataType and com.mxi.mx.core.query.usagedefn.DeleteInventoryUsageForDataType. | When a calculated parameter is deleted, "current" event usage and inventory usage for the calculated parameter is deleted from the system. |

The above two queries are moved to PL/SQL procedures so that they can be invoked at the database level. The Java code that calls these queries was modified to use a PRX file to call the PL/SQL procedure.

The system adjusts the config slot hierarchy of inventory at the operational site 120 whenever a new baseline is published from the master site 110.

3.8.6.2 Task Definitions

TASK_TASK

| Action Taken at Master Site | Reaction at Operational Sites | Business Rule Description |
|---|---|---|
| Update | If CLASS_MODE_CD value of either "BLOCK", "REQ" or "JIC" THEN IF TASK_DEF_STATUS_CD changed to ACTV or OBSOLETE OR TEMP_REV_BOOL changed to 1 Then Inventory items must be flagged for Baseline Synchronization. The query is in UpdateSyncAllInvByTaskDefnRev.qrx | When a new revision of task definition becomes available, we update all scheduled tasks that were created from that task definition. |

The system updates the actual tasks within an operational site 120 (task synchronization) whenever a new baseline is published from the master site 110.

To trigger baseline synchronization, inventory items are flagged as "synchronization required." The code that flags inventory items is currently in the form of a query file. The query file is converted into a PL/SQL procedure so that it can be invoked at the database level. The Java code that had called these queries was modified to use a PRX file to call the PL/SQL procedure.

3.8.6.3 Maintenance Programs

MAINT_PRGM

| Action Taken at Master Site | Reaction at Operational Sites | Business Rule Description |
|---|---|---|
| Update | If MAINT_PRGM_STATUS_CD changed to ACTV, then Baseline Synchronization code must be triggered. | When activating a maintenance program, the actual tasks need to be repackaged and rescheduled according to the maintenance program. |

3.8.7 Conflict Resolutions at Operational Sites

Due to the overlap of domain areas that can be modified at both the master site 110 and operational sites 120, the system has an inherent risk of data conflict at the operational sites 120. For example, both the master site 110 and the operational site 120 have the ability to update user profile information for a given user. This section will explain each expected data conflict scenario and their resolution by design.

Note that data conflicts at consolidated sites 130 are not covered in this section.

3.8.7.1 User Profiles

Maintenix user profile consists of the following tables:

| Table | Description |
|---|---|
| UTL_USER | Contains user ID, name, email address, lock flag, etc. |
| UTL_USER_PASSWORD | Contains user password and expiry information. |
| UTL_USER_ALERT | List of all alerts the user has received. |
| UTL_USER_PARM | User specific security parameters. |
| UTL_USER_ROLE | User-role mapping. |

-continued

| Table | Description |
|---|---|
| ORG_HR_LIC | Human resource-license mapping |
| ORG_HR | Human resource information |

A given user may need updates to their profile at the operational sites 120 before their user profile copy at the master site 110 is updated. In this case, when the details are updated at the master site 110, these changes will be propagated to the operational sites 120. For example:
1. At an operational site 120, a user gains new license for Electrical work and loses their license for Airframe work. Since there is no replication from operation site 120 to master site 110, the copy of the user profile at the master site 110 is out of date.
2. At the master site 110, the user's email address is updated. This change is immediately replicated to the operational sites 120. At this point, the copy of the user profile at the operational site 120 has the new license information as well as the email address update. The copy of the user profile at the master site 110 is still out of date.
3. At the master site 110, the user profile is updated to reflect the new license information; Electrical work is added and Airframe is removed. This update is immediately replicated to the operational sites 120. Since Electrical work is already associated with the user at the operational site 120, the row insert fails silently. Since Airframe work is already dissociated from the user at the operational site 120, the row delete fails silently.

Dependent Data Issue

Since the master site 110 has no visibility into what dependent data the operational sites 120 are creating, there are no automatic validations executed upon deletion of a user. This validation is left to the system administrator.

3.8.7.2 Locations

Maintenix location consists of the following tables:

```
INV_LOC
INV_LOC_CAPABILITY
INV_LOC_LABOUR_CAPACITY
INV_LOC_CONTACT
INV_LOC_ORG
INV_LOC_BIN
INV_LOC_STOCK
```

The master site 110 is responsible for setting up global locations only. Operational sites 120 are allowed to create local locations that are not necessarily visible to other operational sites 120.

Cross-Operational Site Issue

Since local locations are created at operational sites 120, there is a cross operational site issue in the context of inventory transfer. The problem is: how should the event records that are associated with minor locations be handled, when transferred to a database that does not have the minor locations? Since every minor location belongs to a major location and all major locations are shared amongst all operational sites 120, we simply associate these events with the major locations upon transfer. For example, if a work package was completed at YOW/LINE, upon transfer, the work package will look as if the work was done at YOW. This location translation will occur when the operational site 120 replicates data to consolidated sites 130.

Dependent Data Issue

Since the master site 110 has no visibility into what dependent data the operational sites 120 are creating, there are no automatic validations executed upon deletion of a major location. This validation is left to the system administrator.

3.8.8 ITAR Compliance

Briefly, ITAR compliance means that the transmission of the controlled baseline data must be explicit and enforced throughout the distributed system. For example, the master database may contain assembly information for multiple aircraft, but a certain operational site 120 may only be privileged to view a subset of the master list. In this case, any changes made to the protected controlled baseline data must not be transmitted to the operational site 120 in question.

3.8.8.1 Equipment Filtering

One of the requirements under ITAR is to control where the transmission of equipment blueprints go. To handle this requirement, the database identifier is associated with assemblies in the system.

Figure 10:
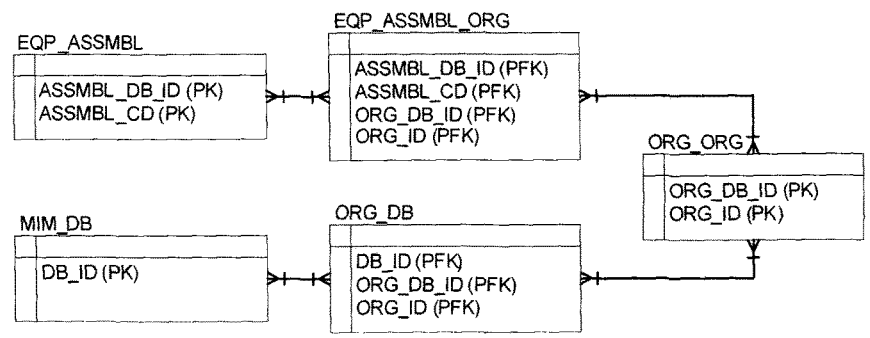
FIG. 10 presents the associations of tables related to ITAR equipment filtering, in accordance with an embodiment of the invention.

By having the associations as shown in FIG. 10, when the LCRs are generated for a given target satellite database, the LCR can be filtered accordingly.

3.8.8.2 Location Filtering

Figure 11:
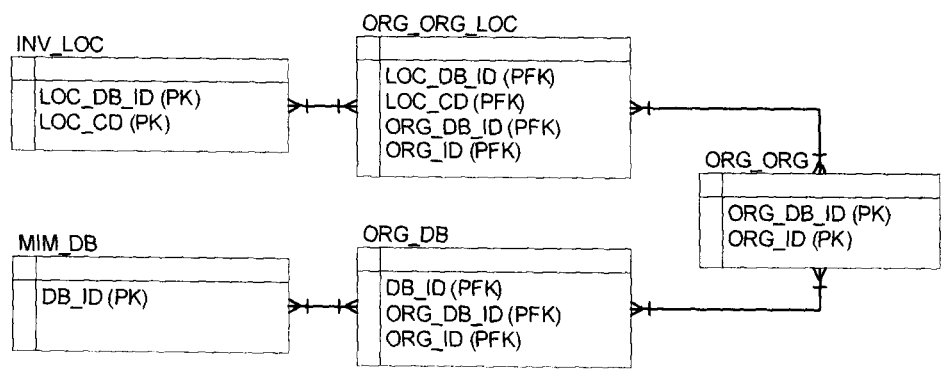
FIG. 11 presents the associations of tables related to location filtering, in accordance with an embodiment of the invention.

The same filtering requirement exists for locations. The locations are already associated with organizations and therefore can be easily filtered upon transmission. However, locations of type 'VENDOR' are not filtered. FIG. 11 presents the associations needed to effect this.

4.0 Consolidation Concept

4.1 Assumptions a) network-based and file-based requirements surrounding the transport and processing of change delta records are not described herein but follow logically from the system described;

b) all requirements for a graphical user interface have been removed. The Consolidated Site 130 is a repository of Operational Site data for reporting purposes only. A Maintenix 'front-end' is not required for the Consolidated Site 130.

c) A Consolidated Site 130 preferably will always have applied Master site 110 updates before the Operational sites 120. That is, the Consolidated Site 130, with respect to master baseline data, will always be more than or as up-to-date as the Operational/Consolidated Sites that feed into it.

4.2 Technical Constraints

Oracle Enterprise with the OWB ETL option (Oracle Warehouse Builder—Extract, Transfer, Load), or a comparable system, is employed at the Consolidated Site 130.

5.0 Consolidation Conceptual Design

5.1 Overview

A Consolidator Site 130 in a deployed environment is a site that aggregates data from multiple Operational sites 120 or Consolidator Sites 130 in a single database. The baseline for that type of site comes from a master site 110 and only one master site 110 can be associated with a specific Consolidator site 130.

The Consolidate Site 130 preferably will not have a Maintenix application server associated with it; that is, there is no need for a graphical user interface.

All Operational sites 120 and Consolidated sites 130 are directly connected to a master site 110 that controls all aspects of the baseline and organization model. The operational data is controlled by the Operational sites 120, which can replicate any changes made to their respective data to a Consolidated Site 130. A Consolidated Site 130 can also aggregate data from other Consolidated sites 130 but an Operational site 120 or Consolidated Site 130 can only consolidate its data directly to one Consolidated Site 130.

Since there are sites that can be deployed with limited or no network connectivity, one of the data transport options must be file based. The transport options to a Consolidated Site 130 are the same as the one used to transport baseline from a Master site 110 to an Operational Site 120 with the addition of a schema export/import option. This option is a file-based alternative that allows an Operational site 120 or Consolidated Site 130 to export its full database schema and send it to the Consolidated Site 130 where it is aggregated in the main consolidated schema. It thus allows an Operational Site 120 to run Oracle Standard since no Oracle Streams components are installed.

Figure 12:
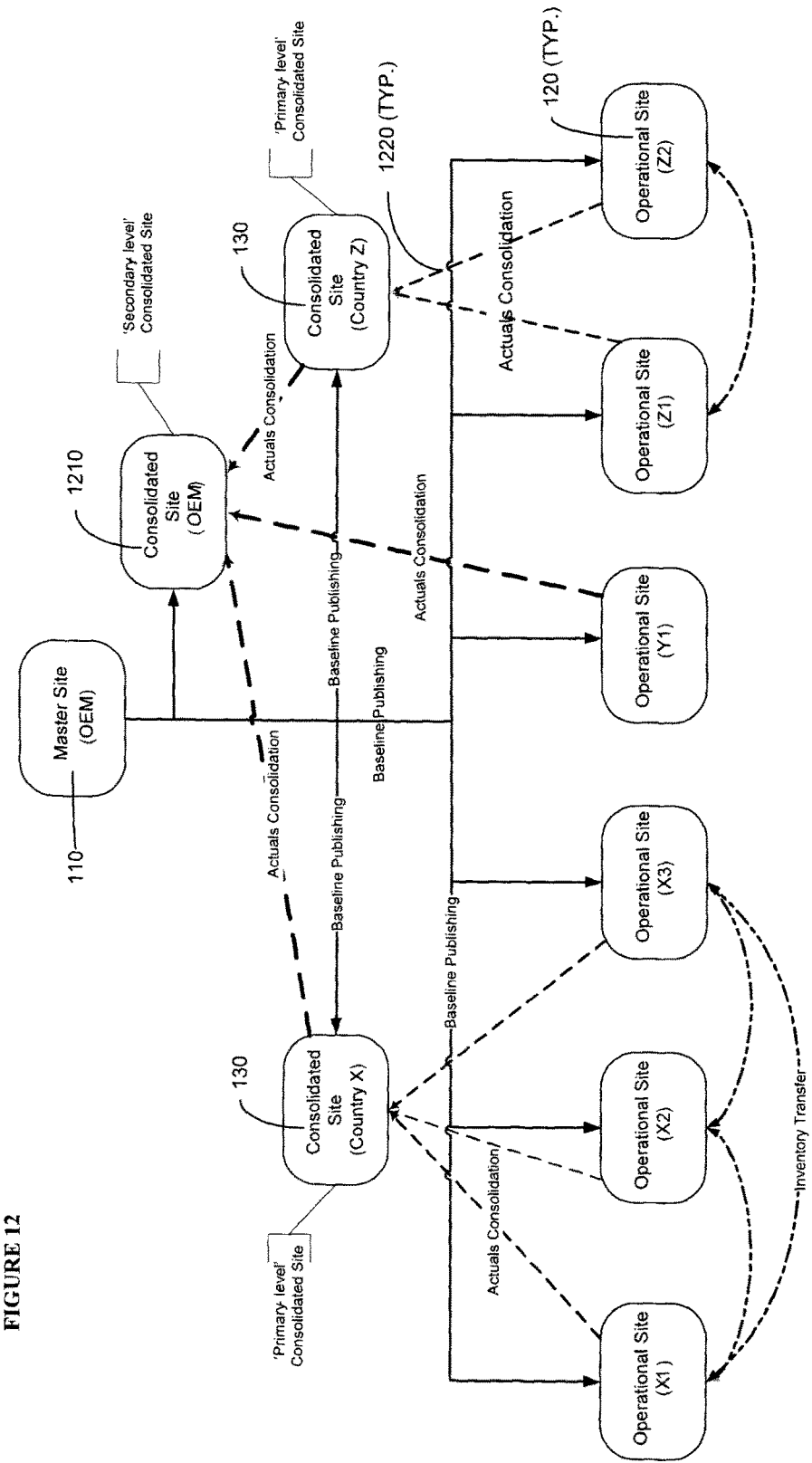
FIG. 12 presents a block diagram of a multi-tiered deployed system, in accordance with an embodiment of the invention.

FIG. 12 presents a block diagram of a deployed network setup with multi-tier consolidation. The Operational sites 120 consolidate their data to their direct level Consolidated Site 130. These "primary level" Consolidated sites 130 are then also consolidated at a global or "secondary level" Consolidated Site 1210. The Master site 110 publishes the baseline to every site 120, 130, 1210 in the deployed network.

5.2 Design

A Consolidated Site 120, 130 in a deployed network is created from a Master site 110 like any other satellite. It can be associated with only one Master site 110 but can have multiple Operational sites 120 and Consolidated sites 130, 1210 that share the same Master site 110 connected with it.

Since the configuration procedures and tables created for data replication between a Master site 110 and an Operational Site 120 are based on the concept of configuring a path from a source to a target, they can easily be re-used and modified to support the additional requirements needed to configure an Operational to Consolidated Site replication path 1220.

The process of associating an existing Consolidated Site 130, 1210 with an Operational Site 120 is started at the Operational Site 120 by adding the configuration entries into the DPO tables to configure the specific replication path. Once the path is configured, a procedure is called to generate the source and target configuration procedures, and generate a full dump of the schema.

When an Operational Site 120 is added to a Consolidator Site 130, 1210 a separate mirror schema of that Operational Site 120 is created and information about that schema is inserted into a tracking table. All data changes from the Operational Site 120 are replicated or imported in that schema. The same principles are applicable when a Consolidated Site 130, 1210 is added to another one.

Preferably, Consolidated and Operational sites 120 can only push data to one Consolidated Site 130, 1210. In other words, an Operational Site 120 preferably cannot have a replication path defined to two or more Consolidated sites 130, 1210.

The setup source and target procedures create the various components needed to keep an active replication between the Operational Site 120 and its mirror schema at the Consolidated Site 130, 1210. What components are created at each site is dependent on the transport type. This concept covers only one transport type:

EXPORT

This transport can only be used from an Operational Site 120 toward a Consolidated Site 130, 1210 or between a Consolidated Site 130, 1210 and another one. It consists of a full schema export at the source followed by an import at the target. This allows a site that is completely disconnected from its consolidator site 130, 1210 to have occasional full schema transfers. Oracle Standard can be used at an Operational Site 120 when this mode is used.

Other transport types may also be added. Different Operational sites 120 within a deployed network may choose different transport types. The replication path defined includes the transport method, and this is part of the initial setup.

The concepts behind aggregating the data between an Operational Site 120 and a Consolidated Site 130, 1210 or between a Consolidated Site 130, 1210 and another one are similar. The concepts described are also applicable to a Consolidated Site—Consolidated Site aggregation unless noted.

Figure 13:
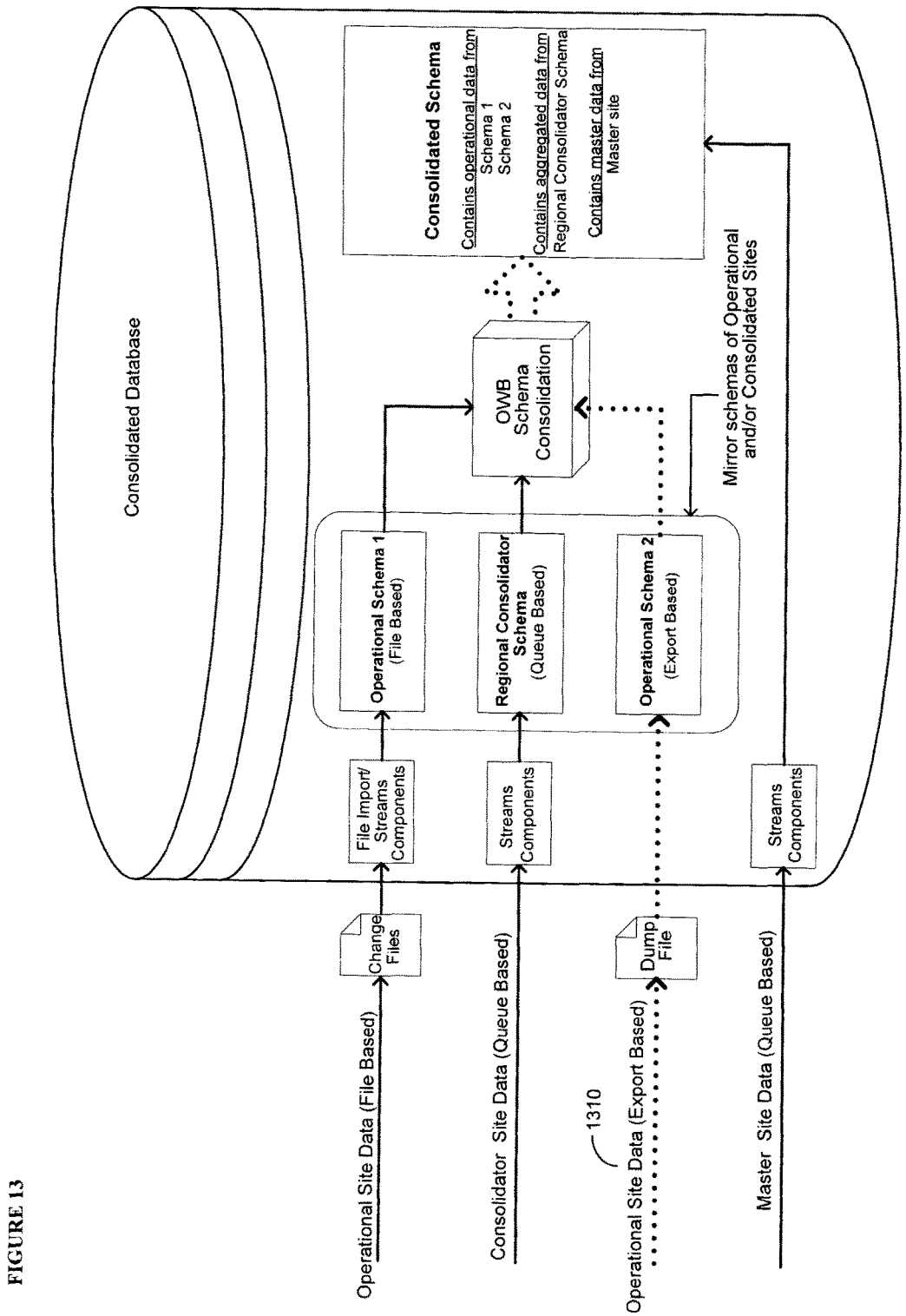
FIG. 13 presents a block diagram of a consolidator site, in accordance with an embodiment of the invention.

FIG. 13 presents a block diagram of a Consolidated Site and the different transport methods which can be used to aggregate data from the various source sites into the consolidated database. Only the path shown with the dotted line, 1310 is covered in this section.

5.2.1 Work Flows 5.2.1.1 Creating a Consolidated Site

Figure 14:
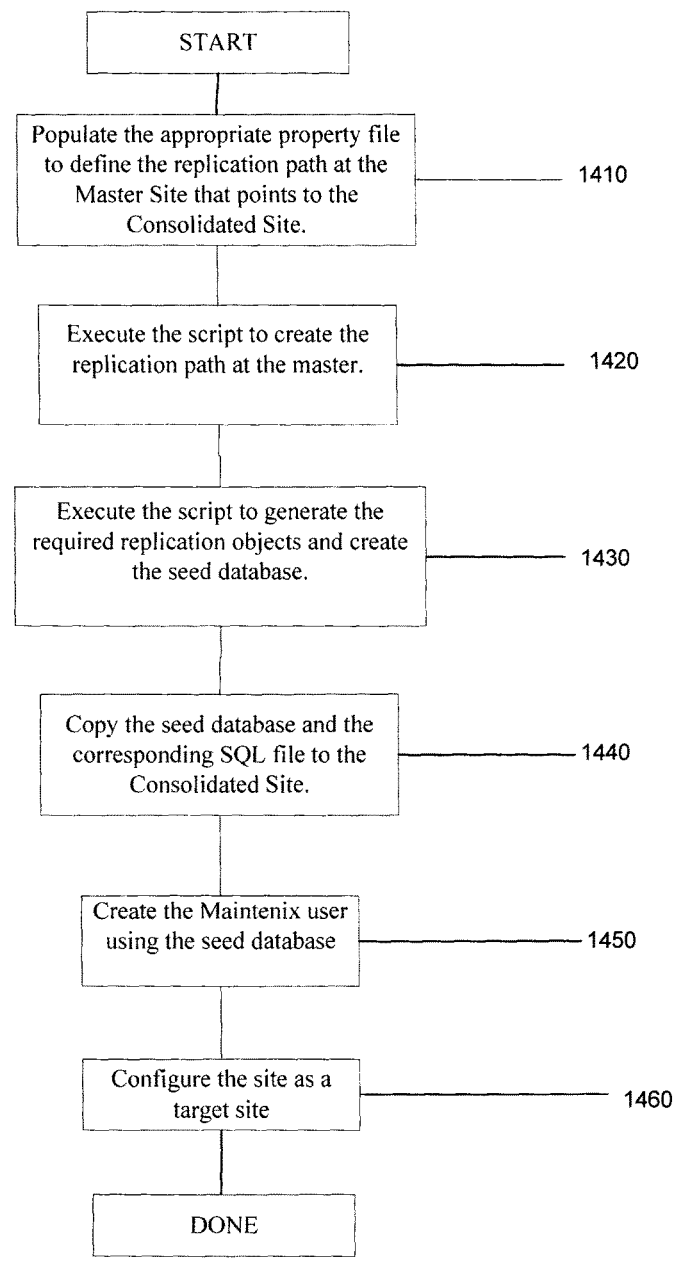
FIG. 14 presents a flow chart of a process for generating a new consolidator site, in accordance with an embodiment of the invention.

FIG. 14 presents a flow chart setting out the basic process for generating a new Consolidated Site 130. This process is similar to the process for generating an Operational Site 120. The Consolidated Site 130 is created based on a seed from the Master site 110.

At 1410, an appropriate property file is populated to define the replication path at the Master site 110, which points to the Consolidated Site 130. This property file contains various information used to configure the replication path at the master and consolidated site. A script to generate the replication path at the master site 110, is then executed at 1420. A script to generate the required replication objects and create the seed database is then executed at 1430. At 1440, the seed database and the corresponding SQL file are copied to the Consolidated Site 130. The Maintenix user is then created at 1450 using the seed database. And finally, at 1460, the site is configured as a target site.

5.2.1.2 Associating an Operational Site to a Consolidated Site

Figure 15:
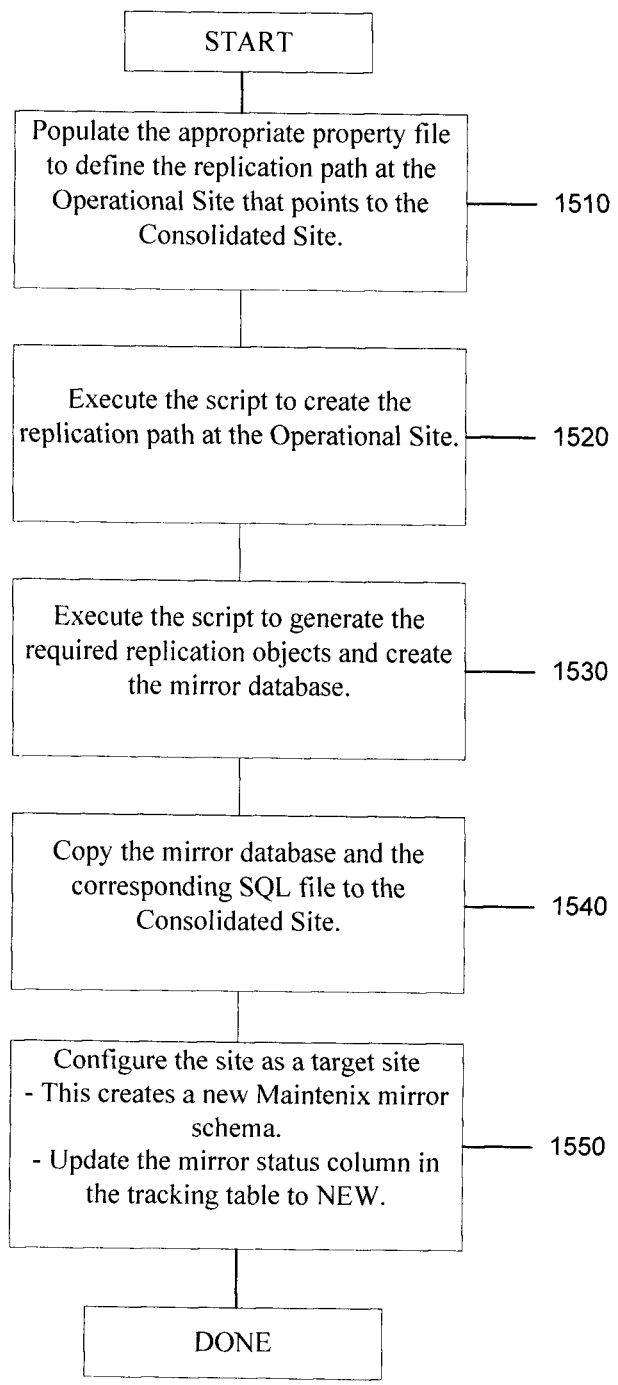
FIG. 15 presents a flow chart of a process for associating an operational site to a consolidator site, in accordance with an embodiment of the invention.

FIG. 15 presents a flow chart setting out the basic process steps required to associate an operational site 120 with a Consolidated Site 130. At 1510, the appropriate property file is populated to define the replication path at the Operational Site 120 that points to the Consolidated Site 130. This property file contains various information used to configure the replication path at the operational and consolidated site. A script to create the replication path at the Operational Site 120, is then executed at 1520. At 1530, a script to generate the required replication objects and create the mirror database is executed. The mirror database and the corresponding SQL file are then copied to the Consolidated Site 130 at 1540. And finally, the site is configured as a target site at 1550, creating a new Maintenix mirror schema and updating the minor status column in the tracking table to NEW.

Note that the same steps can also be used to associate a Consolidated Site to another Consolidated Site.

5.2.1.3 Consolidating an Operational Site

Figure 16:
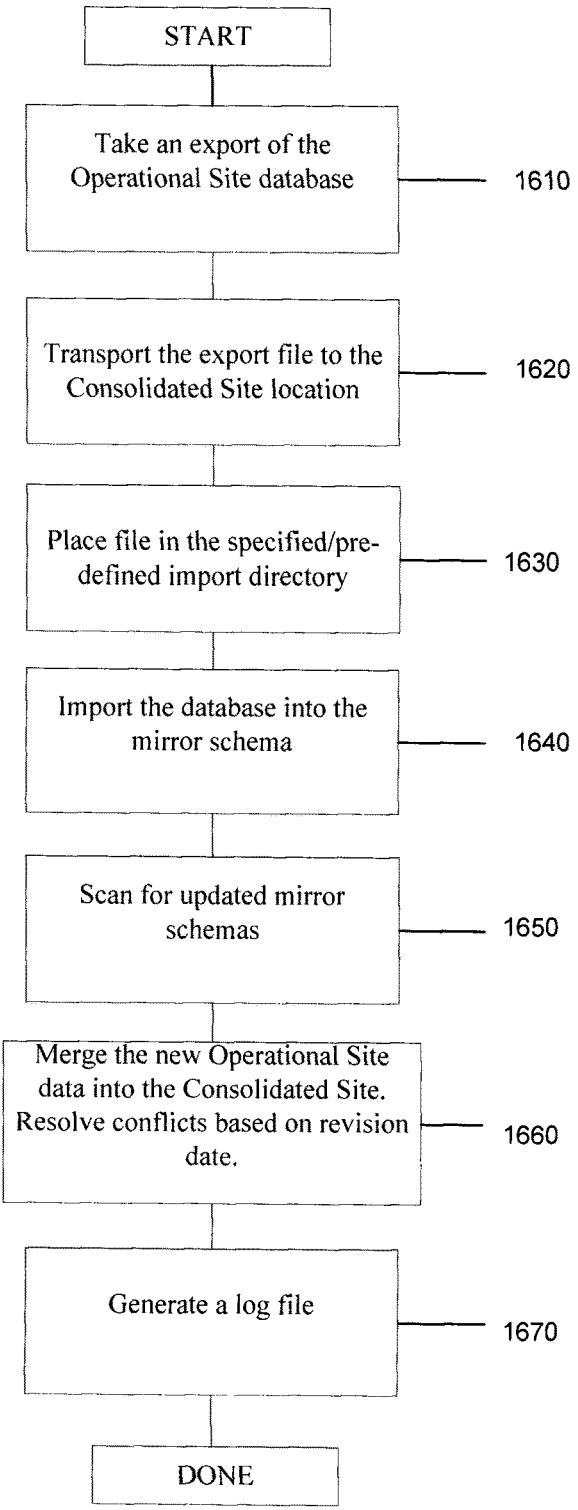
FIG. 16 presents a flow chart of a process for consolidating data from an operational site into a consolidator site, in accordance with an embodiment of the invention.

FIG. 16 presents a flow chart setting out the basic process required to consolidate data from an Operational Site 120 into a Consolidated Site 130.

At 1610, an export of the Operational Site 120 database is taken. This step is either initiated manually or automatically triggered based on a scheduled job (Oracle job). The utility script named export-schema may be used to take the export. At 1620, the export file is then transported to the Consolidated Site location. This may be performed as a manual step. At 1630, the file is then placed in the specified/pre-defined import directory; again, this may be done as a manual step.

The database is then imported into the mirror schema at 1640. This step is automatically triggered by a job that monitors the import directories, using the utility script named import-schema to import the database. Before beginning the import, update the tracking table to indicate the status is LOADING. After importing the database, update the mirror status column in the tracking table to UPDATED.

At 1650, then scan for updated mirror schemas. It is preferable to initiate the scan in off-hours (in the form of a nightly Oracle job) in order to prevent the rebuilding of data while the users are accessing the database. This is done by looking at the tracking table for schemas that are marked as either NEW or UPDATED, and compiling a list. See detailed design section for priority.

The new Operational Site data is then merged into the Consolidated Site at 1660. Conflicts may be resolved based on revision date. In order for conflicts to be resolved accurately, it is necessary for all sites to be time synchronized. Before beginning to consolidate, the status is updated in the tracking table to RUNNING. After successfully completion, the status in the tracking table is updated to CONSOL.

Finally, a log file is generated at 1670. The log file contains a summary of the status of the data in the Consolidated Site 130. For each Operational site 120 or Consolidated Site 130 the log file identifies:

the date it was last merged; highlighting if the merge occurred as part of the most recent process, and
any failures or non-resolved conflicts.

The same steps can be used to consolidate data from one Consolidated Site 130 into another Consolidated Site 130.

6. Consolidated Concept—Detailed Design

This section presents the detailed changes and features required to allow consolidation of operational data at a Consolidated Site 130.

6.1 Datamodel Changes

Figure 17:
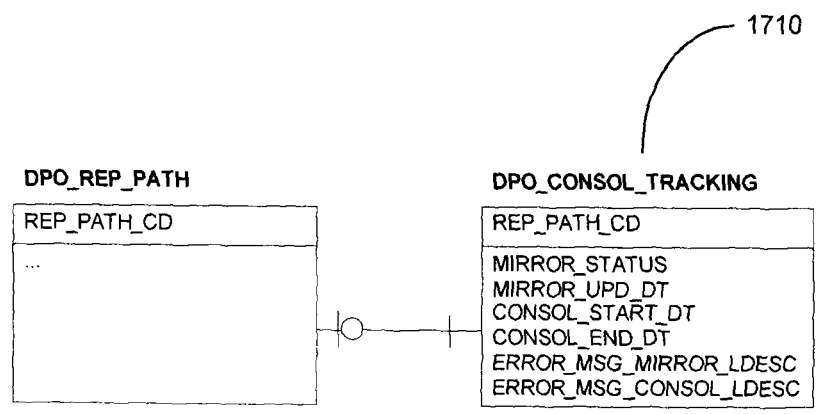
FIG. 17 presents the association of a new data table required to support the consolidation process, in accordance with an embodiment of the invention.

The new table DPO_CONSOL_TRACKING 1710, as shown in FIG. 17, is needed to support the consolidation process. This table is used by a job that runs at specific intervals to monitor which minor schemas need to be consolidated. Using that information, the job triggers the OWB consolidation process to aggregate the data from that schema into the main consolidator schema.

| | | DPO_CONSOL_TRACKING | | |
|---|---|---|---|---|
| Key | Column name | Data type | Not Null | Description |
| PK | REP_PATH_CD | Varchar2 (8) | YES | The rep path CD associated with this consolidator tracking entry. |
| | MIRROR_STATUS | Varchar2 (8) | YES | Status of the mirror site; Valid values are 'LOADING', 'NEW', 'UPDATED' 'RUNNING', 'CONSOL', and 'ERROR'. |
| | MIRROR_UPD_DT | Timestamp | YES | Timestamp of the last update/refresh of the mirror schema. |
| | CONSOL_START_DT | Timestamp | NO | Timestamp indicating the last time a consolidation was started on this schema. Null if consolidation was never run for this schema. |
| | CONSOL_END_DT | Timestamp | NO | Timestamp taken when the consolidation completes on this schema. Null if consolidation was never run for this schema. |
| | ERROR_MSG_MIRROR_LDESC | Varchar2 (4000) | NO | Error or warning message associated with the mirror process execution |
| | ERROR_MSG_CONSOL_LDESC | Varchar2 (4000) | NO | Error or warning message associated with the consolidation process execution |

Figure 18:
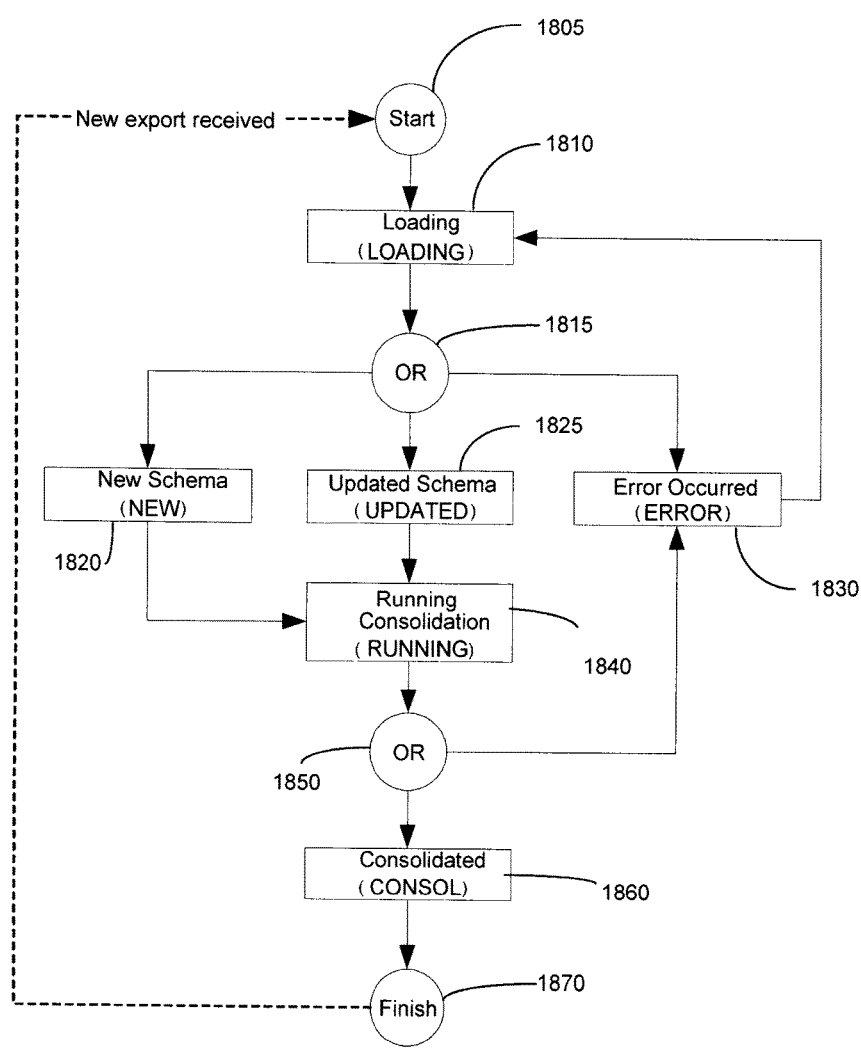
FIG. 18 presents a flow chart of a process for receiving new export files, in accordance with an embodiment of the invention.

The life cycle diagram in FIG. 18 corresponds to the MIRROR_STATUS column in the DPO_CONSOL_TRACKING table. The process begins 1805 each time a new export is received. The export is loaded 1810 and the MIRROR_STATUS column updated to "LOADING". A determination is then made at 1815, as to whether the export is a new schema or an update. New schema are loaded at 1820, and the MIRROR_STATUS column updated to NEW. If an existing schema is updated at 1825, then the MIRROR_STATUS column is updated to "UPDATED". If an error occurs in determination, then an error message is issued 1830 and the MIRROR_STATUS column updated to "ERROR". An attempt is then made to load the new export again at 1810.

After the schema is updated or installed, the consolidation is run at 1840. If an error occurs in consolidation 1850, then an error message is issued 1830 and an attempt is made to load the new export again 1810. After successful consolidation, the MIRROR_STATUS column is then updated to CONSOL at 1860 and the process finishes at 1870, to await arrival of a new export.

6.2 Inventory Transfer Changes

It is important at a Consolidated Site 130 to know which Operational Site 120 has control over an inventory item. To be able to do this, the field CTRL_DB_ID is updated on the inventory tables when they are transferred to a new site using Inventory Transfer. The CTRL_DB_ID of the inventory row is also updated to the value of the DBid found in the local_mim_db table at the target database.

There is also a CTRL_DB_ID field related to event records, which like the inventory record, is updated during inventory transfer at the time of import.

Since inventory transfer sometimes bypasses triggers, it is important that the revision_dt field on the various tables is updated to SYSDATE when a row is inserted or updated and the triggers are disabled on that table.

6.3 Creating a New Consolidated Site and Adding Operational Sites

A new Consolidated Site 130 is always created from a master site 110. The process is similar to creating a replication path between a master site 110 and an Operational Site 120 and uses the same administrative procedures.

The seed generated at the Master site 110 when configuring the new replication path is used as the base for the Consolidated Site 130. No actuals should be present in that seed and once the target Consolidated Site 130 has been created using that seed, the baseline should replicate from the Master site 110 to that Consolidated Site 130.

The main difference is that baseline synch is not triggered at a Consolidated Site 130 when baseline changes are replicated. The changes to the actuals come from the Operational sites 120 when they are aggregated at a Consolidated Site 130.

Adding an Operational Site 120 to an existing Consolidated Site 130 is initiated at the Operational Site 120 by creating a new replication path between the Operational Site 120 and the Consolidated Site 130. The seed generated at the Operational Site 120 is a full schema dump that will be the mirror schema at the Consolidated Site 130.

Adding a Consolidated Site 130 to another Consolidated Site 130 follows the same procedure as adding an Operational Site 120 to a Consolidated Site 130.

6.4 Replication Path Creation Changes

Some changes are needed to the various tables, packages and procedures developed to create and administer a replication path between a source and a target site.

Creating a replication path to a Consolidated Site 130 uses the same process that was defined for creating a path between a Master site 110 and an Operational Site 120. The replication path is always created at the source site which can either be an Operational Site 120 or another Consolidated Site 130. The deployed configuration tables are populated with data describing the replication path available to the source database before a replication path configuration can be created.

The following changes are made to the overall deployed environment:

a new rule-set for the Master→Consolidated data is defined: 'Master Consolidated Data':
  the existing 'Master Data' ruleset is renamed to 'Master Operational Data';
  all the current tables associated with the 'Master Operational Data' ruleset are duplicated and associated with the 'Master Consolidated Data'. There should not be any baseline synchronization handlers associated with these tables since those changes come from the Operational sites 120; and a new rule-set for the Operational-*Consolidated data is defined: 'Operational Consolidated Data'.

Changes to the create/configure replication path procedure and the associated generated source setup procedure are as follows:
  validation should allow a replication path to be created between a source and a target site that both have the CONSOLIDATED type. This allows the creation of a replication path between local and global Consolidated sites 130; and
  if the type of source site is OPERATIONAL or CONSOLIDATED and the transport type is EXPORT, no specific components are created at the source site for data replication. This is only possible at an Operational site 120 or Consolidated Site 130 when the target of that site is a Consolidated Site 130.

The generated target procedure was also modified as indicated. Note that these instructions are all applicable when the target site is of CONSOLIDATED type:
  if the transport type is EXPORT, no specific stream components are created at the target mirror site for data replication; and
  if the type of source site is MASTER, the target procedure has to use the 'Master Consolidated Data' ruleset to generate the stream components for the Consolidated Site 130. No handler should be generated for baseline synch.

Changes to the installation scripts were made to handle the following requirements when adding an Operational site 120 or a Consolidated Site 130 to a Consolidated Site 130:
  if the source is OPERATIONAL or CONSOLIDATED type, the configure target site script should be modified to insert a row corresponding to the replication path code in the DPO_CONSOL_TRACKING table. The STATUS column should be set to 'NEW' and the MIRROR_UPD_DT column should be set to the current time.

A new utility script named export-schema was created. This script allows a deployed administrator to easily generate a dump of the operational/consolidated schema to package and transfer to a Consolidated Site 130. The script prompts for a replication path code and a folder location (for the generated schema dump) as input:
  this script is preferably only allowed to run when the target for the replication path is a consolidator and the transport type is 'EXPORT';
  using the provided replication path code, the source schema name can be retrieved from the DPO_REP_PATH table. The retrieved schema is the one that needs to be exported. When exporting using data pump, future CDC considerations have to be accounted for. The requirements to achieve that are set out in the Oracle® Database Data Warehousing Guide—Change Data Capture, incorporated herein by reference;
  the dump file is preferably named <rep.path.cd>-<schema name>.dmp and is located in the provided folder location. For example, the file name for the dump of replication path M01 that maps to a source schema of MXI would result in a file name of M01-MXI.dmp; and a log is generated for the full process.

A new utility script named import-schema was also created. This script allows a deployed administrator to easily load a mirror schema of an operational/Consolidated Site using a dump file. The script prompts for a replication path code and a folder location (for the schema dump file location) as input:

this script is preferably only allowed to run when the transport type for the replication path is 'EXPORT';

using the provided replication path code, the target mirror schema name can be retrieved from the DPO_REP_PATH table. The retrieved schema is the one that needs to be refreshed;

using the source schema and rep.path.cd, load the dump file from the provided location. A schema transformation refreshes the mirror schema, which should have a different name than the source;

this script can only refresh an existing mirror schema, not create a new one. If the target mirror schema is not found, the script should terminate in an error;

once the mirror schema has been refreshed, the row corresponding to the replication path code in the DPO_CONSOL_TRACKING table is updated with the time of the schema refresh and the status set to 'UPDATED'; and a log is generated for the full process.

6.5 Schema Consolidation

The Consolidated Site schema is a consolidated view of all the mirror schemas at a given time. In order to do this, a mechanism is in place to detect when a mirror schema was refreshed and trigger the rebuilding of the Consolidated Site schema. This is done by having an Oracle job that scans a list of mirror schemas for modifications since the last time a consolidation was done for that specific schema. This job is preferably scheduled by default to run nightly.

6.5.1 Consolidation Dispatch Job

Figure 19:
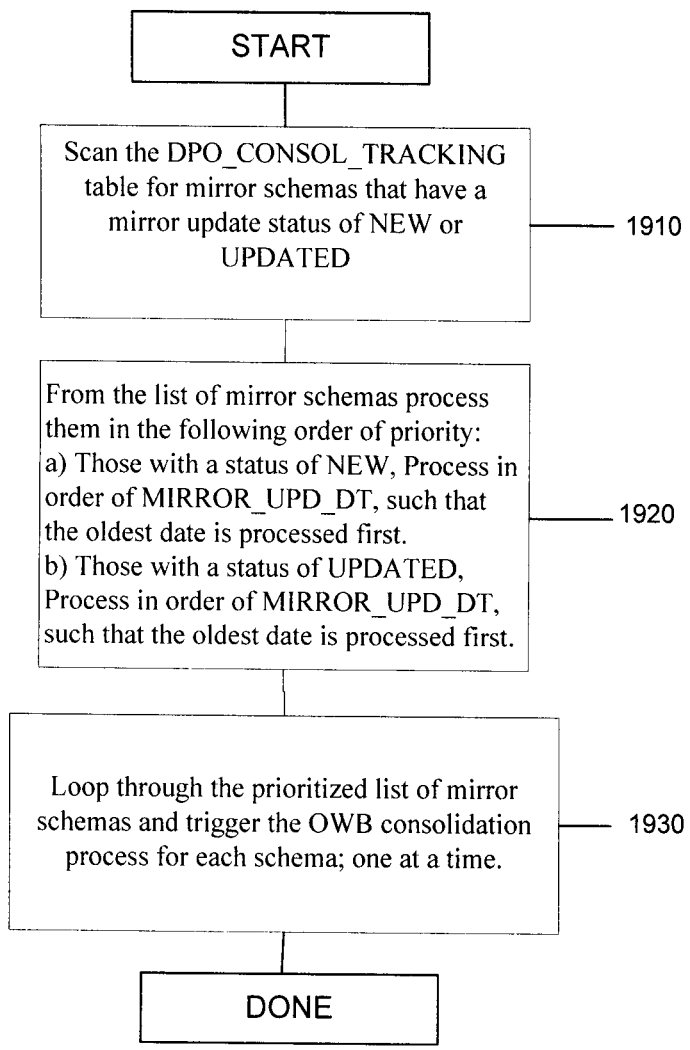
FIG. 19 presents a flow chart of a process for a consolidator dispatch job, in accordance with an embodiment of the invention.

A new Oracle job was created that can only run at a Consolidated Site 130. That job was named DPO_CONSOL_DISPATCHER and runs at a configurable interval. This job preferably performs the process shown in the flow chart of FIG. 19.

Firstly, at 1910 a scan is performed of the DPO_CONSOL_TRACKING table for minor schemas that have a mirror update status of NEW or UPDATED. From the list of minor schemas found, process them in the following order of priority at 1920. Those with a status of NEW, are processed in order of MIRROR_UPD_DT, such that the oldest date is processed first. Those with a status of UPDATED, are processed in order of MIRROR_UPD_DT, such that the oldest date is processed first.

Then, loop through the prioritized list of mirror schemas at 1930 and trigger the OWB consolidation process for each schema; one at a time. Note that the aggregation of schemas cannot be done in parallel. If an OWB aggregation is in process, the job should not trigger another one.

6.5.2 Oracle Warehouse Builder

Oracle Warehouse Builder (OWB) with the ETL (Extract, Transfer, Load) option is used to aggregate the data from the multiple schemas into the consolidated schema. The process is triggered by the consolidation dispatch job when a minor schema has been modified and needs to be consolidated into the main schema. The data that is aggregated is from the operational tables only. The master data is preferably not aggregated in a consolidator site 130 since it comes from the Master site 110.

There are two types of aggregation that can be done with OWB. One is the initial load when a new operational schema is added to a consolidator site 130, and the other one is when change deltas have to be processed from the minor schema. The mappings used may be different since the data is not retrieved from the same tables. This concept is only concerned with the initial load data.

Figure 20:
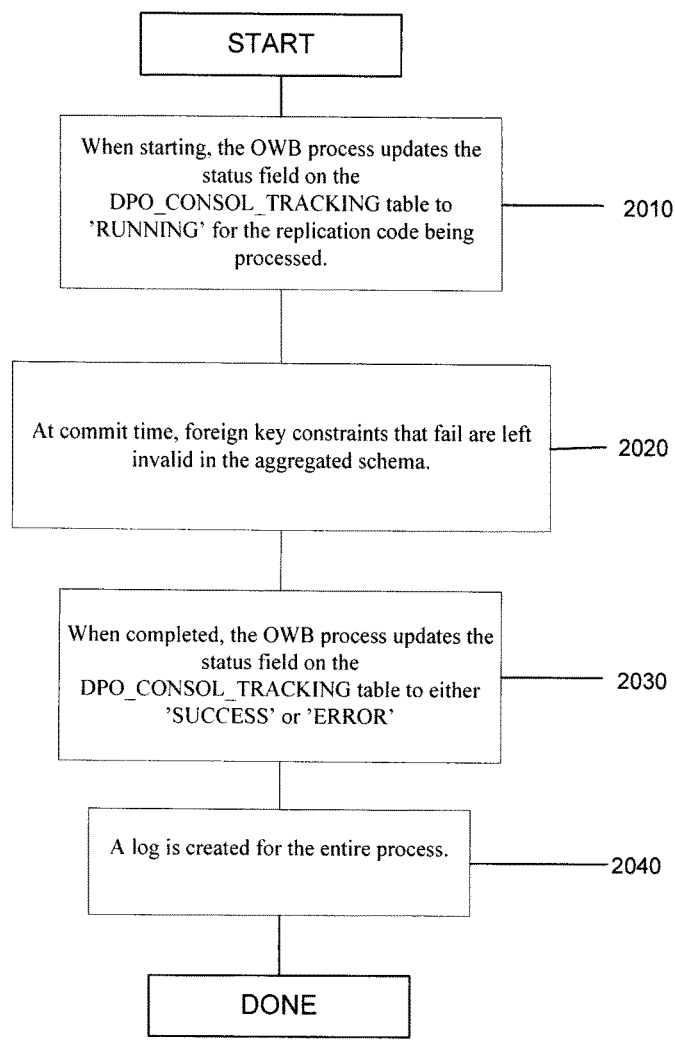
FIG. 20 presents a flow chart of a process for aggregating data from multiple schemas into the consolidated schema, in accordance with an embodiment of the invention.

The items set out in the flow chart of FIG. 20 are preferably taken into consideration by the OWB process for both an initial load or when processing the deltas from a mirror schema. When starting at 2010, the OWB process updates the status field on the DPO_CONSOL_TRACKING table to 'RUNNING' for the replication code being processed. All operations are done using deferred constraints in the aggregated schema to avoid problems with order of operations.

At commit time 2020, foreign key constraints that fail are left invalid in the aggregated schema. This situation can occur when changes to the baseline did not make it yet into the consolidator site 130. Once the baseline is updated on the consolidator site 130, the relationship will be valid. Invalid FK constraints should be identified in the log as a warning but all other failures should raise an error.

When completed, the OWB process updates the status field on the DPO_CONSOL_TRACKING table to either 'SUCCESS' or 'ERROR', at 2030. A log is then created for the entire process at 2040.

6.5.2.1 Mutable Data

The Consolidated Site 130 does not contain any mutable data created at the Operational sites 120 (i.e. local data). When aggregated, this data is rolled up to nearest global data (for locations) or converted to blackout/global data. This is the same set of tables as used in inventory transfer.

6.5.2.2 Handling Deletes

In this embodiment of the invention, no comparison is made between the mirrors and the consolidated database to find deleted rows. Instead, the Consolidated Site database is rebuilt every time.

7 Inventory Transfer

7.1 Overview

In terms of domain, inventory transfer means that a piece of inventory (e.g. aircraft or engine) in its entirety has been physically moved from one organizational partition to another. All data related to the aircraft/engine is also transported across to the new partition in the form of a logbook.

In terms of the system of the invention, each organizational partition has its own database. This means that the inventory record as well as its history must be transferred over from one database to another. The transfer is not a simple copy of data. The data concerning the inventory must be transferred to the new database.

A user can use inventory transfer in two forms: Aircraft transfer and Shipment transfer.

Aircraft transfer is initiated from the Inventory Details page for the aircraft. The user simply clicks on the "Export to File" button and the aircraft record is exported to file. A deactivated copy of the aircraft record is left behind at the source database.

Shipment transfer is initiated from the Shipment Details page. The user clicks on the "Export to File" button and the shipment record along with all inventory records on the shipment line items are exported to file. Deactivated copies of the inventory records are left behind at the source database. Note that the shipment preferably is sent before the "Export to File" button appears.

Once the user has the file in-hand, it can be transferred to the destination database server. The files are copied onto a user specified file folder on the server. The user launches the Import Search page where the import file can be selected and imported.

7.2 Known Limitations

This section summarizes the current limitations of the inventory transfer feature. The limitations are what are most important from the customer perspective. They are broken down into the following types: Data Visibility, Workflow, Technical and Record Types.

7.2.1 Data Visibility

Once an asset has been transferred, the user is able to search for and view the details of the asset. The inventory will not appear in any drop down list, or any assignment search pages.

7.2.2 Workflow

Once an asset has been transferred, the asset is effectively gone from the local system. This affects long range maintenance planning activities if the asset is expected to return to the source site. Visibility of the carbon copy data is permitted, but there is no ability to edit the data. With the exception of the Close button, all action buttons on the details pages, including the action buttons on the tab pages, are hidden when viewing carbon copy data.

Links to part requests are broken. This affects long range maintenance planning activities if the asset is expected to return to the source site.

Automatic serial number resolution for user entered data is prevented. If the user supplied serial number/part number combination corresponds to a known inventory record that has been transferred out of the current site (i.e. only a carbon copy exists), the system does not try to resolve it by creating a placeholder inventory with 'XXX' serial number in its place.

If an import file contains an inventory record (e.g. aircraft, engine, installed or loose subcomponent) which exists in an active state in the target database, the import is preferably stopped. The user needs to determine which copy of the record, the one in the file, or the one in the target database is the correct. It is likely that they will need to export the active copy in their database before proceeding to import the file.

7.2.3 Technical

Inventory transfer is restricted to transfers between Operational sites 120 with Baseline Publishing replication paths directed from the same Master site database. The export and import file directory locations must be accessible by the database server.

Inventory transfer deletes neither inventory nor event records from the originating operational site in order to maintain referential integrity to assets not transferred. Attachments are typically not transferred due to performance considerations. This includes E-signatures associated with a task, pictures attached to fault records, etc. At the source site there is no indication that a file was attached to the record. Other limitations are as follows:

Barcode Uniqueness:
- By default, the system uses the local database ID as part of the barcode generation to ensure system-wide uniqueness.
- In certain cases, a barcode value can be manually entered into the system. Since there are no ways to validate if the user defined barcode value exists within the entire distributed system, this action must be secured through business process.

EMA (External Maintenance Adapter) may create records against carbon copy asset at operational sites 120. The use of EMA is controlled via a business process to ensure that no live data are created against carbon copy assets.

Materials Adapter is able to create records at all site types. The use of Material Adapter and their message types must be controlled via business process to ensure that:
- No baseline data is created at operational sites 120.
- No baseline data is manipulated at operational sites 120.
- No live data are created against carbon copy asset data at operational sites 120.

7.2.4 Record Types

A number of record types are preferably not transferable, including the following: financial records, order records, order invoice records, Request for Quote records, Warranty information, Claim information, and Long Range Planning data.

As well, Production Planning & Control (PP&C) data information is stripped from scheduled tasks upon inventory transfer if the PP&C definition is local to the originating operational site. Tools that are checked out are preferably non-transferable.

7.2.5 Adapters

The use of adapters must be restricted depending on the site type to prevent creation of malformed data. The design parameters are as shown in the following table:

| Adapter | Applicable Site Types | Restrictions |
| --- | --- | --- |
| Diagnostics | Master Operational | At the master site 110, the use of this adapter is restricted to only send Create Fault Definition message. |

| Adapter | Applicable Site Types | Restrictions |
|---|---|---|
| External Maintenance | Operational | At an operational site 120, the use of this adapter is restricted to prevent creation of live data against carbon copy assets. The use of this adapter is restricted to prevent creation of live data against carbon copy assets. |
| Finance | Operational | Financial transaction data may be incomplete at an operational site 120 for a given asset. The use of this adapter is investigated on a message and asset basis. |
| Flight | Operational | The use of this adapter is restricted to prevent creation of live data against carbon copy assets. |
| HR | Master, Operational | The use of this adapter is restricted to prevent user deletion. |
| Materials | Master, Operational | At the master site 110, the use of this adapter is restricted to only use Create and Activate Part Definition messages. At an operational site, the use of this adapter is restricted to all messages except Create and Activate Part Definition messages. |
| Procurement | Operational | The use of this adapter is restricted to prevent creation of live data against carbon copy assets. |
| Shipping | Operational | The use of this adapter is restricted to prevent creation of live data against carbon copy assets. |

7.3 Foreign Key Propagation Approach

Due to the tight integration of data in the system, one cannot simply cut and paste inventory records from one database to another. All foreign key constraints remain intact at the source database for the software to function properly.

To propagate the foreign key structure to an acceptable level, when inventory data is exported, some of foreign key target rows are also exported alongside the main data. However, these target rows themselves may contain foreign keys. Transferring the entire recursive foreign key target rows would simply be too much data to transfer between the databases.

To avoid this problem, three kinds of data are defined: Active, Carbon Copy, and Blacked Out. This system of data types allows us to transfer a minimum amount of data and still maintain the foreign key structure.

7.3.1 Active Data

The active copy of the inventory records is the set of data that is fully accessible by the business logic at the destination database. This set of data is virtually indistinguishable from the data generated at the destination database. The only difference is that it retains the unique database identifier value in every row transferred.

7.3.2 Carbon Copy Data

Carbon copy data is the placeholder data that is used by the active data to preserve the foreign key integrity. This type of data has been known as "shadow records" in the past.

There are two kinds of carbon copy data. The first kind is an exact copy of the inventory records being transferred and remains behind at the source database to preserve the foreign key constraints. In fact, they are the original rows that are marked as carbon copy. By leaving behind a carbon copy of the data, the records in the source database remain intact. The carbon copy inventory records are protected from all types of user and system interactions so that they cannot be modified at all.

The second kind is transferred along with the active data being transferred to preserve the foreign key constraints at the destination database. These are copies of the target rows of the foreign keys from the active data being transferred. They are marked as carbon copy at the destination database only. As with the carbon copy data left behind at the source database, this kind of carbon copy inventory records are protected from all types of user and system interactions. Note that this kind of carbon copy data could potentially be a carbon copy of another carbon copy data.

7.3.3 Blacked Out Data

Blacked out data consists of placeholder rows at the destination database only to satisfy a foreign key constraint. Note that this is different from preserving a foreign key integrity.

Placeholder rows of this kind become necessary if the carbon copy record being transferred along with the active data also has a foreign key to other records that are not necessarily of interest. An example of this situation is when a piece of inventory to be transferred references an OEM (Original Equipment Manufacturer) assembly. The OEM assembly is the assembly on which the inventory was first delivered by the manufacturer. Although a carbon copy of the OEM assembly is transferred along with the inventory, the OEM assembly's record has foreign keys to other records; records such as the original purchase order information. Since there is no interest in taking that information along, that foreign key should be redirected to a placeholder row at the destination database. In effect, a carbon copy of the OEM assembly information is taken, but the original purchase order information is blacked out.

Technically speaking, the blacked out data are a set of predefined zero-level rows. The blacked out foreign key is restored to proper foreign key if the active copy of that data is transferred to the destination database. In the above example, if the OEM assembly itself was transferred to the destination database thereafter, the blacked out data foreign key values are overwritten, thus restoring the link to the original purchase order information of the OEM assembly at the destination database.

Blacked out data are protected from all types of user and system interactions. This set of data may also be filtered out from some user interfaces.

7.3.4 Transfer Data Set Growth

Using these concepts, the following scenarios can be handled:

1. inventory transfer from one database to another database;
2. subsequent transfer of inventory to different databases; and
3. subsequent transfer of inventory to one of the source databases.

The above set of scenarios implies that carbon copies of carbon copy data will exist in the system. This means that the file size of the inventory will keep growing as it interacts with other data and collects history.

7.3.5 Example

Figure 21:
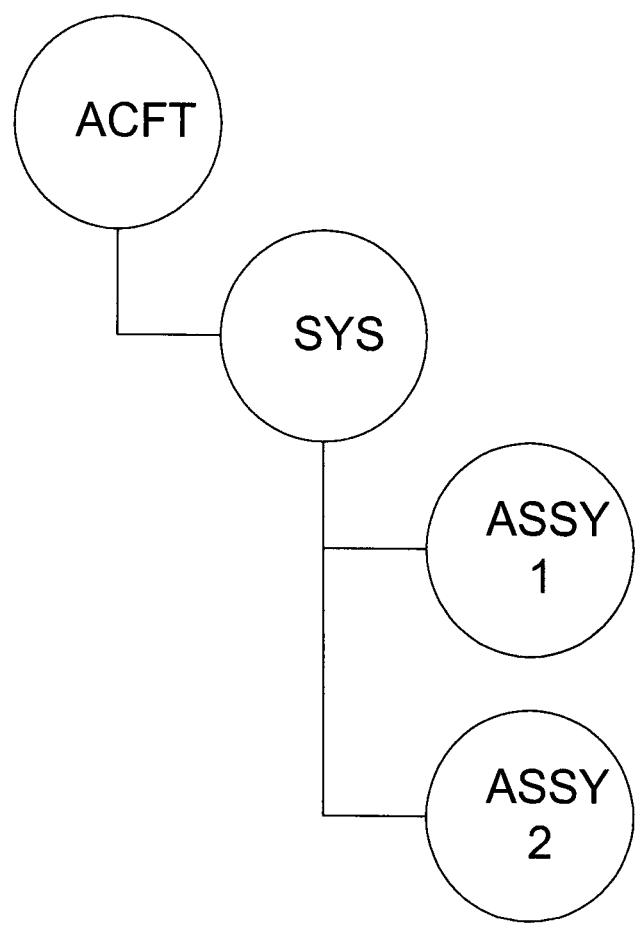
FIG. 21 presents a block diagram of an exemplary inventory hierarchy, in accordance with an embodiment of the invention.

Consider the inventory hierarchy of FIG. 21 where:
ACFT is an inventory class representing an aircraft.
SYS is an inventory class that represents a group of parts that are spread across the aircraft, like a fuel line.
ASSY1, ASSY2 are inventory classes that represent big components of an aircraft, like an engine or auxiliary power supply.

The ASSY1 assembly is to be removed and transferred to another database. For this example, assume that there is only a single usage parameter being tracked. Also assume that ASSY1 has never been transferred to the destination database prior to this occasion.

When ASSY1 is detached, following data is generated in the database:
one EVT_EVENT row for the configuration change event.
one EVT_INV row whose:
 highest inventory link points to ACFT.
 next highest inventory link points to SYS.
 assembly inventory link points to ACFT.
 MAN_INV_BOOL is 1.
a single EVT_INV_USAGE rows to capture the usage parameter values at the time of the event.

When ASSY1 is transferred to another database, the following occur at the destination database:
The ASSY1 record is recreated.
The event record is recreated.
The EVT_INV record is recreated.
The EVT_INV_USAGE record is recreated.
For configuration change event, it is important to preserve the surrounding configuration upon event logging, therefore the foreign keys on the EVT_INV row must be preserved. To this end, the following also occur:
 ACFT record is recreated as carbon copy in both INV_INV and INV_AC_REG. Any foreign keys that cannot be realized are redirected to the blacked out row in appropriate tables.
 SYS record is recreated as carbon copy. Any foreign keys that cannot be realized are redirected to the blacked out row in appropriate tables.

As well, when ASSY1 is transferred to another database, the following occur at the source database:
The ASSY1 record is marked as carbon copy.
The event record is marked as carbon copy.

7.4 Maintenix Schema Modifications

To handle the inventory transfer system, a few adjustments must be made to the current Maintenix system schema.

7.4.1 RSTAT_CD DATA TYPE

The check constraint on the RSTAT_CD data type in the schema must be updated to the following:
RSTAT_CD IN (0, 1, 2, 3)

7.4.2 MIM_RSTAT

In the current Maintenix schema, each table has a foreign key to MIM_RSTAT named RSTAT_CD which was used to track the status of each row. Each row could have the status of Active, Inactive, or Soft Delete. The RSTAT_CD was once used in every single query in the system to ensure that rows in certain status did not show up on the user interface or were protected from the background system processes. The standard of incorporating RSTAT_CD in queries was abandoned several years ago when it was decided that the product no longer needed the row status tracking system. For the Deployed Operations Inventory Transfer system, this system is being reused to mark rows as carbon copy.

Prior to implementing the Deployed Operations system, the MIM_RSTAT table contained the following values:

| RSTAT_CD | RSTAT_SDESC |
|---|---|
| 0 | Active |
| 1 | Inactive |
| 2 | Soft Delete |

The data are modified as follows:

| RSTAT_CD | RSTAT_SDESC |
|---|---|
| 0 | Active |
| 1 | Carbon Copy |
| 2 | Soft Delete |
| 3 | Blacked Out |

To mark a row as carbon copy, one simply sets the RSTAT_CD of the row to 1.

7.4.3 SCHED_STASK

The FK_MAININV_SCHED_STASK foreign key constraint is modified to be NULLABLE. The following queries were also updated so that the joins to SCHED_STASK using this foreign key are OUTER JOINs.
GetWorkPackagesINWORK.qrx
FleetDueList.qrx (2 matches)

7.5 Maintenix Modifications

Since the carbon copy and blacked out data should not be manipulated, it is desirable that the Maintenix system code filters out these data.

7.5.1 Dropdown Queries

All queries in the com.mxi.mx.web.query.dropdown package have the following constraint in the "where" clause.
<ref_term_table_name>.rstat_cd=0

7.5.2 Details Pages

7.5.2.1 Carbon Copy Data

The following details pages were modified so that if a hyperlink was followed to the page whose key represents carbon copy data, the following message is shown to the user: "This record is a carbon copy of live data from another database."
  InventoryDetails.jsp
  OrderDetails.jsp
  PartRequestDetails.jsp
  CheckDetails.jsp
  TaskDetails.jsp
  FlightDetails.jsp
  FaultDetais.jsp
  UserDetails.jsp
  ShipmentDetails.jsp
  EventDetails.jsp For each of these pages, when retrieving the details data, we also bring back the value of the RSTAT_CD. If the value is 1, then we should show the following message at the top of the page:
  This record is a carbon copy of live data from another database, therefore, it cannot be modified.
  Where web.msg.THIS_RECORD_IS_CARBON_COPY is an internationalized message in mxweb/i18n/web/msg_e-n_US.properties file.

With the exception of the Close button, all action buttons on the page including the ones on the tab pages are hidden when viewing carbon copy data. When the OK button on the message page is pressed, the user should be returned to the previous page.

7.5.2.2 Blacked Out Data

The following details pages are modified so that if a hyperlink was followed to the page whose key represents blacked out data, the following message is shown to the user: "This record is not available at this database."
  InventoryDetails.jsp
  OrderDetails.jsp
  PartRequestDetails.jsp
  CheckDetails.jsp
  TaskDetails.jsp
  FlightDetails.jsp
  FaultDetails.jsp
  UserDetails.jsp
  EventDetails.jsp For each of these pages, when retrieving the details data, we also bring back the value of the RSTAT_CD. If the value is 3, then the following code is executed:

```
throw new MessagePageException(
  i18n.getLocalizedMessage(
    "web.msg.THIS_RECORD_IS_UNAVAILABLE_AT_THIS_DATABASE" ) );
```

Where web.msg.THIS_RECORD_IS_UNAVAILABLE_AT_THIS_DATABASE is an internationalized message in the mxweb/i18n/web/msg_en_US.properties file.

When the OK button on the message page is pressed, the user should be returned to the previous page.

7.5.3 Core Logic

Both carbon copy (RSTAT_CD=1) and blacked out (RSTAT_CD=3) rows are protected from manipulation by update trigger on the table. That is, TUBR_<table_name> trigger throws an exception when the row being updated has RSTAT_CD !=0.

This is beneficial from a data security perspective, but it is desirable to have a way to prevent such exceptions from happening in the first place. Otherwise, if there are multiple records being updated, and a carbon copy or a blacked out data is part of the record set being updated, the entire transaction would be marked for rollback; the data update cannot occur if the record set contains any rows whose RSTAT_CD !=0.

7.5.3.1 User-Supplied Serial Number Conflict Resolution

In the Maintenix system, there are logic flows that resolve conflicts between user-supplied part number/serial number combinations and pre-existing part number/serial number combinations in the database. These logic flows handle the following situation:
  The user enters a part number/serial number combination in a form to create a new inventory. However, the part number/serial number combination already exists in the system.
  The Maintenix system usually handles these situations by creating a new inventory with the user-supplied serial number and replaces the serial number of the inventory record found in the system with 'XXX'. The user is notified to reconcile the data discrepancy. In the distributed system of the invention, this logic is blocked if the inventory record found in the system is a carbon copy.
  These situations arise in the following workflows:
  Task completion with install and/or removal part requirements
  Receive Shipment
  Attach/Detach Inventory
  Create Inventory
  Issue Inventory
Example Case: Task Completion with Install and/or Removal Part Requirements
  When a task with install and/or removal part requirements are completed, the user has the option to manually enter the serial numbers.
    A technician installs a part onto an aircraft. The technician enters S/N 1234 but the system thinks that S/N 1234 is installed on another aircraft.
    In this case, the technician is allowed to override the warning; installing the part with S/N 1234. Since the serial number of the part on the other aircraft is not known, the system will update the serial number on that record to 'XXX'.
  In the deployed Maintenix system, the above scenario is blocked. If the serial number entered by the user already exists on a different configuration, then the user is notified to that effect. It is up to the user to reconcile the data.
  This logic resides in the following method:
    com.mxi.mx.core.services.stask.taskpart.installed.InstalledPartService.installTrackedSerial izedControlledPart(InventoryKey, InstalledPartTO, HumanResourceKey, boolean)
  The logic branch to be modified is the one with the following comments:
    // Detach the 'to be installed' inventory
    // Do not adjust the usage
    // Do not archive
    // Create a replacement

7.5.3.1.1 Inventory Re-Import

When a set of inventory records is reimported into a database from which it was transferred out of at some point in the past, the carbon copy record of the inventory record is overwritten with the import data. This means rows with RSTAT_CD of 1 are also updated. More on the reimport logic can be found in Section 7.8.2.

7.5.4 Queries

Every single query in the Maintenix system is modified in such a way that any data with RSTAT_CD< >0 must not be manipulated or taken into account in calculations. Moreover, not all queries are limited to the classic "RSTAT_CD=0" row status predicate; some queries need to be able to retrieve carbon copy data and/or blacked out data.

7.5.4.1 Table Types

For the purpose of the query modifications, the entity tables and support tables need to be identified.

7.5.4.1.1 Entity Tables

This is the list of entity tables to be considered when modifying the queries in the context of Deployed Operations Inventory Transfer:

```
EVT_EVENT
INV_INV
JL_FLIGHT
PO_HEADER
PO_LINE
REQ_PART
SCHED_STASK
SCHED_PART
SCHED_RMVD_PART
SD_FAULT
SHIP_SHIPMENT
SHIP_SHIPMENT_LINE
```

7.5.4.1.2 Support Tables

This is the list of support tables to be considered when modifying the queries in the context of Deployed Operations Inventory Transfer:

```
EQP_PART_NO
FNC_ACCOUNT
INV_LOC
INV_OWNER
ORG_HR
ORG_VENDOR
UTL_USER
REF_ABC_CLASS
REF_ACCOUNT_TYPE
REF_CURRENCY
REF_EVENT_STATUS
REF_FINANCIAL_CLASS
REF_INV_CLASS
REF_LOC_TYPE
REF_PART_STATUS
REF_PO_LINE_TYPE
REF_PO_TYPE
REF_PO_AUTH_FLOW
REF_REQ_PRIORITY
REF_REQ_TYPE
REF_SCHED_PART_STATUS
REF_SEV_TYPE
REF_FAIL_SEV
REF_SHIPMENT_TYPE
REF_TASK_CLASS
REF_VENDOR_STATUS
REF_VENDOR_TYPE
REF_XFER_TYPE
```

The above support tables in bold (i.e. the first seven) are considered as an entity table if the Java logic surrounding the query is manipulating that entity.

7.5.4.2 PL/SQL Code

All queries in the following database objects use RSTAT_CD=0 row status predicate for all entity and support tables involved.
   All packages
   All procedures
   All functions
   All materialized views
The normal views are not modified since they are used in both core and web interface. In the core code, they are most likely being used in conjunction with other queries that are already pre-filtered with RSTAT_CD=0. In the web code, the views return all rows and the row status filtering is handled at a higher level.

7.5.4.3 Core and Web Project Queries

This section outlines the query modification rules for the core and web project queries. The rule set is as follows:
   all queries executed as part of entity data manipulation logic have RSTAT_CD=0 predicate specified for the context entity table(s) being acted upon;
   all queries executed as part of relationship data manipulation logic have RSTAT_CD=0 predicate specified for the context entity table(s) being acted upon. This includes pick lists such as location list, aircraft list, and the like;
   all queries executed to populate To Do List pages have RSTAT_CD=0 predicate specified for the context entity table involved;
   all queries executed for search pages in pure search mode have RSTAT_CD IN (0, 1) predicate specified for the context entity table involved;
   all queries executed for search pages in assignment mode have RSTAT_CD=0 predicate specified for the context entity table involved; and
   all queries executed for type-ahead fields involved in data manipulation have RSTAT_CD=0 predicate specified for the context entity table involved.

7.5.4.3.1 Special Notes on EVT_EVENT_REL Linking

Maintenix system events can be related to each other through the EVT_EVENT_REL table. When editing the queries that involve EVT_EVENT_REL, the row status is considered only for the entity EVT_EVENT table that is driving the query. This is to prevent INNER JOINs from failing when live data is related to carbon copy data.
   For example, a removal task on an aircraft could be related to a fault on the component removed with the aircraft. If the component is transferred to another database, the fault information stays live with the tracked component, but it has a link to a carbon copy of the removal task on the carbon copy of the aircraft.

7.5.4.4 LRP Project Queries

All queries in the LRP project use RSTAT_CD=0 row status predicate.

7.5.4.5 PPC Project Queries

All queries in the PPC project use RSTAT_CD=0 row status predicate.

7.5.4.6 Dynamic Queries

Not all queries are stored in QRX files in the Maintenix system. There are some queries that are defined dynamically. The rule set for the dynamic queries is the same as the one specified in section 7.5.4.3. In the Maintenix system, QRX files are a way of externalizing database queries. They are written in an XML-like file which is translated into a real query at program execution.

7.5.4.7 Standard Reports

The standard reports queries require no modifications since the user interface element to access standard report may filter out the non-live data.

7.5.5 Barcode Generator

The following method was modified to take local DB_ID into account when generating a new barcode:
com.mxi.mx.core.services.AbstractBarcodeGenerator.getNewBarcode( )

7.6 Data Description

7.6.1 Master Baseline Data

As noted under Section 3.8.2 above, master baseline data is the set of data that defines the equipment and maintenance blueprint as well as the standard reference data. There are two sets of baseline data in deployed operations: controlled and mutable.

Controlled baseline data refers to a set of master baseline data that can be edited at the master site 110 only. Any changes to this set of data may have a major impact on the operation of the system. It is therefore highly controlled and changes are published out to satellite sites as soon as possible. Controlled baseline data is common across all operational sites 120.

Mutable baseline data refers to a set of baseline data that can be edited at the operational sites 120. In case of conflicts, the master site 110 governs and overrides data in conflict at the operational site 120. This set of data comprises of support data such as user profiles and department definitions. Mutable baseline data can be common across all operational sites 120 if it was created at the master site 110.

Some entities such as locations, user profiles, roles, menus, and the like, are both controlled and mutable. They can be defined at the master site 110 and but have some of its detail information modified at the operational sites 120.

In the context of inventory record transfer, the following rules apply:

Foreign key references to any controlled master baseline data can be exported as it is assumed that the destination database contains the target rows of these keys.

Foreign key references to mutable master baseline data are either nulled out or resolved to a set of common data before export.

7.6.1.1 Controlled Baseline Data

The controlled baseline data consists of the entities listed under Section 3.8.2.1 above.

7.6.1.2 Mutable Baseline Data

The mutable baseline data consists of the entities listed under Section 3.8.2.2 above.

7.6.2 Global Vs. Local Data

There is a set of data that is considered to be part of the master baseline data but still can be manipulated at operational sites 120. This set of data is known as mutable baseline data. Mutable baseline data contains the following entities:

User Profiles (Relational information only)
Roles
Organizations
Authorities
Locations
Departments
Owners
Production Plans Mutable data created at the master site 110 in the network is called global data while mutable data created at operational sites 120 are called local data. This is a mechanism which allows flexibility in definition of the above entities throughout the distributed network. For example, major airports maybe defined as system-wide global locations that all operational sites 120 can see, however, not all operational sites 120 may have the privilege to see the detailed location hierarchy within those airports down to the bin locations.

To ensure that the data can be successfully imported at the target operational site, any references to mutable data are resolved to global data before export can take place.

All default global data have RSTAT_CD=1, meaning that they can be viewed but cannot be manipulated.

The following subsections describe how global data is resolved from local data.

7.6.2.1 Users

A new default global user is generated at the master site 110 that will be common to all operational sites 120. The data in UTL_USER may look like this:

| | |
|---|---|
| USER_ID | 5 |
| USERNAME | 'mxglobal' |
| PASSWORD | 'password' |
| FIRST_NAME | 'mxglobal' |
| MIDDLE_NAME | NULL |
| LAST_NAME | 'mxglobal' |
| ALERT_EMAIL_ADDR | NULL |
| EMAIL_ADDR | NULL |
| LOCKED_BOOL | 0 |
| FORCE_PASSWORD_CHANGE_BOOL | 0 |
| UTL_ID | 0 |
| CTRL_DB_ID | 0 |
| RSTAT_CD | 1 |

The data in ORG_HR may look like this:

| | |
|---|---|
| HR_DB_ID | 0 |
| HR_ID | 6 |
| USER_ID | 5 |
| HR_CD | 'GLOBAL' |
| PAY_METHOD_DB_ID | NULL |
| PAY_METHOD_CD | NULL |
| ALL_AUTHORITY_BOOL | 1 |
| ALL_LOCATIONS_BOOL | 1 |
| ACTUAL_HOURLY_COST | NULL |
| LIC_CARD_ISSUE_DT | NULL |
| LIC_CARD_PRINT_DT | NULL |
| LIC_CARD_CHANGE_DT | NULL |
| RSTAT_CD | 1 |

7.6.2.2 Organizations

A new default global organization is generated at the master site 110 that will be common to all operational sites 120. The data in ORG_ORG may look like this:

| | |
|---|---|
| ORG_DB_ID | 0 |
| ORG_ID | 3 |
| ORG_TYPE_DB_ID | 0 |
| ORG_TYPE_CD | 'DEFAULT' |
| ORG_SUB_TYPE_DB_ID | NULL |
| ORG_SUB_TYPE_CD | NULL |
| COMPANY_ORG_DB_ID | 0 |
| COMPANY_ORG_ID | 1 |
| NH_ORG_DB_ID | NULL |
| NH_ORG_ID | NULL |
| ORG_CD | 'N/A' |
| ICAO_CD | NULL |
| CALLSIGN_SDESC | 'N/A' |
| CODE_MDESC | 'N/A' |
| ORG_SDESC | 'N/A' |
| ORG_LDESC | 'N/A' |
| RSTAT_CD | 1 |

7.6.2.3 Authorities

A new default global authority is generated at the master site 110 that will be common to all operational sites 120. The data in ORG_AUTHORITY may look like this:

| | |
|---|---|
| AUTHORITY_DB_ID | 0 |
| AUTHORITY_ID | 1001 |
| AUTHORITY_CD | 'N/A' |
| AUTHORITY_NAME | 'N/A' |
| RSTAT_CD | 1 |

7.6.2.4 Locations

Given INV_LOC primary key, use the NH_LOC_FK to find the next highest location in the hierarchy until LOC_DB_ID matches that of the master site 110.

7.6.2.5 Owners

A new default global owner is generated at the master site 110 that will be common to all operational sites 120. The data in INV_OWNER may look like this:

| | |
|---|---|
| OWNER_DB_ID | 0 |
| OWNER_ID | 1001 |
| OWNER_CD | 'N/A' |
| OWNER_NAME | 'N/A' |
| LOCAL_BOOL | 0 |
| DEFAULT_BOOL | 0 |
| ORG_DB_ID | NULL |
| ORG_ID | NULL |
| RSTAT_CD | 1 |

7.6.2.6 Production Plans

Production plan data created locally at an operational site will not be transferred to the destination database. When scheduled tasks are exported, if the referenced production plan is found to be local, the production plan related data will be stripped from the scheduled tasks. The details of this are covered in section 7.6.4.4.7.

7.6.3 Inventory Data

Inventory data covers the data related to the physical inventory pieces. The main data resides in INV_INV table. Apart from a handful of Boolean flags and string fields, most of the information about the inventory is stored as foreign keys to other tables. These foreign keys point to the peripheral data for the inventory record.

Inventory transfer can be initiated at two levels: Aircraft and Shipment. When the inventory transfer is initiated at the aircraft level, we take the root inventory and all sub-inventory records. When the inventory transfer is initiated at the shipment level, we take the root inventory and their sub-inventory records on each shipment line.

7.6.4 Event Data

Event data covers the data related to all the events that has been logged against the inventory being transferred. This includes historic events and open events. The peripheral data for event data covers such records as assembly inventory, highest inventory and next highest inventory at the time of the event completion.

There are many types of events in the Maintenix system. Since many events share similar attributes, EVT_EVENT table was designed to be used as an abstract database object to hold all the common attributes. A given event type would then add onto the abstract table by having its own sub-table. For example, a fault consists of EVT_EVENT and SD_FAULT. EVT_EVENT contains the name, description, and the time when the event was raised while SD_FAULT contains fault specific information such as failure mode and deferral references.

Inventory transfer considers not only the physical inventory attribute record but also the event history. This section looks at how each of the event types relate to inventory and the issues that are considered when transferring an inventory record from one database to another.

7.6.4.1 Baseline Events

Baseline events are event records that are not associated with any inventory data. Typically, they are events logged against the baseline or the system itself. This set of event data can be safely ignored for the purpose of inventory transfer:

TABLE 1

Baseline Event Types

| EVENT_TYPE_CD | NAME |
| --- | --- |
| BP | BOM Part Change |
| EO | Exchange Order |
| HR | Human Resource |
| LD | License Definition |
| PE | Part Edit |
| PPA | Part Price Adjustment |
| PRA | Part Request Assignment |
| PS | Part Status Change |
| PT | Part Type Change |
| VN | Vendor |

7.6.4.2 Simple Event Types—Single-Level

The set of event types listed in Table 2 are very straightforward:

TABLE 2

Single-Level Event Types

| EVENT_TYPE_CD | NAME |
| --- | --- |
| BN | Bin Management |
| BLK | Blackout |
| CC | Change Aircraft Capability |
| CO | Change Aircraft Operating Status |
| ICC | Inventory Custody Change |
| IL | Inventory Lock |
| QC | Quantity Correction |
| TCO | Tool Checkout |

These events:
1. Only link to one inventory record through EVT_INV.
2. Do not have a next-highest event.
3. Do not reference other events.
4. Are not referenced by other events.
5. Can only be historic.

The combination of the above attributes makes these event records easy to transfer.

These events are related to inventory as follows:
EVT_EVENT→EVT_INV→INV_INV
And they can be retrieved as follows:

```
SELECT
  evt_event.event_db_id,
  evt_event.event_id
FROM
  evt_event
  INNER JOIN evt_inv ON evt_inv.event_db_id =
  evt_event.event_db_id AND
        evt_inv.event_id    = evt_event.event_id
WHERE
  evt_event.event_type_cd IN ('BLK', 'CC', 'CO', 'ICC', 'IL',
  'QC', 'TCO')
AND
  evt_inv.inv_no_db_id = :aInvNoDbId AND
  evt_inv.inv_no_id    = :aInvNoId
```

| Table Name | Description |
| --- | --- |
| EVT_INV | Relates the local transfer to the inventory (FK_INVIN_EVTINV). FK_ININV_EVTINV must be carbon copied (INV_INV). |

| Table Name | Description |
| --- | --- |
| | FK_INVINV_EVTINV must be carbon copied (INV_INV). FK_IVINV_EVTINV must be carbon copied (INV_INV). |
| EVT_EVENT | Captures the event details. EVENT_TYPE_CD IN ('BLK', 'CC', 'CO', 'ICC', 'IL', 'QC', 'TCO') FK_ORGHR_EVTEVENT must be resolved to the global row if necessary (ORG_HR). FK_EVTEVENT_EVTEVENT is unused. FK_EVTEVENT_EVTEVTH should be pointing back to the row. FK_FNCACCNT_EVTEVENT can be ignored. |

7.6.4.3 Simple Event Types—Multi-level

Much like the event types identified in the previous section, event types listed in Table 3 are also straightforward. The only difference here is that the events are recorded alongside snapshots of inventory configuration at the time the event took place.

TABLE 3

Multi-Level Event Types

| EVENT_TYPE_CD | NAME |
| --- | --- |
| AC | Change Inventory Condition |
| FG | Configuration Change |
| IC | Inventory Details Changed |
| IMD | Inventory Manufacture Date Change |
| IMS | Inventory Modification Status Note Change |
| IPN | Inventory Part Number Change |
| ISN | Inventory Serial Number Change |
| OC | Owner Change |

Three foreign keys on EVT_INV table are used to record the configuration:

```
NH_INV_NO_DB_ID/NH_INV_NO_ID
H_INV_NO_DB_ID/H_INV_NO_ID
ASSMBL_INV_NO_DB_ID/ASSMBL_INV_NO_ID
```

These events:
1. Link to more than one inventory record through EVT_INV.
2. Do not have a next-highest event.
3. Do not reference other events.
4. Are not referenced by other events, with the exception of FG. FGs are referenced by TS.

The combination of the above attributes makes these event records still rather straightforward to transfer.

These events are related to inventory as follows:
EVT_EVENT→EVT_INV→INV_INV
And they can be retrieved as follows:

```
SELECT
  evt_event.event_db_id,
  evt_event.event_id
FROM
  evt_event
  INNER JOIN evt_inv ON evt_inv.event_db_id =
  evt_event.event_db_id AND
        evt_inv.event_id    = evt_event.event_id
```

-continued

```
WHERE
    evt_event.event_type_cd IN ('AC', 'FG', 'IC', 'IMD', 'IMS', 'IPN',
    'ISN', 'OC')
    AND
    evt_inv.inv_no_db_id = :aInvNoDbId AND
    evt_inv.inv_no_id    = :aInvNoId
```

| Table Name | Description |
|---|---|
| EVT_INV | Relates the local transfer to the inventory (FK_INVIN_EVTINV). FK_ININV_EVTINV must be carbon copied (INV_INV). FK_INVINV_EVTINV must be carbon copied (INV_INV). FK_IVINV_EVTINV must be carbon copied (INV_INV). |
| EVT_EVENT | Captures the event details. EVENT_TYPE_CD IN ('AC', 'FG', 'IC', 'IMD', 'IMS', 'IPN', 'ISN', 'OC') FK_ORGHR_EVTEVENT must be resolved to the global row if necessary (ORG_HR). FK_EVTEVENT_EVTEVENT is unused. FK_EVTEVENT_EVTEVTH should be pointing back to the row. FK_FNCACCNT_EVTEVENT can be ignored. |

For events of type FG, it is necessary to take a carbon copy of the referring scheduled task. Starting with FG event's PK, back track through EVT_EVENT_REL (i.e. inner join FG's PK to EVT_EVENT_REL.REL_EVENT_FK) find the row in EVT_EVENT and SCHED_STASK.

```
SELECT
    sched_stask.sched_db_id,
    sched_stask.sched_id
FROM
    evt_event_rel
    INNER JOIN sched_stask ON sched_stask.sched_db_id =
    evt_event_rel.event_db_id
    AND
            sched_stask.sched_id    = evt_event_rel.event_id
WHERE
    evt_event_rel.rel_event_db_id = :aFGEventDbId AND
    evt_event_rel.rel_event_id    = :aFGEventId
```

| | |
|---|---|
| EVT_EVENT_REL | Captures the special relationship between 'FG' and 'TS' events. FK_EVTEVENT_EVTEVENTREL references the 'FG' event. FK_EVTEVENT_EVTEVENTREL2 references the 'TS' event. |
| SCHED_STASK | Captures the header information of the task that initiated the 'FG' event. See section 7.6.4.4.7 on how to capture a scheduled task. |

7.6.4.4 Complex Event Types

This section contains the list of complex event types and how they are modelled in the Maintenix system schema. The details of how foreign keys are handled for each table are described.

7.6.4.4.1 Data Description Tables

This subsection lists the database tables to capture for a given event type. For each database table, instructions on what to do with the foreign key data are provided. The instructions are written in such a way that the target row of the foreign keys are to be carbon copied unless otherwise specified. It should be understood that those foreign key target events may be captured as live data in another event type section. That is, between event type sections, there will be an overlap of data being marked for transfer. When such overlap occurs between event types, the live data instruction overrules the carbon copy instruction.

Say for example that a corrective task references a fault. For the same inventory item, the same fault may be found. In the Tasks section, the fault will be specified to be carbon copied. In the Faults section however, it is specified to be captured as live data. In this case, when the fault data is staged for export, the live data version of the fault row is used for import at the destination database.

7.6.4.4.2 Local Transfers

A local transfer (within the Maintenix system) is a record of inventory movement from one location to another within the same airport. Typical local transfers are Turn-ins and Put-aways. A local transfer is related to inventory as follows:
INV_INV-EVT_INV-INV_XFER

7.6.4.4.3 Shipments

A shipment is a record of inventory movement from one airport to another. It is also used to record dispatches and the receipt of new inventory between the organization and vendor. Each shipment has multiple shipment lines. Unlike other events, shipment does not use the EVT_INV table. Inventory records are referenced at the shipment line level as follows:
INV_INV-SHIP_SHIPMENT_LINE-SHIP_SHIPMENT

7.6.4.4.4 Flights

A flight is a record of aircraft movement in the Maintenix system, between airport location types. A flight is related to inventory as follows:
INV_INV-EVT_INV-JL_FLIGHT

7.6.4.4.5 Orders

In the Maintenix system, there are many order types:
Purchase Order
Repair Order
Borrow Order
Exchange Order
Consignment Order
Consignment Exchange Order
To make use of the financial data in the Maintenix system, all finance related events must remain in the same database system. For this reason, only carbon copies of the order events are taken along with the inventory records. An order is related to inventory as follows:
INV_INV-PO_LINE-PO_HEADER

7.6.4.4.6 Part Requests

Part requests are created to fill a part requirement listed against a scheduled task. Part requests are issued manually by the users or automatically when the scope of the scheduled task's work package is committed. Part requests may reference two inventory items: one inventory record against which the scheduled task is being performed, and one inventory record for the inventory item that was found to fill the request. In this section, a description is provided of the case where the inventory in question is directly related to the part request. A part request is related to inventory as follows:
INV_INV-REQ_PART

7.6.4.4.7 Tasks

Figure 22:
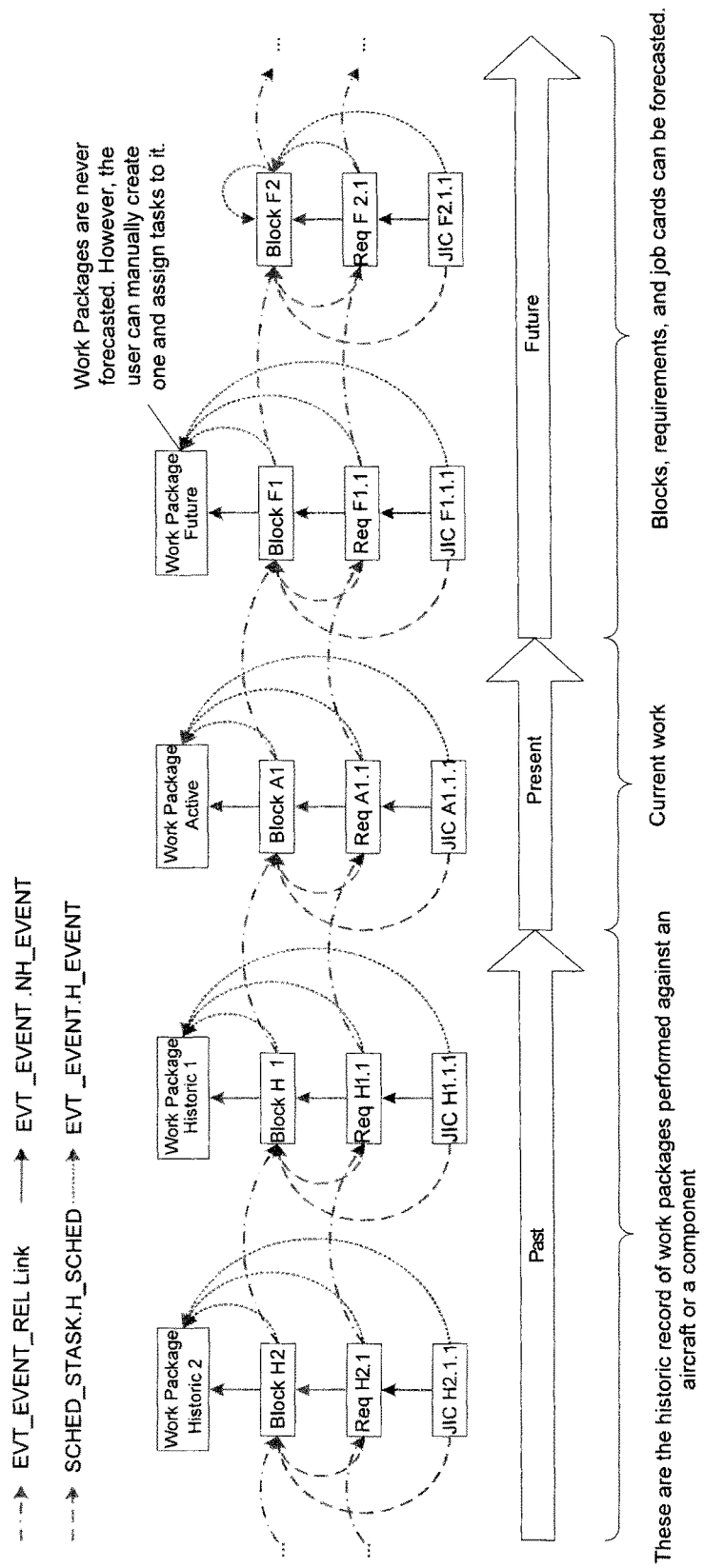
FIG. 22 presents an exemplary task dependency chain, in accordance with an embodiment of the invention.

Tasks are initialized directly against a piece of inventory. What makes scheduled tasks interesting for inventory transfer is that these tasks can be related to each other via an event relationship table (EVT_EVENT_REL). Also, a given scheduled task can be related to more than a single inventory that belongs to different inventory hierarchies. A task is related to inventory as follows:
INV_INV-EVT_INV-SCHED_STASK However, the capture of tasks is not as simple as the capture of other event types. For the task information to be of any use, information about the parent tasks must be preserved. Consider FIG. 22, depicting the chronological and hierarchal relationship between task entities.

There are also indirect references to tasks. These references are created when the inventory in question was installed or removed as part of a task that was performed against another inventory. For example, given an engine with an oil pump attached, a pump replacement task would be initialized against the engine. When the task is completed, the pump that was removed is referenced from the replacement task through SCHED_RMVD_PART table. The pump that was installed is referenced from the replacement task through SCHED_INST_PART table.

Figure 23:
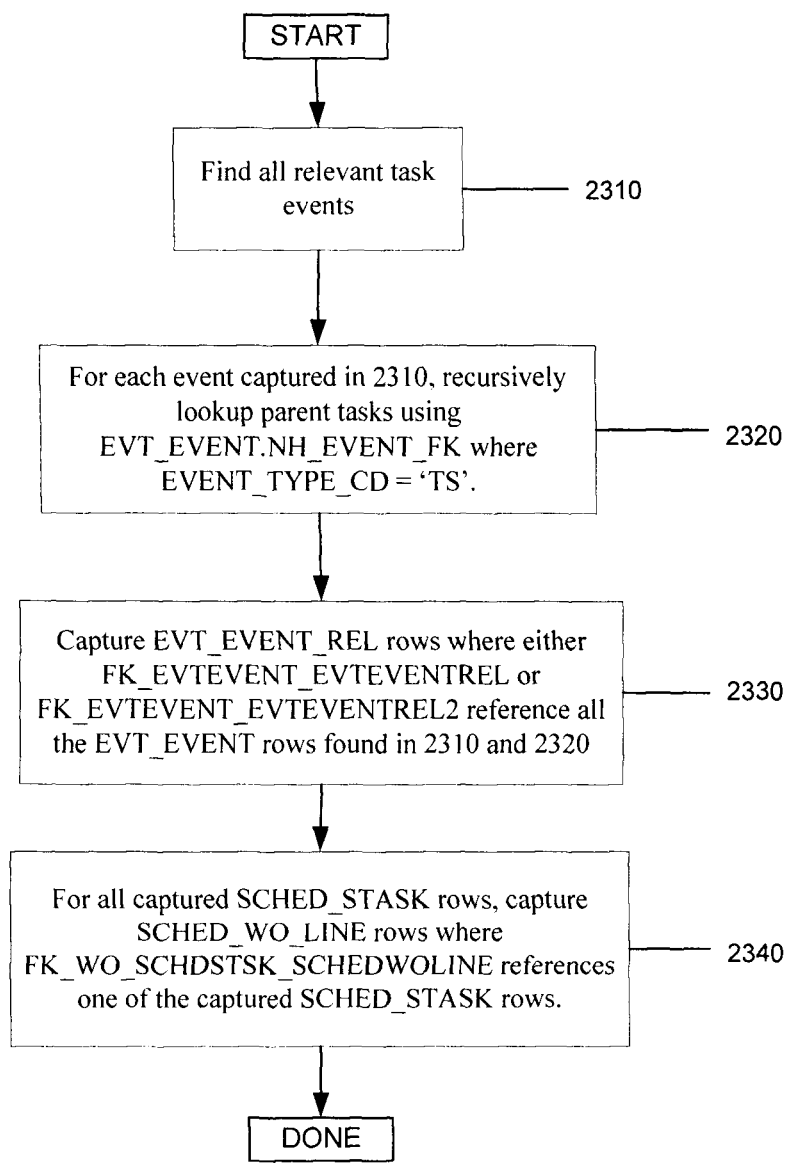
FIG. 23 presents a flow chart of a method of capturing tasks, in accordance with an embodiment of the invention.

To this end, tasks are captured in the manner shown in the flow chart of FIG. 23, for a given INV_INV row.

Firstly, it is necessary to find all relevant task events at 2310. This is done as follows:
a. Capture EVT_EVENT rows via EVT_INV link where EVENT_TYPE_CD='TS". For these EVT_INV rows, take carbon copies of INV_INV rows referenced by FK_ININV_EVTINV, FK_INVINV_EVTINV, and FK_IVINV_EVTINV;
b. Capture SCHED_INST_PART and SCHED_STASK rows via SCHED_RMVD_PART and SCHED_INST_PART. For each SCHED_STASK rows, capture the EVT_EVENT row.

For each event captured in step 2310, then recursively look up parent tasks at 2320, using EVT_EVENT.NH_EVENT_FK where EVENT_TYPE_CD='TS':
a. Capture carbon copies of the EVT_EVENT rows.
b. For each of these events, capture carbon copies of EVT_LOC.
c. For each of these events, capture EVT_INV rows where MAIN_INV_BOOL=1. For each of these EVT_INV rows, capture carbon copies of INV_INV rows referenced by FK_INVIN_EVTINV, FK_ININV_EVTINV, FK_INVINV_EVTINV, and FK_IVINV_EVTINV.
d. For each event, capture carbon copies of SCHED_STASK rows.

Next, at 2330, capture EVT_EVENT_REL rows where either FK_EVTEVENT_EVTEVENTREL or FK_EVTEVENT_EVTEVENTREL2 reference all the EVT_EVENT rows found in 2310 and 2320.

Finally, at 2340, for all captured SCHED_STASK rows, capture SCHED_WO_LINE rows where FK_WO_SCHDSTSK_SCHEDWOLINE references one of the captured SCHED_STASK rows.

7.6.4.4.7.1 Part Requests for Tasks

A part request can be created against a task. A part request is related to a task as follows:
SCHED_STASK-REQ_PART (FK_SCHED-STASK_REQPART)
See section 7.6.4.4.6 on how a part request is captured.

7.6.4.4.8 Faults

Tasks and faults are tightly coupled in the system and one cannot be analyzed without the other. A fault is a record of malfunction detected on an inventory. They can be raised during flight or during maintenance. When a fault is created in the system, a corrective action task is automatically created and associated to the fault via a foreign key on the SCHED_STASK table. A fault is related to tasks as follows:
Here is how a fault is related to an inventory:
SD_FAULT→EVT_INV→INV_INV When a fault is raised, corrective tasks are automatically associated with it. The corrective task must also be captured. Use the EVT_EVENT_REL table to find the corrective tasks and capture them using the same logic described in section 7.6.4.4.7.

7.6.4.4.8.1 Fault References

In the Maintenix system, faults can be raised off of tasks, flights, and other faults.
Here is how a fault is related to an inventory through corrective action if one is created:

SD_FAULT -> EVT_EVENT_REL (REL_TYPE_CD='CORRECT') -> SCHED_STASK -> EVT_INV -> INV_INV

Here is how a task is related to an inventory through a fault found during task execution:

SCHED_STASK -> EVT_EVENT_REL (REL_TYPE_CD='DISCF') -> SD_FAULT -> EVT_INV -> INV_INV

Here is how a task is related to an inventory through a fault found during task execution and its corrective task:

SCHED_STASK -> EVT_EVENT_REL (REL_TYPE_CD='DISCF') -> SD_FAULT -> EVT_EVENT_REL (REL_TYPE_CD='CORRECT') -> SCHED_STASK -> EVT_INV -> INV_INV

Here is how a flight is related to an inventory if a fault is found during flight:

JL_FLIGHT -> EVT_EVENT_REL (REL_TYPE_CD='ENCF') -> SD_FAULT -> EVT_INV -> INV_INV

Here is how a flight is related to an inventory if a fault is found during flight and a corrective task is created:

```
JL_FLIGHT -> EVT_EVENT_REL (REL_TYPE_CD='ENCF') ->
SD_FAULT ->EVT_EVENT_REL
(REL_TYPE_CD='CORRECT') -> SCHED_STASK ->
EVT_INV -> INV_INV
```

Also, the ability to raise a new fault from a task implies that the system supports a fault resolution task chain. A fault is created for a task and a corrective task is created for the fault. However, if a fault is encountered during the execution of the corrective task, a new fault can be created to address it. A corrective task is created for the new fault and the cycle can continue indefinitely.

Figure 24:
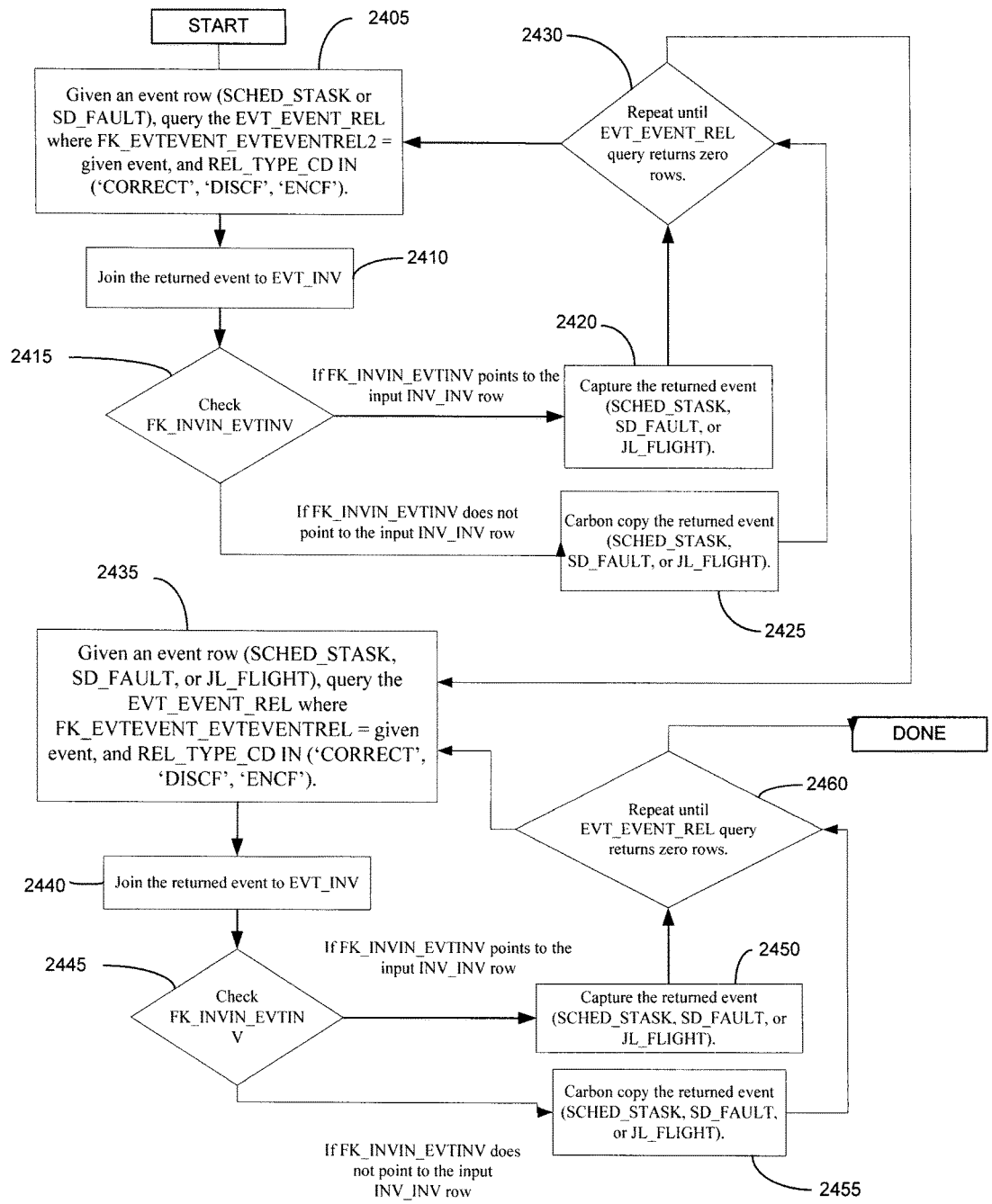
FIG. 24 presents a flow chart of a method of generating fault references, in accordance with an embodiment of the invention.

At first glance, this is a complex set of event relationships. However, the system can be reduced to the set of recursive logic shown in FIG. 24.

At 2405, given an event row (SCHED_STASK or SD_FAULT), query the EVT_EVENT_REL where FK_EVTEVENT_EVTEVENTREL2=given event, and REL_TYPE_CD IN ('CORRECT', 'DISCF', 'ENCF'). The returned event is then joined to EVT_INV, at 2410. FK_INVIN_EVTINV is checked at 2415, and if it points to the input INV_INV row, then capture the returned event (SCHED_STASK, SD_FAULT, or JL_FLIGHT) at 2420. If FK_INVIN_EVTINV does not point to the input INV_INV row at 2415, then carbon copy the returned event (SCHED_STASK, SD_FAULT, or JL_FLIGHT) at 2425. In either case, the process is repeated until the EVT_EVENT_REL query returns zero rows at 2430.

At 2435, given an event row (SCHED_STASK, SD_FAULT, or JL_FLIGHT), query the EVT_EVENT_REL where FK_EVTEVENT_EVTEVENTREL=given event, and REL_TYPE_CD IN ('CORRECT', 'DISCF', 'ENCF'). The returned event is joined to EVT_INV at 2440. Again, FK_INVIN_EVTINV is checked at 2440, and if it points to the input INV_INV row, then capture the returned event (SCHED_STASK, SD_FAULT, or JL_FLIGHT) at 2450. If FK_INVIN_EVTINV does not point to the input INV_INV row at 2445, then carbon copy the returned event (SCHED_STASK, SD_FAULT, or JL_FLIGHT) at 2455. In either case, the process is repeated until the EVT_EVENT_REL query returns zero rows at 2460.

Recurring Fault

The system of the invention also allows the user to link faults together as recurring faults. These are used to alert the engineers that a particular fault keeps showing up for a given aircraft. The faults are simply strung together using EVT_EVENT_REL table with REL_TYPE_CD='RECUR'.

Figure 25:
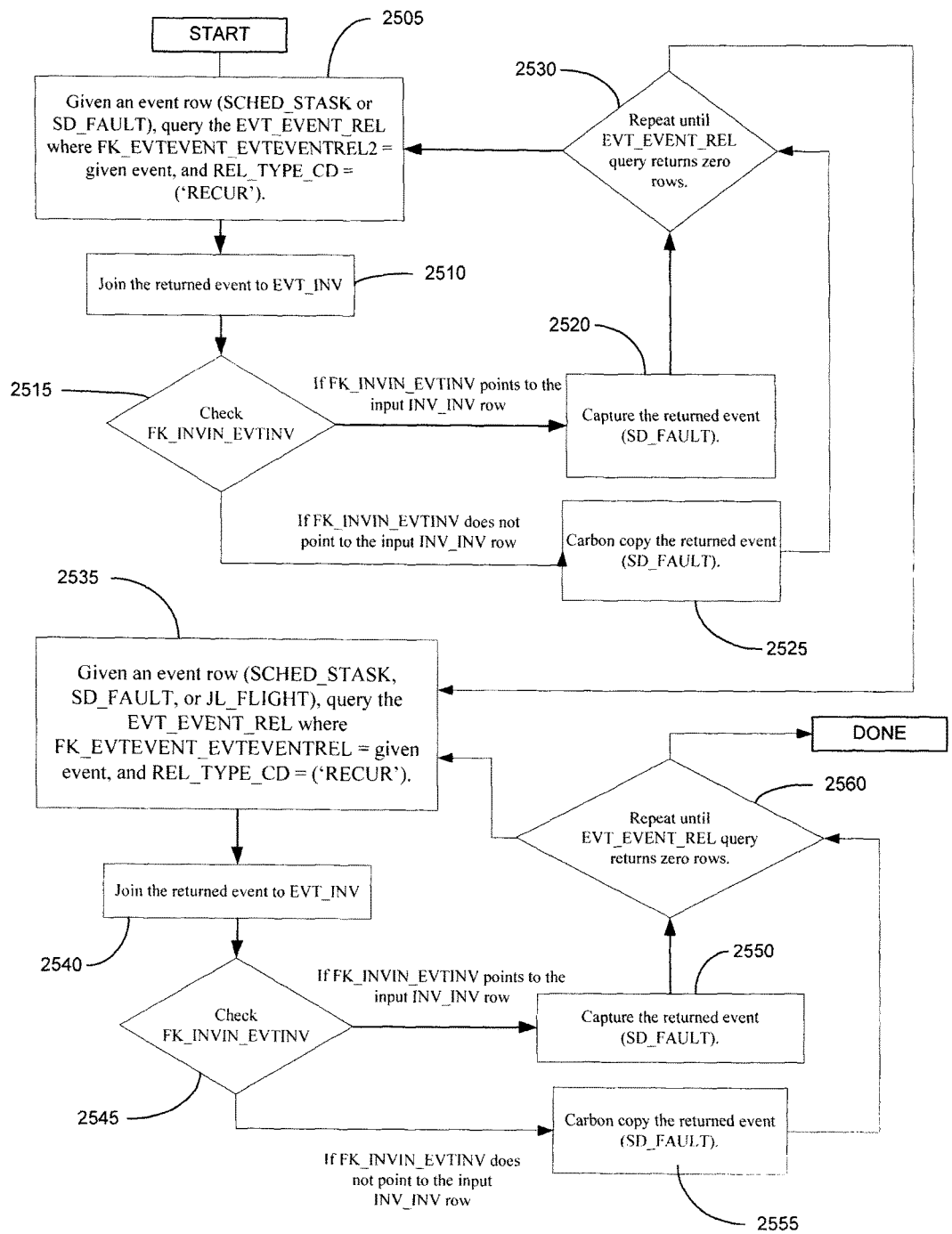
FIG. 25 presents a flow chart of a method of retrieving recurring fault data, in accordance with an embodiment of the invention.

To retrieve the recurring fault data, the process shown in the flow chart of FIG. 25 is followed.

At 2505, given an event row (SCHED_STASK or SD_FAULT), query the EVT_EVENT_REL where FK_EVTEVENT_EVTEVENTREL2=given event, and REL_TYPE_CD=('RECUR'). The returned event is then joined to EVT_INV, at 2510. FK_INVIN_EVTINV is checked at 2515, and if it points to the input INV_INV row, then capture the returned event (SD_FAULT) at 2520. If FK_INVIN_EVTINV does not point to the input INV_INV row at 2515, then carbon copy the returned event (SD_FAULT) at 2525. In either case, the process is repeated until the EVT_EVENT_REL query returns zero rows at 2530.

At 2535, given an event row (SCHED_STASK or SD_FAULT), query the EVT_EVENT_REL where FK_EVTEVENT_EVTEVENTREL=given event, and REL_TYPE_CD=('RECUR'). The returned event is joined to EVT_INV at 2540. Again, FK_INVIN_EVTINV is checked at 2540, and if it points to the input INV_INV row, then capture the returned event (SD_FAULT) at 2550. If FK_INVIN_EVTINV does not point to the input INV_INV row at 2545, then carbon copy the returned event (SD_FAULT) at 2555. In either case, the process is repeated until the EVT_EVENT_REL query returns zero rows at 2560.

7.6.4.5 Excluded Event Types

Of the event types in the system, the following event data are not transferred to the destination database:

Orders

Invoices

Requests for Quote

Claims

Financial Transactions

Distributed Control Change (obsolete)

7.6.5 Carbon Copy Description

This section outlines what 'Taking a carbon copy' means to each entity table.

7.6.5.1 PO_HEADER

| Table Name | Description |
|---|---|
| EVT_EVENT | EVENT_TYPE_CD = 'PO'<br>FK_ORGHR_EVTEVENT is resolved to blacked out row (ORG_HR).<br>FK_EVTEVENT_EVTEVENT is unused.<br>FK_EVTEVENT_EVTEVTH should be pointing back to the row.<br>FK_FNCACCNT_EVTEVENT is resolved to blacked out data (FNC_ACCOUNT). |
| PO_HEADER | FK_INVLOCRESHIP_POHEADER is resolved to a global row if necessary (INV_LOC).<br>FK_INVLOCSHIPTO_POHEADER is resolved to a global row if necessary (INV_LOC).<br>FK_INVLOC_POHEADER is resolved to a global row if necessary (INV_LOC).<br>FK_ORGHR_POHEADER is resolved to blacked out row (ORG_HR).<br>FK_ORGVENDORACCNT_POHEADER target can be ignored. |

7.6.5.2 PO_LINE

| Table Name | Description |
|---|---|
| PO_LINE | FK_FNCACCOUNT_POLINE is resolved to blacked out row (FNC_ACCOUNT).<br>FK_INVOWNER_POLINE is nulled out (INV_OWNER).<br>FK_REPLSCHEDSTASK_POLINE is nulled out.<br>FK_SCHEDSTASK_POLINE is nulled out.<br>FK_SHIPSHIPMENT_POLINE is nulled out. |

Note:
PO_LINE data must be carbon copied along with its parent PO_HEADER row.

7.6.5.3 INV_INV

| Table Name | Description |
|---|---|
| INV_INV | FK_ININV_INVINVNH is nulled out.<br>FK_INVINV_INVINVASS is nulled out.<br>FK_INVINV_INVINVH is redirected to this row.<br>FK_INVLOC_INVINV is resolved to a global row (INV_LOC).<br>FK_INVOWNER_INVINV is resolved to the default global row (INV_OWNER).<br>FK_ORGAUTHORITY_INVINV is resolved to the default global row (ORG_AUTHORITY).<br>FK_POLINE_INVINV is nulled out.<br>FK_SHEDRMVDPART_INVINV is be nulled out.<br>If INV_CLASS_CD = 'ACFT', then the matching INV_AC_REG row is carbon copied also. |

7.6.5.4 INV_AC_REG

| Table Name | Description |
|---|---|
| INV_AC_REG | FK_FNCACCOUNT_INVACREG is resolved to blacked out row (FNC_ACCOUNT). |

Note:
INV_AC_REG data must be carbon copied along with its parent INV_INV row.

7.6.5.5 SCHED_STASK

To make sense of a scheduled task record, the carbon copy path is extended to the inventory record as well.

| Table Name | Description |
|---|---|
| EVT_INV | Relates the event to the inventory (FK_INVIN_EVTINV).<br>FK_ININV_EVTINV is carbon copied (INV_INV).<br>FK_INVINV_EVTINV is carbon copied (INV_INV).<br>FK_IVINV_EVTINV is carbon copied (INV_INV). |
| EVT_EVENT | Captures the event details.<br>EVENT_TYPE_CD = 'TS'<br>FK_ORGHR_EVTEVENT is resolved to the global row (ORG_HR).<br>FK_EVTEVENT_EVTEVENT is carbon copied (EVT_EVENT and SCHED_STASK).<br>FK_EVTEVENT_EVTEVTH is carbon copied (EVT_EVENT and SCHED_STASK).<br>FK_FNCACCNT_EVTEVENT is resolved to blacked out row (FNC_ACCOUNT). |
| SCHED_STASK | Captures the task header information.<br>FK_FNCACCOUNT_SCHEDSTASK is resolved to blacked out row (FNC_ACCOUNT).<br>FK_MAININV_SHEDSTASK is carbon copied (INV_INV).<br>FK_SCHEDSTASK_HSCHEDSTASK is carbon copied (SCHED_STASK).<br>FK_SCHEDSTASK_SCHEDSTASK is carbon copied (SCHED_STASK).<br>FK_SDFAULT_SCHEDSTASK is carbon copied (SD_FAULT).<br>FK_PRODPLAN_SCHEDSTASK is nulled out.<br>FK_APPLIEDPRODPLAN_SCHEDSTASK is nulled out.<br>FK_STARTSCHEDMILESTONE_SCHEDST is nulled out.<br>FK_ENDSCHEDMILESTONE_SCHEDSTAS is nulled out.<br>FK_SCHEDWORKAREA_SCHEDSTASK is nulled out.<br>FK_SCHEDPHASE_SCHEDSTASK is nulled out. |
| EVT_LOC | FK_INVLOC_EVTLOC is resolved to a global row (INV_LOC). |
| EVT_SCHED_DEAD | No special considerations |
| EVT_STAGE | FK_ORGHR_EVTSTAGE is resolved to blacked out row (ORG_HR). |

7.6.5.6 SCHED_PART

| Table Name | Description |
|---|---|
| SCHED_PART | No special considerations. |

Note:
SCHED_PART data is carbon copied along with its parent SCHED_STASK row.

7.6.5.7 SCHED_INST_PART

| Table Name | Description |
|---|---|
| SCHED_INST_PART | FK_EVTLABOUR_SCHEDINSTPART is nulled out.<br>FK_INVINV_SCDINSTPRT is carbon copied. |

Note:
SCHED_INST_PART data is carbon copied along with its parent SCHED_PART row and its parent SCHED_STASK row.

7.6.5.8 SCHED_RMVD_PART

| Table Name | Description |
|---|---|
| SCHED_RMVD_PART | FK_EVTLABOUR_SCHEDRMVDPART is nulled out. |

-continued

| Table Name | Description |
|---|---|
| | FK_INVINV_SCHDRMVDPRT is carbon copied. |

Note:
SCHED_RMVD_PART data is carbon copied along with its parent SCHED_PART row and its parent SCHED_STASK row.

7.7 Export Logic

7.7.1 Aircraft Export

When an aircraft is exported, the entire inventory hierarchy is marked with RSTAT_CD=1 to show that it is now a carbon copy. Similarly, all events on the aircraft and all its child inventory items also gain the RSTAT_CD=1 value.

7.7.2 Shipment Export

When an inventory transfer is initiated from Shipment Details page, for each inventory item in the shipment, their entire inventory hierarchy is marked with RSTAT_CD=1 to show that they are now carbon copy data. Similarly, all events on the inventory records and all its child inventory items also gain the RSTAT_CD=1 value.

7.7.3 Special Logic

Not all inventory records can be simply transferred. Some records must first be manipulated to make sense of the data.

7.7.3.1 Reserved Part

If the inventory record to be transferred is reserved (INV_INV.RESERVED_BOOL=1), then it must first be unreserved. To unreserved an inventory, the following Maintenix core logic is invoked:

com.mxi.mx.core.services.inventory.reservation.InventoryReservationService.unreserveInventory(InventoryKey, Double, LocationKey, String,
boolean, boolean, boolean)

7.7.3.2 Filled Part Requests

When an aircraft is transferred, it is possible that some of the part requests in its work packages could already be filled. In this case, the link between the part requirement on the task is severed from the part request. The part request is cancelled in the process. This is done to reduce the chance of non-sensical data at the target database. That is, depending on the global location setup in the distributed system, if the part requests were to be transferred, the "needed at" location may be resolved to a non-LINE location.

To sever the link and cancel the part request, the following Maintenix core logic is invoked:

com.mxi.mx.core.services.req.PartRequestService.clearPartRequest(PartRequestKey, String, String, HumanResourceKey)

7.7.3.3 Work Packages

Work packages on an aircraft that are committed must be uncommitted before the transfer can occur. This is done to reduce the chance of nonsensical data at the target database. That is, depending on the global location setup in the distributed system, if committed work packages were to be transferred, the "scheduled location" could end up being resolved to a non-LINE location. Also, already filled part requests data may no longer be correct.

On export button press:
Check for work packages in COMMIT. If one exists, show an error message to the user informing them to uncommit the work package before exporting.
Check for IN WORK work packages. If one exists, show error message and tell the user to either complete the work package or unstart and uncommit the work package.

7.7.3.4 Tool Inventory Record

Tools that are checked out cannot be transferred. The tools must first be checked in before they can be transferred out of the system. To see if a tool is checked out, we look for non-historic EVT_EVENT rows whose EVENT_TYPE_CD='TCO'.

7.7.3.5 Expected Turn-In

If the inventory record to be transferred is associated with an expected turn-in, then the link between the expected turn-in is severed from the part.

To identify if a given inventory record has an expected turn-in, look for INV_XFER rows where:

INV_XFER.INV_NO_DB_ID/ID = The inventory record to be transferred
EVT_EVENT.EVENT_STATUS_CD = 'LXPEND'
INV_XFER.XFER_TYPE_CD = 'TURNIN'

To sever the link between the inventory record and the expected turn-in record, simply null-out the FK_INVIN_INVXFER key on the transfer record.

7.7.3.6 Batch Inventory Record

Figure 26:
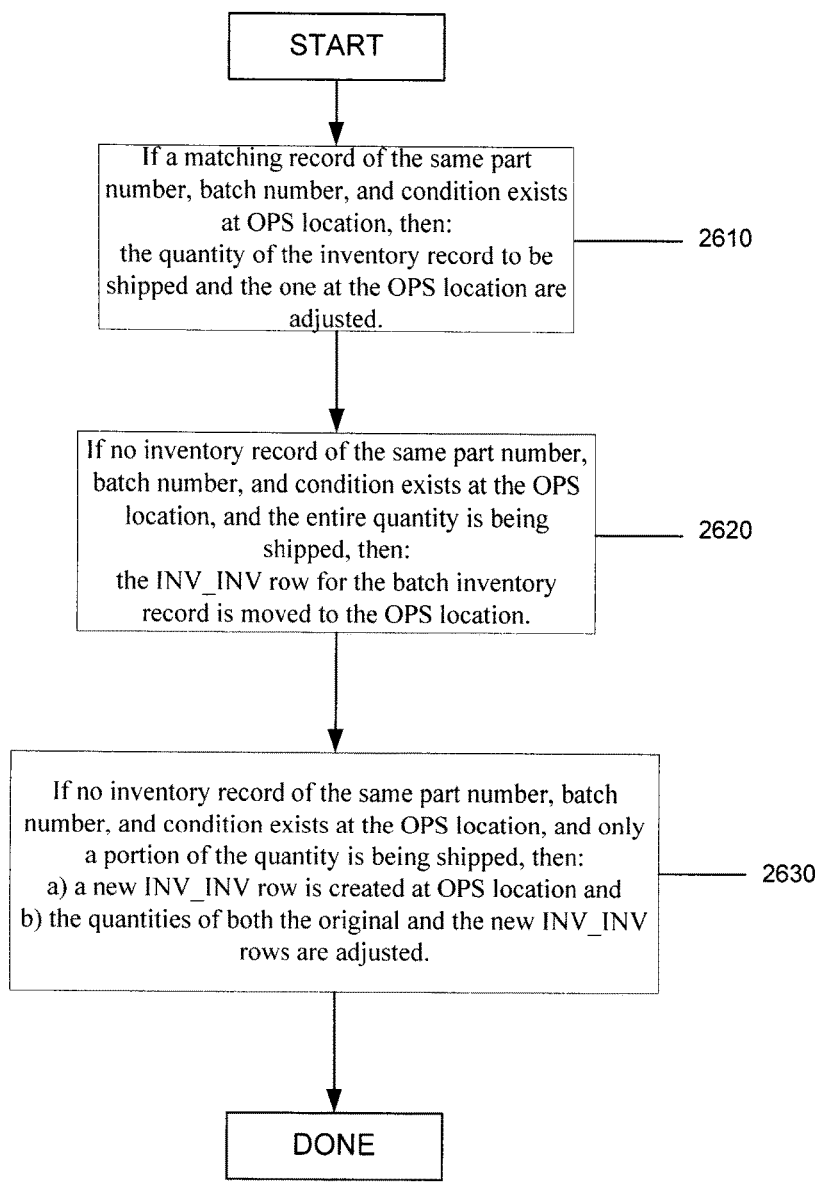
FIG. 26 presents a flow chart of a process for a transfer of a batch inventory record, in accordance with an embodiment of the invention.

When an inventory record is shipped in the Maintenix system, the record is moved to OPS location to indicate that it is in transit. For BATCH class inventory records, the logic shown in FIG. 26 is executed. There are three cases:
if a matching record of the same part number, batch number, and condition exists at OPS location 2610, then the quantity of the inventory record to be shipped and the one at the OPS location are adjusted;
if no inventory record of the same part number, batch number, and condition exists at the OPS location, and the entire quantity is being shipped 2620, then the INV_INV row for the batch inventory record is moved to the OPS location; and
if no inventory record of the same part number, batch number, and condition exists at the OPS location, and only a portion of the quantity is being shipped, then a new INV_INV row is created at OPS location and the quantities of both the original and the new INV_INV rows are adjusted.

Figure 27:
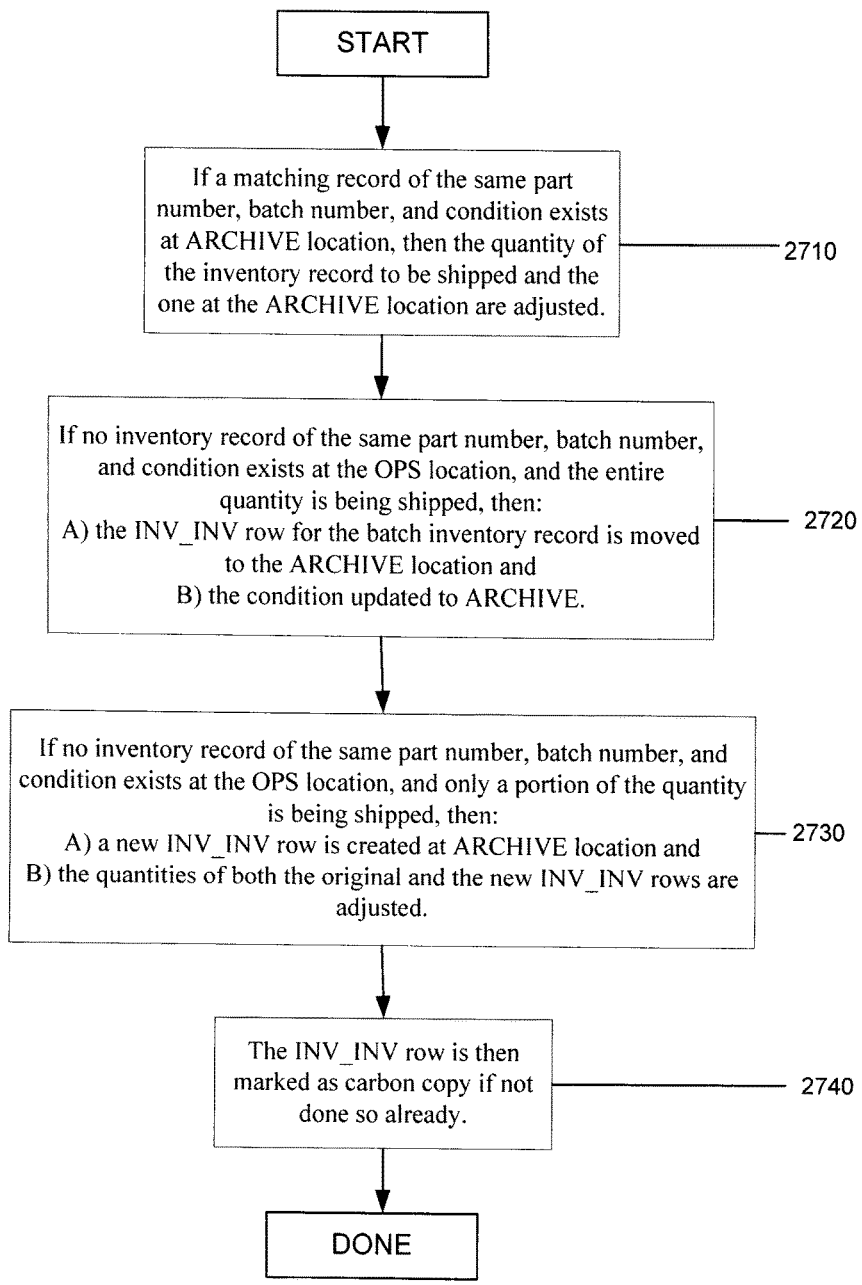
FIG. 27 presents a flow chart of a process for archiving of a batch inventory record, in accordance with an embodiment of the invention.

This means that batch inventory records at OPS location cannot be made carbon copy upon export. Instead, the batch inventory is archived manually without going through the Maintenix system archive logic. The batch inventory record/quantity is simply moved to archive location as shown in FIG. 27:

- if a matching record of the same part number, batch number, and condition exists at ARCHIVE location 2710, then the quantity of the inventory record to be shipped and the one at the ARCHIVE location are adjusted;
- if no inventory record of the same part number, batch number, and condition exists at the OPS location, and the entire quantity is being shipped 2720, then the INV_INV row for the batch inventory record is moved to the ARCHIVE location and the condition updated to ARCHIVE; and
- if no inventory record of the same part number, batch number, and condition exists at the OPS location, and only a portion of the quantity is being shipped 2730, then a new INV_INV row is created at ARCHIVE location and the quantities of both the original and the new INV_INV rows are adjusted.

The INV_INV row is then marked as carbon copy at 2740 if not done so already.

See section 7.8.5.1 for additional information regarding special import logic around BATCH inventory.

7.7.4 General Behaviour of the Exported Inventory

When inventory record is exported, its physical hierarchy and event records (both active and historical) are 'frozen' in place in the form of carbon copy data at the originating site. This means that if there are actual tasks in progress, these tasks are exported as-is. Upon reimport at the destination location, these tasks can be completed.

When the inventory is imported, the inventory hierarchy and all its event records (with some exceptions) are considered live data at the destination site. The user and the system can interact with the record set as if it were generated at that site.

The exception to this behaviour is the set of carbon copy data that was brought over from the originating site to preserve certain foreign keys. These records, both inventory and event, cannot be manipulated at the destination site.

7.8 Import Logic

Inventory record transfer has an inherent data conflict probability. This section identifies the expected data conflict scenarios and how they may be handled upon import.

7.8.1 First-Time Inventory Import

There are no special considerations if the inventory record set being imported has never existed at the destination database.

7.8.2 Inventory Reimport—without Configuration Change

This section deals with the scenario where the inventory record to be imported already exists as a carbon copy record at the destination database. See section 7.8.3 for the case where the carbon copy inventory hierarchy and the import data hierarchy do not have exactly the same subinventory hierarchy.

All matching INV_INV rows are updated with the imported data. These rows are marked as live data (RSTAT_CD=0). All matching event records that belong to the inventory are also overwritten with the data being imported. All matching event entity rows are marked as live (RSTAT_CD=0). If any carbon copy data in the import data exists at the import destination database, then the carbon copy data is discarded in the process so that the live copy of the data is not overwritten.

7.8.3 Inventory Reimport—with Configuration Change

This section deals with the scenario where the inventory record to be imported already exists as a carbon copy record at the destination database but has a different subinventory hierarchy.

Figure 28:
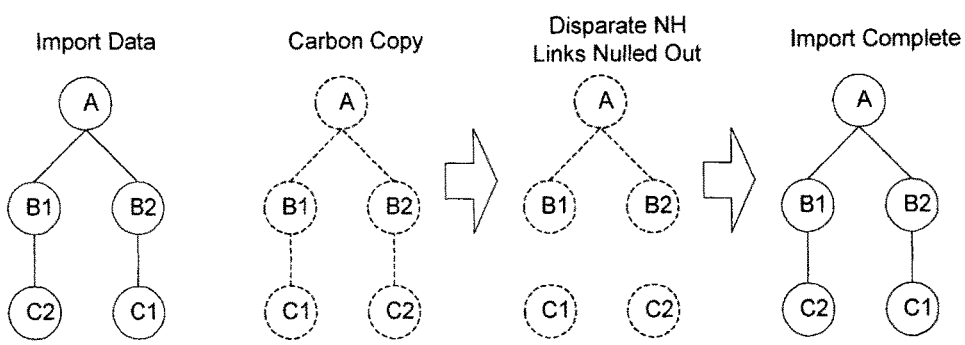
FIGS. 28 and 29 present block diagrams of the inventory hierarchy in a re-import example, in accordance with an embodiment of the invention.
Figure 29:
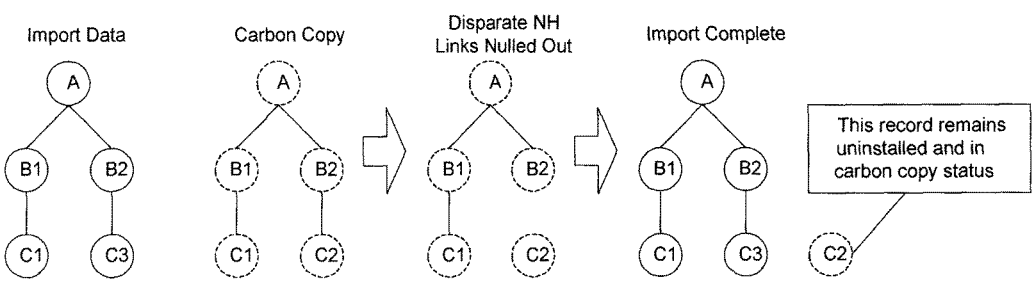

The two inventory hierarchies are compared: the carbon copy and the import data. Any discrepancies between the two sets of data are considered a trigger point to "uninstall" an inventory item in the carbon copy data set before import can occur as shown in FIGS. 28 and 29. FIG. 28 describes a situation where we are re-importing an inventory record that has a slight difference in its sub-inventory hierarchy, without a new sub-inventory item. In this case, we are simply changing the parent foreign keys to point to the new children inventories.

FIG. 29 describes a situation where we are re-importing an inventory record that has a new inventory in its sub-inventory hierarchy. In this case, the parent inventory foreign key is modified to point to the new sub-inventory and the old sub-inventory is left in carbon copy status, without a parent.

Figure 30:
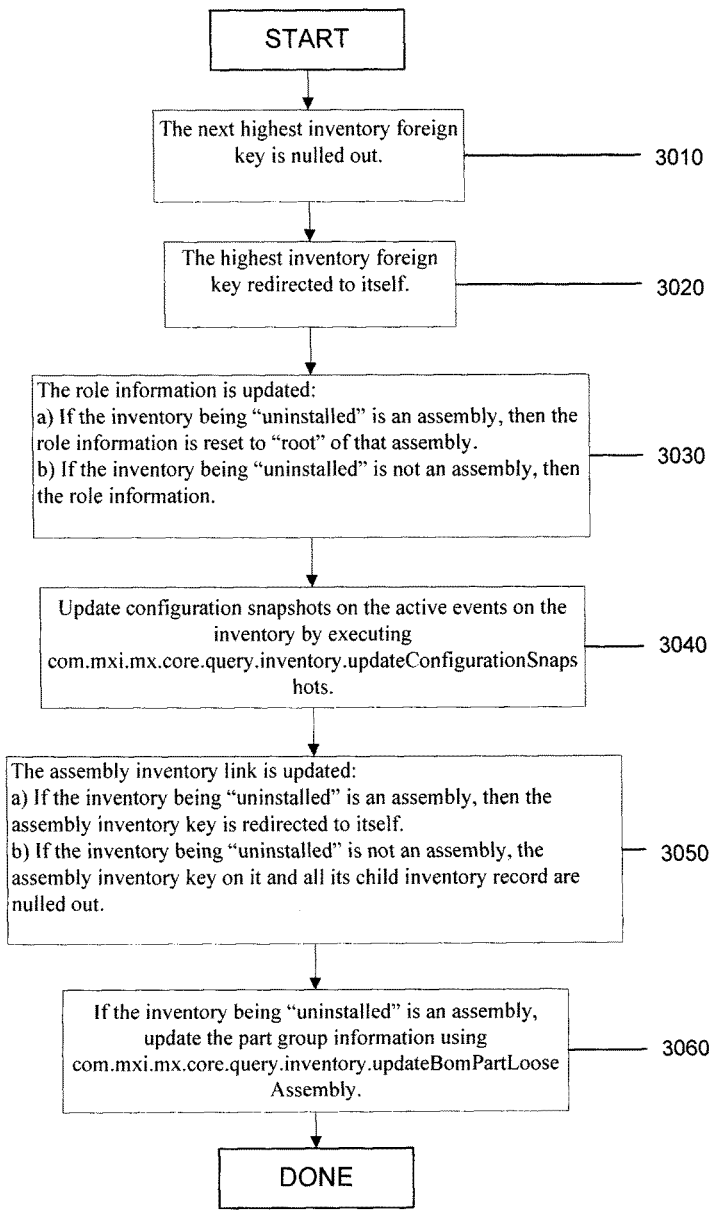
FIG. 30 presents a flow chart of a method of uninstalling an inventory record, in accordance with an embodiment of the invention.

The inventory in the carbon copy data set can be "uninstalled" by following the process of FIG. 30.

Firstly, the next highest inventory foreign key is nulled out at 3010. Then, the highest inventory foreign key is redirected to itself at 3020 (this is how Maintenix works when an assembly is detached; in a hierarchy of assemblies, the highest one always point to itself).

The role information is then updated at 3030:
- if the inventory being "uninstalled" is an assembly, then the role information is reset to "root" of that assembly; and
- if the inventory being "uninstalled" is not an assembly, then the role information is retained.

At 3040, then update configuration snapshots on the active events on the inventory by executing com.mxi.mx.core.query.inventory.updateConfigurationSnapshots.

The assembly inventory link is then updated at 3050:
- if the inventory being "uninstalled" is an assembly, then the assembly inventory key is redirected to itself; and
- if the inventory being "uninstalled" is not an assembly, the assembly inventory key on it and all its child inventory record are nulled out.

Finally, if the inventory being "uninstalled" is an assembly, update the part group information using com.mxi.mx.core.query.inventory.updateBomPartLooseAssembly at 3060.

The rest of the logic is the same as section 7.8.2.

7.8.3.1 Exemplary Scenario

The above system may be described more simply with respect to an example. Consider the following:

Initial setup at Site A:
- Aircraft A701 has engines E404-1 and E404-2 under system 72-00 (Same config slot, different position).
- Aircraft A702 has engines E404-8 and E404-9 under system 72-00 (Same config slot, different position).

Engine E200-1 has a flow regulator R130 under system 79-00.

Engine E200-1 has a flow regulator R150 under system 82-00.

Initial setup at Site B:

Engine E404-5 is ready for service.

Scenario:
1. Both of the two aircraft and the engine are transferred from site A to site B.
2. E404-1 and E404-2 on A701 are swapped.
3. E404-8 on A702 is replaced with E404-5.
4. R130 and R150 are swapped on E200-1.
5. The two aircraft and the engine are transferred back from site B to site A Upon import of A701:

The inventory hierarchy is compared between its carbon copy at site A and the import data from site B. The inventory hierarchy is considered identical since the parent inventory of the two engines E404-1 and E404-2 remained the same (system 72-00).

Import proceeds by overwriting the carbon copy rows of the inventory hierarchy with the import data.

Upon import of A702:

The inventory hierarchy is compared between its carbon copy at site A and the import data from site B. The inventory hierarchy is considered different since one of the engines has been replaced.

The carbon copy rows for E404-8 inventory hierarchy are updated:
  Parent inventory foreign key is nulled out for the engine.
  Highest inventory foreign key are updated to point to the engine.
  Assembly inventory foreign key are updated to point to the engine.
  Configuration slot information on the engine inventory row is updated to the root configuration slot information of the engine assembly.

Import proceeds by overwriting the carbon copy rows of the inventory hierarchy with the import data:
  The rows overwritten do not contain the rows for E404-8.
  The rows for E404-5 are inserted into the database since it is new to this database.

Upon import of E200-1:

The inventory hierarchy is compared between its carbon copy at site A and the import data from site B. The inventory hierarchy is considered different since the two flow regulators have switched parent inventory references.

Import proceeds by overwriting the carbon copy rows of the inventory hierarchy with the import data.

7.8.4 Post Import Logic

At the end of a successful import, the following logic is triggered:
For all imported root inventory that are either aircraft or an assembly, they will be marked as baseline synch required.

7.8.5 Special Logic

7.8.5.1 Batch Inventory Record

When an inventory record is shipped in the distributed Maintenix system, the record is moved to ARCHIVE location to indicate that it is no longer in the system, as described in section 7.7.3.6. Upon import, it is necessary to resolve the batch quantity merge manually without going through the Maintenix merge or unarchive logic.

BATCH inventory uniqueness is handled using the combination of part number, batch number, condition, and location.

If BATCH inventory row already exists at the selected receive location:
  Update the quantity on the INV_INV row. This is regardless of whether an INV_INV row with matching PK already exists at the destination database's ARCHIVE location.

If BATCH inventory row does not already exist at the selected receive location:
  Perform normal import process by creating a new INV_INV row at the specified location.

7.8.6 Error Handling

The exported record goes through much validation to ensure that the exported record will successfully import at target location. However, errors can still be introduced from sources outside deployed operations code base. This section summarizes some of the anticipated error cases and outlines how they should be handled.

7.8.6.1 Live Data Already Exists

If live data already exists at the destination database, the induction phase of the inventory transfer will fail. An error message to this effect will be generated for the user. The error message describes this failure mode so that the user can handle this error case properly. The error message preferably includes the following information:
  Root inventory PK that already exists in the database.
  The CREATION_DT and REVISION_DT date stamps on the already existing data.

7.8.6.2 Master Baseline Different at Target Site

If the portion of the master baseline that the inventory record depends on is different from what the import process expects, the induction phase of the inventory transfer will fail. An error message to this effect will be generated for the user. The error message describes this failure mode so that the user can handle this error case properly. The error message preferably includes the following information:
  Root inventory PK that already exists in the database.
  What prerequisite master baseline data was missing in English (Task Definition, Assembly Blueprint, or the like)
  Suggest that the user update the master baseline record before attempting to induct the inventory.

7.9 Graphic User Interface (GUI)

7.9.1 Datamodel

7.9.1.1 Reference Tables

FIG. 31 presents the new reference tables being used.
REF DPO IMPORT FAIL MODE
This table is used to define the import failure modes in the Maintenix system.

IMPORT_FAIL_MODE_DB_ID, IMPORT_FAIL_MODE_CD: This is the primary key for the import failure mode.

DESC_SDESC: This is the name for the import failure mode. This is a preferred field.

DESC_LDESC: This is a description for the import failure mode. This is an optional field.

| DB_ID | CD | DESC_SDESC | DESC_LDESC |
|---|---|---|---|
| 0 | LOAD | Failed to load file into staging. | Failed loading from file into staging. |
| 0 | VALIDATION | Failed validation at staging. | Failed validating data in staging. |
| 0 | INDUCTION | Failed induction from staging. | Failed inducting the inventory records from staging into the core tables. |

REF DPO XFER EXP STATUS

This table is used to define the inventory transfer file export status in the system.

EXP_STATUS_DB_ID, EXP_STATUS_CD: This is the primary key for the export file transfer status.

DESC_SDESC: This is the name for the file transfer status. This is a preferred field.

DESC_LDESC: This is a description for the file transfer status. This is an optional field.

| DB_ID | CD | DESC_SDESC | DESC_LDESC |
|---|---|---|---|
| 0 | PENDING | Pending | Record for export has been initially created |
| 0 | EXPQD | Export Queued | File is queued for processing. Can only process one file at a time |
| 0 | EXPING | Exporting | File is in the process of being exported. |
| 0 | VALDTING | Validating | Extraction data is being Validated. |
| 0 | EXPED | Exported | File has been successfully exported |
| 0 | FAILED | Failed | Exporting process has failed for a particular file and rolled back. |

REF DPO XFER IMP STATUS

This table is used to define the inventory transfer file import status in the system.

IMP_STATUS_DB_ID, IMP_STATUS_CD: This is the primary key for the import file transfer status.

DESC_SDESC: This is the name for the file transfer status. This is a preferred field.

DESC_LDESC: This is a description for the file transfer status. This is an optional field.

| DB_ID | CD | DESC_SDESC | DESC_LDESC |
|---|---|---|---|
| 0 | PENDING | Pending | File for import is in load directory. |
| 0 | IMPQD | Import Queued | File is queued for import processing. Can only process one file at a time |
| 0 | IMPING | Importing | File is in the process of being imported. |
| 0 | IMPED | Imported | File has been successfully imported |
| 0 | INDCTQD | Induct Queued | File is queued for induction process. |
| 0 | INDCTING | Inducting | File has inventory being inducted. |
| 0 | INDCTED | Inducted | All inventories on file have been inducted. |
| 0 | FAILED | Failed | Import process has failed |
| 0 | PARTIAL | Partial | Some inventories on file were successfully inducted. |

REF DPO XFER EXP INV STATUS

This table is used to define the inventory's export status in the system.

EXP_INV_STATUS_DB_ID, EXP_INV_STATUS_CD: This is the primary key for the inventory's export status.

DESC_SDESC: This is the name for the inventory export status. This is a preferred field.

DESC_LDESC: This is a description for the inventory export status. This is an optional field.

| DB_ID | CD | DESC_SDESC | DESC_LDESC |
|---|---|---|---|
| 0 | PENDING | Pending | Export inventory ready for export |
| 0 | QUEUED | Queued | Export inventory record marked for export process |
| 0 | STGING | Staging | Export inventory in extraction to staging |
| 0 | STAGED | Staged | Export inventory successfully staged |
| 0 | EXPFAILED | Failed | Export inventory failed on export |

REF DPO XFER IMP INV STATUS

This table is used to define the inventory's import status in the system.

IMP_INV_STATUS_DB_ID, IMP_INV_STATUS_CD: This is the primary key for the inventory's import status.

DESC_SDESC: This is the name for the inventory import status. This is a preferred field.

DESC_LDESC: This is a description for the inventory import status. This is an optional field.

| DB_ID | CD | DESC_SDESC | DESC_LDESC |
|---|---|---|---|
| 0 | PENDING | Pending | Export inventory ready for export |
| 0 | QUEUED | Queued | Export inventory record marked for export process |
| 0 | INDCTING | Inducting | Import inventory in induction |
| 0 | INDCTED | Inducted | Import inventory successfully inducted |
| 0 | IMPFAILED | Failed | Import inventory failed on induction phase. |

7.9.1.2 Inventory Transfer File Tables

Figure 32:
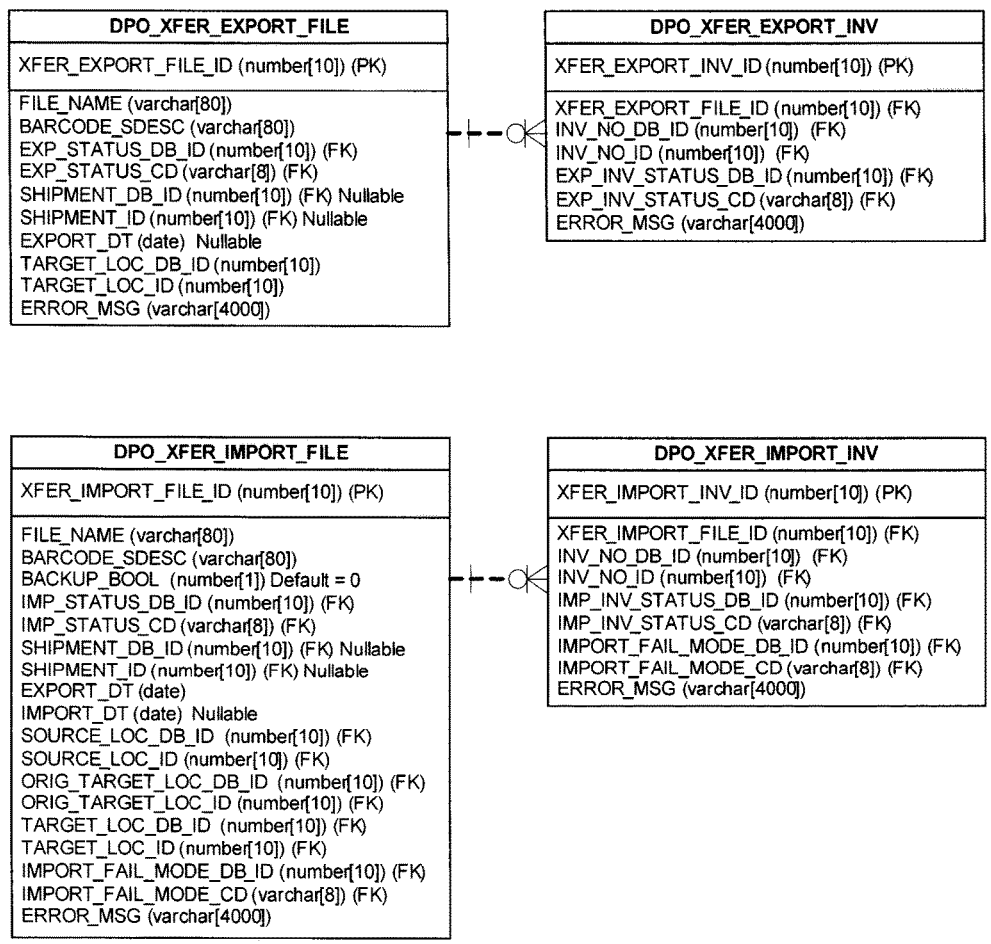
FIG. 32 presents new inventory transfer file tables being used, in accordance with an embodiment of the invention.

FIG. 32 presents the new file tables being used.

DPO_XFER_EXPORT_FILE

This table is used to define the export file.

XFER_EXPORT_FILE_ID: This is the primary key for the export file entity. This is a preferred field.

FILE_NAME: This is the name for the export file. This is a preferred field.

BARCODE_SDESC: This is a barcode associated with the export. It is stamped within the header of the file so that the same barcode is displayed when the file is loaded at the destination site.
Note: Barcodes need to be unique across the deployed network.
EXP_STATUS_DB_ID, EXP_STATUS_CD: This is the current transfer status of the file. This is a preferred field. Foreign key relationship to REF_DPO_XFER_EXP_STATUS.
SHIPMENT_DB_ID, SHIPMENT_ID: This is the foreign key relationship to the driving shipment event. This is an optional field; if it is an aircraft transfer, then this field will be null.
EXPORT_DT: This is the date when the file was successfully exported. This is a preferred field.
TARGET_LOC_DB_ID, TARGET_LOC_ID: This is the intended location of the file. This is a preferred field.
ERROR_MSG: Any errors that occur during the creation of the export file may be stored in this field. This is an optional field.

DPO XFER EXPORT INV

This table is used to define the inventory found within the export file.
XFER_EXPORT_INV_ID: This is the primary key for the export file inventory entity. This is a preferred field.
XFER_EXPORT_FILE_ID: This is the primary key for the export file entity. This is a preferred field.
INV_NO_DB_ID, INV_NO_ID: This is the foreign key for the inventory record located in the file. This is a preferred field.
EXP_INV_STATUS_DB_ID, EXP_INV_STATUS_CD: This is the export status of the inventory record. This is a preferred field. Foreign key relationship to REF_DPO_XFER_EXP_INV_STATUS.
ERROR_MSG: Any errors that occur during the creation of the export file, associated with the specific inventory may be stored in this field. This is an optional field.

DPO XFER IMPORT FILE

This table is used to define the import file.
XFER_IMPORT_FILE_ID: This is the primary key for the import file entity. This is a preferred field.
FILE_NAME: This is the name for the export file. This is a preferred field.
BARCODE_SDESC: This is a barcode associated with the export. This is a preferred field. It may be stamped within the header of the file so that the same barcode is displayed when the file is loaded at the destination site.
BACKUP_BOOL: This is a Boolean which indicates if the file is a backup or the original. This is a preferred field.
IMP_STATUS_DB_ID, IMP_STATUS_CD: This is the import status of the inventory record. This is a preferred field. Foreign key relationship to REF_DPO_XFER_IMP_STATUS.
SHIPMENT_DB_ID, SHIPMENT_ID: This is the foreign key relationship to the driving shipment event. This is an optional field; if it is an aircraft transfer, then this field will be null.
EXPORT_DT: This is the date when the file was successfully exported. This is a preferred field.
IMPORT_DT: This is the date when the file was successfully imported. This is an optional field.
SOURCE_LOC_DB_ID, SOURCE_LOC_ID: This is the last known global location of the inventory—either where the shipment originated from (the 'Ship From' location) or the aircraft's last known location before export. This is a preferred field.
ORIG_TARGET_LOC_DB_ID, ORIG_TARGET_LOC_ID: This is the intended location of the file. This is a preferred field.
TARGET_LOC_DB_ID, TARGET_LOC_ID: This is the intended import location of the inventory within the file. It is defaulted to the values within ORIG_TARGET_LOC_DB_ID, ORGI_TARGET_LOC_ID. This is a preferred field.
IMPORT_FAIL_MODE_DB_ID, IMPORT_FAIL_MODE_CD: This is the failure mode associated with any errors that occur. Foreign key reference to REF_DPO_IMPORT_FAIL_MODE. This is an optional field.
ERROR_MSG: Any errors that occur during the creation of the export file may be stored in this field. This is an optional field.

DPO XFER IMPORT INV

This table is used to define the inventory found within the import file.
XFER_IMPORT_INV_ID: This is the primary key for the import file inventory entity. This is a preferred field.
XFER_IMPORT_FILE_ID: This is the primary key for the export file entity. This is a preferred field.
INV_NO_DB_ID, INV_NO_ID: This is the foreign key for the inventory record located in the file. This is a preferred field.
IMP_INV_STATUS_DB_ID, IMP_INV_STATUS_CD: This is the import status of the inventory record. This is a preferred field. Foreign key relationship to REF_DPO_XFER_IMP_INV_STATUS.
IMPORT_FAIL_MODE_DB_ID, IMPORT_FAIL_MODE_CD: This is the failure mode associated with any errors that occur. Foreign key reference to REF_DPO_IMPORT_FAIL_MODE. This is an optional field.
ERROR_MSG: Any errors that occur during the import of the file, associated with the specific inventory may be stored in this field. This is an optional field.

7.9.2 UTL_CONFIG_PARM

In this version of the system, several new configuration parameters are employed to control the behaviour of the Import File Details, Search, and Tab pages. The following configuration parameters should be created in UTL_CONFIG_PARM.

7.9.2.1 Permissions

ACTION_DPO_EXPORT_SHIP_FILE: This is the permission required to export a shipment to a deployed operations inventory transfer file.
ACTION_DPO_EXPORT_AC_FILE: This is the permission required to export an aircraft to a deployed operations inventory transfer file.
ACTION_DPO_IMPORT_BACKUP_FILE: This is the permission required to import a deployed operations inventory transfer file that is marked as a backup.
ACTION_DPO_IMPORT_FILE: This is the permission required to import a deployed operations inventory transfer file.
ACTION_DPO_INDUCT_INVENTORY: This is the permission required to induct inventory associated with a deployed operations inventory transfer file from the staging tables.

ACTION_DPO_SET_LOCATION: This is the permission required for setting the receiving location of inventory transferred in a deployed network.

The value and default value should be set to false for all the configuration parameters defined above. Each of the above parameters should be assigned to the DPO_ADMIN and DPO_OPERATOR roles.

7.9.2.2 Logic

DPO_IMPORT_FILE_LOCATION: This is the file directory location for files awaiting import.
DPO_EXPORT_FILE_LOCATION: This is the file directory location for files that have been exported.
DPO_EXPORT_BKP_FILE_LOCATION: This is the file directory location for the backups of the files that have been exported.

7.9.3 Life Cycle Diagrams

7.9.3.1 Export

Figure 33:
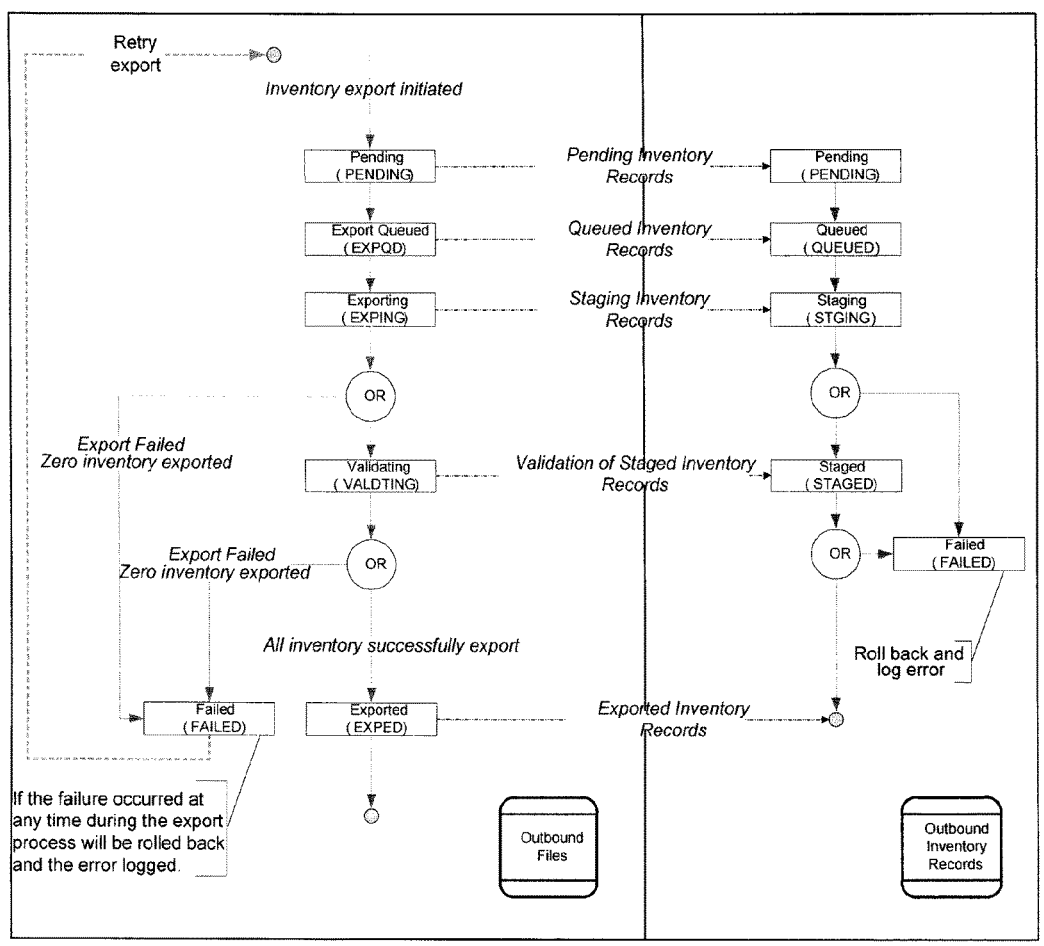
FIG. 33 presents a process flow diagram/life cycle diagram of an outbound file, in accordance with an embodiment of the invention.

FIG. 33 presents a process flow diagram describing the various steps and states the export process can have while running. The right side of the diagram represents the states the various affected inventory records can have while the export process is in progress.

7.9.3.2 Import

Figure 34:
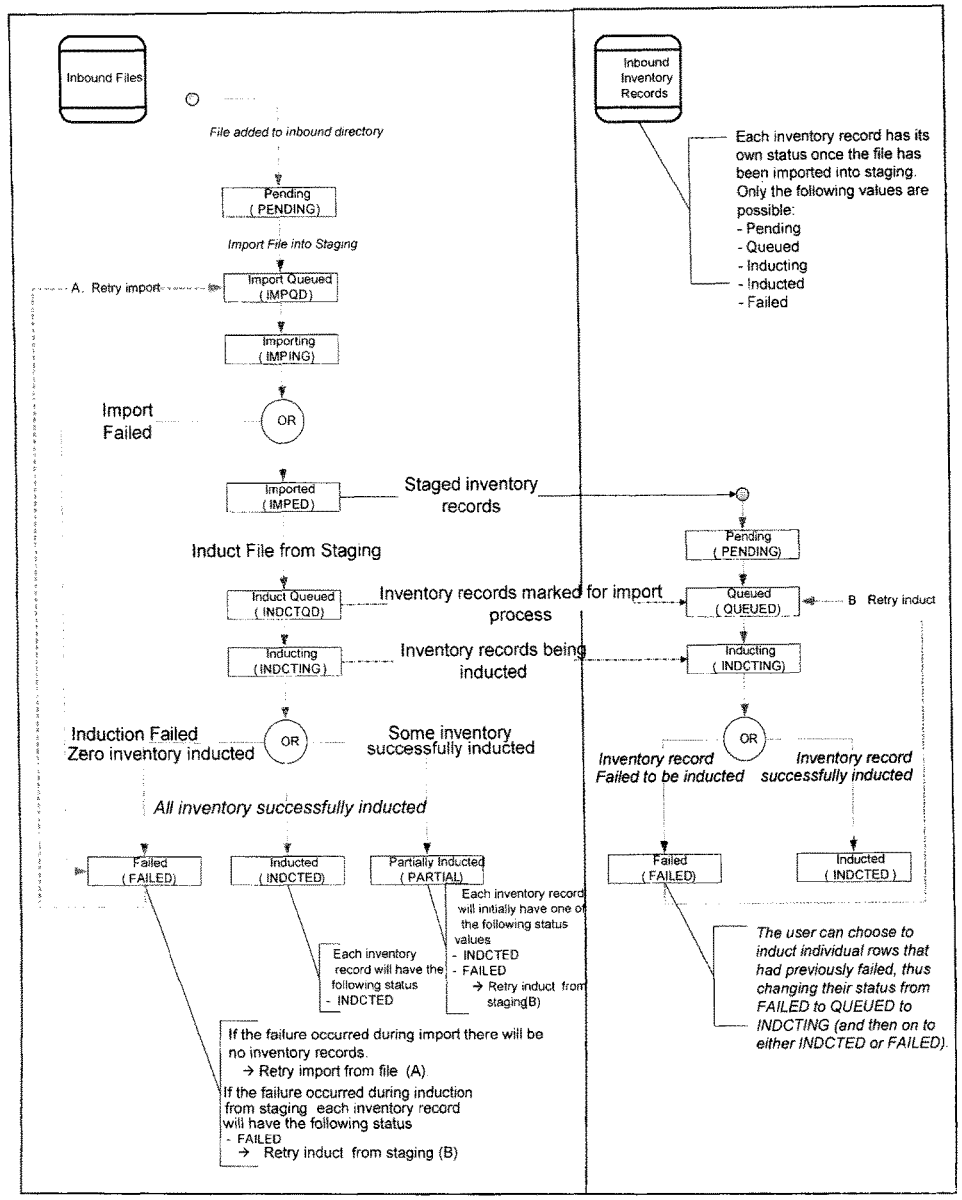
FIG. 34 presents a process flow diagram/life cycle diagram of an inbound file, in accordance with an embodiment of the invention.

FIG. 34 presents a process flow diagram describing the various steps and states the import process can have while running. The right side of the diagram represents the states the various affected inventory records can have while the import process is in progress.

7.9.4 Export

7.9.4.1 Exporting Methods

There are two ways to export inventory:
i. An aircraft can be exported directly to a file.
ii. A non-aircraft inventory item, or group of items can be added to a shipment, and that shipment can be exported to a file.

7.9.4.1.1 Aircraft Details Page

On the Inventory Details of an aircraft (INV_INV.INV_CLASS_CD='ACFT') the following button is added:
Export to File: Clicking on this button queues the inventory to be exported to file.
 The ACTION_DPO_EXPORT_AC_FILE permission is required to see this button.
 See section 7.8.6.1 for more information about the export logic hook.

7.9.4.1.2 Shipment Details Page

On the Shipment Details the following button is added:
Export to File: Clicking on this button queues the shipment to be exported to file.
 The ACTION_DPO_EXPORT_SHIP_FILE permission is required to see this button.
 The button should only appear once the shipment has been sent (status is In Transit, or Complete).

EVENT_STATUS_CD IN ('IXINTR', 'IXCMPLT')
 See section 7.8.6.1 for more information about the export logic hook.

7.9.5 Import

7.9.5.1 Deployed Ops Import Search

7.9.5.1.1 Page Setup

The Deployed Ops Import Search page is modeled as a standard Maintenix search page. It is used to search for files to import, and to trigger the import process for selected files. An exemplary screen shot is presented in FIG. 35.

The search criteria are cached just like all search pages in the Maintenix system so that when the user returns to the search page, their previous search criteria will be shown. This search page also has a corresponding record in UTL_MENU_ITEM so that it may be assigned to show up in a particular role's menu.

The result retrieved in this search page is a combination of the view of the file system as well as the staging area. This combination view gives the user a single view to show all available entities to act upon whether they are files yet to be imported or inventory records that are still in the staging area. By default, the menu item for this search page is assigned to the DPO_ADMIN and DPO_OPERATOR roles.

7.9.5.1.2 Search Criteria

Figure 35:
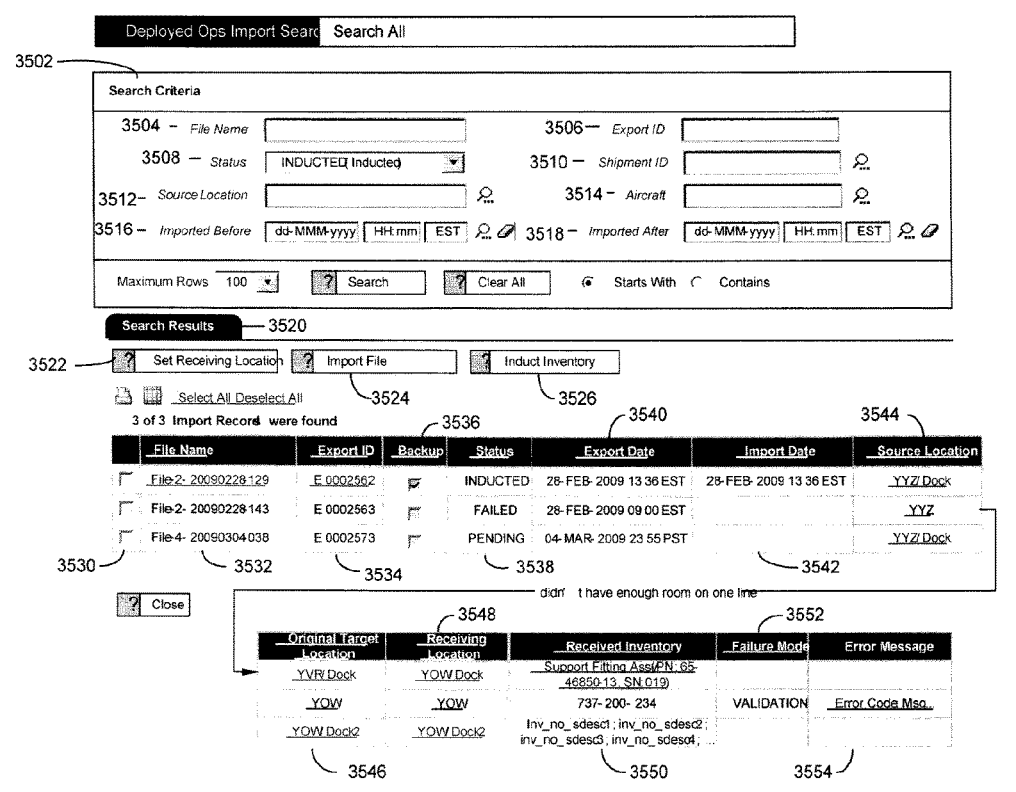

The search criteria fields 3502 of FIG. 35 are as follows:
File Name 3504: This field allows the user to specify a file name.
 This field filters the search results by only retrieving files with the specified name.
 This value comes from a union of DPO_XFER_IMPORT_FILE.FILE_NAME and a lookup of the files in the inbound import directory.
 This field is not mandatory.
Export ID 3506: This field allows the user to specify an Export ID.
 This field filters the search results by only retrieving files with the specified export ID.
 This value comes from DPO_XFER_IMPORT_FILE.BARCODE_SDESC.
 This field is not mandatory
Status 3508: This dropdown contains the status codes (REF_DPO_XFER_IMP_STATUS.DESC_SDESC.) It also contains a blank option.
 Selecting a status filters the results by only returning files with the specified status.
 Leaving the blank option selected returns files with of the statuses listed above.
 This field is not mandatory.
Shipment ID 3510: This field allows the user to specify a shipment ID.
 This field filters the search results by only retrieving files with the specified shipment ID.
 EVT_EVENT.EVENT_SDESC of the shipment (EVENT_TYPE_CD=IX)
 DPO_XFER_EXPORT_FILE.SHIPMENT_DB_ID/SHIPMENT_ID
 There should be a magnifying glass icon (tip: Select Shipment) to bring the user to the Shipment Search page. The user should then be able to search for and assign a shipment record.

This field is not mandatory.

Source Location 3512: This field allows the user to search for imports that originate from a particular location.

Selecting a location filters the results by only returning files with the specified source location.
INV_LOC.LOC_CD of the location
DPO_XFER_IMPORT_FILE.TARGET_DB_ID/TARGET_ID Selecting the magnifying glass (tip: Select Location) brings the user to the standard Location Search page from which they can assign a location.

This field is not mandatory.

Aircraft 3514: This field allows the user to specify an aircraft registration code.

This field filters the search results by only retrieving files that contain the specified registration code.
INV_AC_REG.AC_REG
DPO_XFER_IMPORT_INV.INV_NO_DB_ID/INV_NO_ID Selecting the magnifying glass (tip: Select Aircraft) opens the standard 'Select Aircraft' dialog window from which they can select an aircraft.

This field is not mandatory

Imported Before 3516: This field allows the user to search for imports that were completed before the specified date.
DPO_XFER_IMPORT_FILE.IMPORT_DT This field is not mandatory.

Imported After 3518: This field allows the user to search for imports that were completed after the specified date.
DPO_XFER_IMPORT_FILE.IMPORT_DT This field is not mandatory.

7.9.5.1.3 Buttons

The search results buttons 3520 of FIG. 35 are as follows:

Set Receiving Location 3522: Selecting a file from the search results and clicking this button brings the user to the standard Location Search page.

More than one file may be selected at one time.

The user must have the ACTION_DPO_SET_LOCATION permission to see this button.

From the Location Search page, the user is able to assign a Location, thus setting the Receiving Location for the file(s).

See section 7.9.6.2 for more information about setting the Receiving Location.

Import File 3524: Selecting a file from the search results and clicking this button queues the file to be imported into the staging tables, validated, and inducted into the core Maintenix tables.

More than one file may be selected at one time.

The user must have the ACTION_DPO_IMPORT_FILE permission to see this button.

The user must have the ACTION_DPO_BACKUP_IMPORT_FILE permission to proceed if the file is marked as a backup file.

See section 7.9.6.3 for more information about the Import File logic hook.

Induct Inventory 3526: Selecting a file from the search results and clicking this button queues all inventory within the file to be validated and inducted from the staging tables into the core Maintenix tables.

The user must have the ACTION_DPO_IMPORT_INDUCT_INVENTORY permission to see this button.

See section 7.9.6.4 for more information about the Induct Inventory logic hook.

7.9.5.1.4 Search Results

The search results fields of FIG. 35 are as follows:

Check Box Column 3530: This column contains check boxes that are used in conjunction with the Set Receiving Location, Import File, and Induct All Inventory buttons.

File Name 3532: This column displays the file name.

Once the file has begun to be loaded into staging, the file name is hyperlinked to the Import File Details page.
DPO_XFER_IMPORT_FILE.FILE_NAME Export ID 3534: This column displays the shipment associated with the file.

This can be found in the header information of the file.

This is hyperlinked to the Export File Details page.
DPO_XFER_IMPORT_FILE.BARCODE_SDESC Backup 3536: This column indicates whether a file is a backup or not.

This can be found in the header information of the file.
DPO_XFER_IMPORT_FILE.BACKUP_BOOL Status 3538: This column contains the current status of the file.
DPO_XFER_IMPORT_FILE.IMP_STATUS_DB_ID/IMP_STATUS_CD Display the corresponding DESC_SDESC in REF_DPO_XFER_IMP_STATUS.

Export Date 3540: This column contains the date the file was exported from the source database.

This can be found in the header information of the file.
DPO_XFER_IMPORT_FILE.EXPORT_DT This column is the default sort order for the search results. The most recent exports should be displayed first.

Import Date 3542: This column displays the date the file was successfully imported.
DPO_XFER_IMPORT_FILE.IMPORT_DT Source Location 3544: This column displays the global location of where the shipment originated from (the 'Ship From' location) or the aircraft's last known location before export.

This can be found in the header information of the file.
DPO_XFER_IMPORT_FILE.SOURCE_LOC_DB_ID/SOURCE_LOC_ID This is a foreign key to the INV_LOC table, and should be a hyperlink Original Target Location 3546: This column displays the global location of where the shipment was scheduled to be shipped to (the 'Ship To' location) or the aircraft's last known location before export.

This can be found in the header information of the file.
DPO_XFER_IMPORT_FILE.ORIG_TARGET_LOC_DB_ID/ORIG_TARGET_SOURCE_LOC_ID This is a foreign key to the INV_LOC table, and should be a hyperlink Receiving Location 3548: This column displays the location of where the inventory is inducted.

This may be defaulted to the Original Target Location. The user can reset the value using the 'Set Receiving Location' button.
DPO_XFER_IMPORT_FILE.TARGET_LOC_DB_ID/TARGET_SOURCE_LOC_ID This is a foreign key to the INV_LOC table, and should be a hyperlink Received Inventory 3550: This column displays the inventory located on the file.

The INV_INV.INV_NO_SDESC should be displayed for each highest/parent inventory found in the file.

These are foreign keys to the INV_INV table once successfully inducted, and should be a hyperlink DPO_XFER_IMPORT_INV.INV_NO_DB_ID/INV_NO_ID The first portion of the field may be displayed as a hyperlink Clicking the hyperlink pops up a small dialog window that displays the full information (similar to the 'Note' column on the Edit Part Requirement page).

Failure Mode 3552: This column contains the stage in which the file has failed during import.

The failure mode can be retrieved from DPO_XFER_IMPORT_FILE.IMPORT_FAIL_MODE_CD

If the Status is not 'FAILED' then this field is empty.

Error Message 3554: This column displays the error message associated with a file that failed during the import process.

The first portion of the field may be displayed as a hyperlink Clicking the hyperlink pops up a small dialog window that displays the full error message (similar to the 'Note' column on the Edit Part Requirement page).
DPO_XFER_IMPORT_FILE.ERROR_MSG

7.9.5.2 Import File Details

7.9.5.2.1 Overview

The Import File Details page allows a user to review the details of a file. It may list all inventory on the file (parent/highest inventory only) and their current status. An exemplary screen shot of such a page is shown in FIG. 36.

The page title and subtitle 3602 should read 'Import File Details-<File Name [Export ID]>.

The page divided up into a header band 3610 and two tab pages: details 3620 and received inventory 3660.

7.9.5.2.2 Import File Band

This header band 3610 displays the file name 3612, export ID 3614, and status 3616.

File Name 3612: This column displays the file name.
DPO_XFER_IMPORT_FILE.FILE_NAME Export ID 3614: This column displays the Export ID value for the file.
DPO_XFER_IMPORT_FILE.BARCODE_SDESC Status 3616: This column contains the current status of the file.
DPO_XFER_IMPORT_FILE.IMP_STATUS_DB_ID/IMP_STATUS_CD
Display the corresponding DESC_SDESC in REF_DPO_XFER_IMP_STATUS.

7.9.5.2.3 Details Tab

The details tab 3620 contains two bands (file information 3622 and status 3624) and displays information about the file itself.

7.9.5.2.3.1 File Information

Export Date 3626: This column contains the date the file was exported from the source database.
DPO_XFER_IMPORT_FILE.EXPORT_DT Import Date 3628: This column displays the date the file was successfully imported.
DPO_XFER_IMPORT_FILE.IMPORT_DT Source Location 3630: This column displays the global location of where the shipment originated from (the 'Ship From' location) or the aircraft's last known location before export.
DPO_XFER_IMPORT_FILE.SOURCE_LOC_DB_ID/SOURCE_LOC_ID This is a foreign key to the INV_LOC table, and should be a hyperlink The INV_LOC.LOC_CD should be displayed.

Shipment ID 3632: This column displays the shipment associated with the file.
DPO_XFER_IMPORT_FILE.SHIPMENT_DB_ID/SHIPMENT_ID It will not exist for aircraft inventory transfers.

This is a foreign key to the SHIP_SHIPMENT table, and should be a hyperlink

Original Target Location 3634: This column displays the global location of where the shipment was scheduled to be shipped to (the 'Ship To' location) or the aircraft's last known location before export.
DPO_XFER_IMPORT_FILE.ORIG_TARGET_LOC_DB_ID/ORIG_TARGET_LOC_ID This is a foreign key to the INV_LOC table, and should be a hyperlink The INV_LOC.LOC_CD should be displayed.

Receiving Location 3636: This column displays the location of where the inventory will be inducted.

This may be defaulted to the Original Target Location. The user can reset the value using the 'Set Receiving Location' button.
DPO_XFER_IMPORT_FILE.TARGET_LOC_DB_ID/TARGET_LOC_ID This is a foreign key to the INV_LOC table, and should be a hyperlink

7.9.5.2.3.2 Status

Backup 3638: This column indicates if the file is a backup or not.
DPO_XFER_IMPORT_FILE.BACKUP_BOOL Failure Mode 3640: This column contains the stage in which the file has failed during import.
DPO_XFER_IMPORT_FILE.IMPORT_FAIL_MODE_CD If the Status is not 'FAILED' then this field is empty.

Error Message 3642: This column displays the error message associated with a file that failed during the import process.

The first portion of the field may be displayed as a hyperlink Clicking the hyperlink pops up a small dialog window that displays the full error message (similar to the 'Note' column on the Edit Part Requirement page).
DPO_XFER_IMPORT_FILE.ERROR_MSG Inducted Inventory 3644: This column displays the number of parent inventory records successfully inducted compared to the total number in the file.

Count of rows in DPO_XFER_IMPORT_INV that correspond to the file

7.9.5.2.4 Received Inventory Tab

The received inventory tab 3660 contains a list of all inventory items (highest/parent inventory only) located in the file.

Here is a description of the fields:

Part Name 3662: This column contains part name (EQP_PART_NO.PART_NO_SDESC) of the inventory record This column is the default sort order for the results.

Status 3664: This column contains the status of the inventory record
DPO_XFER_IMPORT_INV.IMP_INV_STATUS_DB_ID/IMP_INV_STATUS_CD
Display the corresponding DESC_SDESC value in REF_DPO_XFER_IMP_INV_STATUS.

This column is the $2^{nd}$ default sort order for the results.

OEM Part No. 3666: This is the part number for the inventory record.
This value comes from EQP_PART_NO.PART_NO_OEM once the inventory is successfully inducted; otherwise it comes from the staging tables.
This column is a hyperlink to the part details page once the inventory is successfully inducted; otherwise it is simple text.

Qty 3668: This quantity of the inventory record to be inducted (except for Batch parts, this value will always be 1).
This value comes from INV_INV.BIN_QT.

Serial No/Batch No. 3670: This is the serial number for the inventory record.
This value comes from INV_INV.SERIAL_NO_OEM once the inventory is successfully inducted; otherwise it comes from the staging tables.
This column is a hyperlink to the inventory details page once the inventory is successfully inducted; otherwise it is simple text.

Failure Mode 3672: This column contains the stage in which the file has failed during import.
The failure mode can be retrieved from: DPO_XFER_IMPORT_INV.IMPORT_FAIL_MODE_CD
If the Status is not 'FAILED' then this field is empty.

Error Message 3674: This column displays the error message associated with a file that failed during the import process.
The first portion of the field may be displayed as a hyperlink Clicking the hyperlink pops up a small dialog window that displays the full error message (similar to the 'Note' column on the Edit Part Requirement page).
This value comes from DPO_XFER_IMPORT_INV.ERROR_MSG.

7.9.6 Logic Hooks

7.9.6.1 Export to File

This button appears on two pages:
i. Inventory Details page, where the inventory class is 'ACFT'
ii. Shipment Details page, where the status is 'IXINTR' or 'IXCMPLT'

Before continuing, the system will perform some validation:
All selected inventory must be located within the database (i.e. the control of the inventory must belong to the database in which they are about to be exported from).
If the validation passes, the system will, for each file selected:
Begin the process of exporting the inventory
Update the status of the file and inventory as it moves through its life cycle diagram (refer to 7.9.3.2).

7.9.6.2 Set Receiving Location

This button appears on the Import Search page.
Before beginning the import process, the system will perform some validation:
If the selected file(s) already have been inducted (status='INDUCTED'), then present an error.
If the validation passes, the system will, for each file selected:
Bring the user to the standard Location Search & Assign page.
From here the user can search, select and assign a location.
This is the 'Receiving Location' used when inducting the inventory.

7.9.6.3 Import File

This button appears on the Import Search page.
Before beginning the import process, the system will perform some validation:
The selected file(s) must have a valid Receiving Location.
The selected file(s) must have a status of PENDING or FAILED
If the validation passes, the system will, for each file selected:
Queue the file to be imported into staging and then inducted in the core tables.
Update the status file as it moves through its life cycle diagram (refer to 7.9.3.2).
Any data related to the file from the staging environment is deleted before reloading.

7.9.6.4 Induct Inventory

This button appears on the Import Search page.
Before beginning the induction process, the system will perform some validation:
The selected file(s) must have a valid Receiving Location.
The selected file(s) must have a status of IMPORTED, PARTIAL or FAILED
If FAILED, the failure mode must not be 'LOAD'. The data must exist in staging before the induction process may begin.
If the validation passes, the system will, for each file selected:
Queue the inventory in the file to be inducted in the core tables.
Update the status file and inventory as it moves through its life cycle diagram (refer to 7.9.3.2).

7.10 Technology

To support the various challenges of transferring inventory data across operational sites 120 in an efficient way, the system uses a collection of tools that make this challenge easier to deal with.

7.10.1 Oracle Warehouse Builder

This is the main tool used to extract and induct the various inventories across operational sites 120. It is an ETL (Extract, Transform, Load) tool which is included in the base license of Oracle (SE and EE). This tool is used because it is built to support data extraction and load processes efficiently and offers a lot of functionality out of the box that complements the system.

The reasons for using an ETL tool are numerous. Other than accelerating the implementation of extraction and induction processes, it also provides the following advantages:
 Documents the design, procedures, workflow, etc. of the ETL processes in one place,
 Generates the code from the mapping and workflows,
 Easy to maintain and apply schema changes,
 Is metadata driven and provides lots of built-in functions,
 Supports extraction, cleansing, mapping and various other rules, and
 Built in auditing, logging and tracking.

OWB is used to create the mappings, workflows, staging area, validations, and the like, for both the export and import processes.

7.10.2 Oracle Workflow

Oracle Workflow is a component that is available in Oracle with a valid license (SE or EE). It allows business processes to easily be defined using a graphical drag and drop process designer. It allows business processes to change and evolve without having to resort to changing and debugging code. OWB provides a workflow building GUI and supports deployments of workflow processes in the workflow engine.

Inventory Transfer uses Oracle Workflow to link events together. It ties the various events to create the inventory transfer business logic.

7.10.3 Oracle Rule Manager

Rule Manager is a feature of Oracle that enables items to be defined that manage events with Event-Condition-Action (ECA) rules. It also works in conjunction with Expression Filters to store, index, and evaluate conditional expressions to describe interest in some expected data.

The Rule Manager is used in inventory transfer to validate the staging areas. It is triggered by OWB as part of its workflow.

7.10.4 OWB General Export Workflow

The general workflow for exporting a full aircraft or shipment is as follows:
1. The export process is triggered in the GUI when a shipment or aircraft is ready to be exported. The GUI populates the IT export tables with the appropriate information and calls a package procedure with an export file id to trigger the OWB ETL process. This is an asynchronous process so the GUI is not blocked while the export is in progress.
2. The OWB export process executes the extraction of the inventory data in parallel and populates the staging tables. It reports on its progress in the various inventory transfer tables.
3. Once the extraction is completed, validation of the staging area using Oracle Rule manager is triggered. This validation ensures that the data in the staging area is in a valid state against itself (proper CC records are present, integrity is respected, etc.)
4. Once the validation is completed, the inventory items present in the staging area are dumped into files and zipped together.
5. Once the files are all successfully written, an alert is generated back to the GUI informing the user that the files are ready and where they are located.

7.10.5 OWB General Import Workflow

The list of files available for import is part of a search page. Once the user picks a file to load, the GUI inserts relevant information into the I.T. import tables and triggers a package procedure with the file ID to load.

The OWB import process starts by loading the file into a temporary staging area. This temporary staging area will allow the inventory transfer to support transferring files across different schema version in the future. This is an asynchronous process which loads the files in parallel. The temporary staging area tables are migrated directly (no transformation for this version) to the real staging area.

Validation is triggered on the staging area to make sure the inventory items we want to induct have a matching baseline and its integrity is respected. The inventories that pass validation are then inducted in sequence into the Maintenix tables. Once the inventories have been inducted, an alert is sent to let the user know that the import process completed.

CONCLUSIONS

The present invention has been described with regard to one or more embodiments. However, it will be apparent to persons skilled in the art that a number of variations and modifications can be made without departing from the scope of the invention as defined in the claims.

The method steps of the invention may be embodied in sets of executable machine code stored in a variety of formats such as object code or source code. Such code may be described generically as programming code, software, or a computer program for simplification. Clearly, the executable machine code or portions of the code may be integrated with the code of other programs, implemented as subroutines, plug-ins, add-ons, software agents, by external program calls, in firmware or by other techniques as known in the art.

The embodiments of the invention may be executed by a computer processor or similar device programmed in the manner of method steps, or may be executed by an electronic system which is provided with means for executing these steps. Similarly, an electronic memory medium such computer diskettes, hard drives, thumb drives, CD-Roms, Random Access Memory (RAM), Read Only Memory (ROM) or similar computer software storage media known in the art, may be programmed to execute such method steps. As well, electronic signals representing these method steps may also be transmitted via a communication network.

All citations are hereby incorporated by reference.

What is claimed is:

1. An operations support system comprising:
 a master site, having a database;
 multiple deployed sites, each being operable to execute an operations support software application; and
 an intermittently-available communications system, for interconnecting said master site with said multiple deployed sites;
 said intermittently-available communications system supporting file-based transfer;
 said multiple deployed sites being operable, in response to communication with said master site being unavailable, to intercept a data stream from said operations support software application and to store operational data for transfer, in a file, and in response to communication with said master site becoming available, transfer said file to said master site; and wherein said multiple deployed sites are operable to enable maintenance and operations while detached; and said master site being operable to receive said transferred file, extract stored operational data, and insert extracted stored operational data into said database;

said operations support system being operable to forecast maintenance, parts, and resource requirements in preparation for deployment.

2. The system of claim 1 wherein each of said multiple deployed sites has the required configuration and transactional data to run as a stand-alone operations support system until deployment is no longer required.

3. The system of claim 2 wherein each of said multiple deployed sites operates as a copy of the master site.

4. The system of claim 3 wherein the transfer of baseline data of is uni-directional, from the master site to the multiple deployed sites.

5. The system of claim 3 further comprising a consolidator site for receiving data from said multiple deployed sites, and consolidating said data for transfer to said master site.

6. The system of claim 1 wherein each of said multiple deployed sites is only allowed to operate on a specific subset of the assets in the system.

7. The system of claim 1 wherein each of said multiple deployed sites may be decommissioned by transferring assets to other sites sharing the same master, whether deployed or not.

8. The system of claim 1 wherein updates from the master site to said multiple deployed sites may be performed incrementally.

9. The system of claim 5 wherein the consolidator site is operable to replicate its data to other consolidator sites.

10. The system of claim 5 wherein operational data is pushed from said multiple deployed sites to the consolidator site for reporting on a fleet-wide basis.

11. The system of claim 3, wherein said operations support system being operable to assess the levels of mission readiness of deployable assets and resources.

12. The system of claim 3, wherein said operations support system being operable to plan and execute maintenance in-theatre, based on real-time mission and asset utilization data, resource and parts availability.

13. The system of claim 3, wherein said operations support system being operable to provide real-time Total Asset Visibility (TAV) of globally deployed assets.

14. The system of claim 5 wherein said consolidator site is operable to receive baseline data from a master site.

15. The system of claim 5 wherein said consolidator site is operable to receive operational data from multiple deployed sites.

16. The system of claim 1 wherein the master site and the multiple deployed sites are time synchronized, enabling conflicts to be resolved.

17. A method of providing operations support comprising:
providing a master site having a database;
providing multiple deployed sites, each being operable to execute an operations support software application and wherein said multiple deployed sites are operable to enable maintenance and operations while detached;
providing an intermittently-available communications system, for interconnecting said master site with said multiple deployed sites, said intermittently-available communications system supporting file-based transfer;
responding to communication being unavailable, by at least one of said multiple deployed sites intercepting a data stream from said operations support software application and storing operational data in a file for transfer and responding to communication becoming available by transferring said file from said at least one of said multiple deployed sites to said master site; and
receiving said transferred file at said master site, and responding to said receiving by extracting stored operational data and inserting extracted stored operational data into said database;
said operations support system being operable to forecast maintenance, parts, and resource requirements in preparation for deployment.

18. The method of claim 17 further comprising:
configuring each of said multiple deployed sites to run as a standalone operations support system until deployment is no longer required.

19. The method of claim 17 further comprising:
operating each of said multiple deployed sites as a copy of the master site.

20. The method of claim 17 comprising:
transferring baseline data, uni-directionally, from the master site to the multiple deployed sites.

* * * * *